US010315811B2

(12) United States Patent
Choltco-Devlin et al.

(10) Patent No.: US 10,315,811 B2
(45) Date of Patent: Jun. 11, 2019

(54) CAM LID ASSEMBLY

(71) Applicant: Pacific Market International, LLC, Seattle, WA (US)

(72) Inventors: Evan Michael Choltco-Devlin, Ellensburg, WA (US); Sarah Danger George, Vashon, WA (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 268 days.

(21) Appl. No.: 15/240,697

(22) Filed: Aug. 18, 2016

(65) Prior Publication Data

US 2018/0050848 A1    Feb. 22, 2018

(51) Int. Cl.
| | |
|---|---|
| *A45F 3/16* | (2006.01) |
| *A47G 19/22* | (2006.01) |
| *B65D 39/08* | (2006.01) |
| *B65D 43/26* | (2006.01) |
| *B65D 43/02* | (2006.01) |
| *B65D 43/16* | (2006.01) |
| *B65D 51/18* | (2006.01) |
| *B65D 55/02* | (2006.01) |
| *A47J 41/00* | (2006.01) |

(52) U.S. Cl.
CPC ............. *B65D 43/267* (2013.01); *A45F 3/16* (2013.01); *A47J 41/0022* (2013.01); *B65D 39/08* (2013.01); *B65D 43/02* (2013.01); *B65D 43/16* (2013.01); *B65D 51/18* (2013.01); *B65D 55/02* (2013.01); *A47G 19/2272* (2013.01); *B65D 2251/009* (2013.01); *B65D 2251/0021* (2013.01); *B65D 2251/0028* (2013.01); *B65D 2251/0081* (2013.01); *B65D 2543/00046* (2013.01)

(58) Field of Classification Search
CPC ...... B65D 43/267; B65D 43/26; B65D 43/16; B65D 43/02; B65D 39/08; B65D 51/18; B65D 55/02
USPC ...... 220/254.5, 254.3, 254.1, 715, 714, 713, 220/711, 710.5; D7/392.1, 391, 900, D7/396.2, 396.1
See application file for complete search history.

(56) References Cited

U.S. PATENT DOCUMENTS

| | | |
|---|---|---|
| 6,626,314 B1 | 9/2003 | McHenry et al. |
| 6,702,137 B1 * | 3/2004 | Kowa ................. A47J 41/0027 215/235 |

(Continued)

*Primary Examiner* — Jeffrey R Allen
(74) *Attorney, Agent, or Firm* — Davis Wright Tremaine LLP; George C. Rondeau, Jr.

(57) ABSTRACT

A lid assembly for attachment to a drinking vessel is provided having a camming lever rotatably attached to an upper portion of a lid main body, and a sealing member rotatably attached to a lower portion of lid main body. Rotation of the camming lever between a forward and rearward position in an elongated recess of the lid main body selectively seals and unseals a drinking aperture in the lid main body. A locking member is operable to selectively secure the rotational position of the camming lever when the sealing member is in a sealing position sealing the drinking aperture. A cam axle of the camming lever is removably attachable to an attachment element of the sealing member to transition the lid assembly between a use configuration for drinking and a cleaning configuration in which the lid assembly may be thoroughly cleaned.

58 Claims, 37 Drawing Sheets

(56) References Cited

U.S. PATENT DOCUMENTS

| | | |
|---|---|---|
| 8,746,496 B2 | 6/2014 | Gilbert et al. |
| 9,938,054 B2 * | 4/2018 | Choltco-Devlin ... B65D 43/265 |
| 2012/0031902 A1 * | 2/2012 | Gilbert ................... B65D 39/08 |
| | | 220/212.5 |
| 2013/0140309 A1 * | 6/2013 | George .............. A47G 19/2272 |
| | | 220/254.1 |
| 2016/0106241 A1 | 4/2016 | Wong |
| 2018/0127164 A1 * | 5/2018 | Choltco-Devlin ........................... B65D 47/0895 |

* cited by examiner

CAM LID ASSEMBLY

FIELD OF INVENTION

The present invention relates to removable lids for drinking vessels and more precisely lids having mechanisms for sealing and unsealing a drinking aperture using a sealing element.

BACKGROUND

U.S. Patent Application Publication No. 2012/0031902 and U.S. Design Patent D651,847 disclose a drinking container lid with a handle that rotates to selectively open and close a cover of the lid.

DETAILED DESCRIPTION

Figure 1:
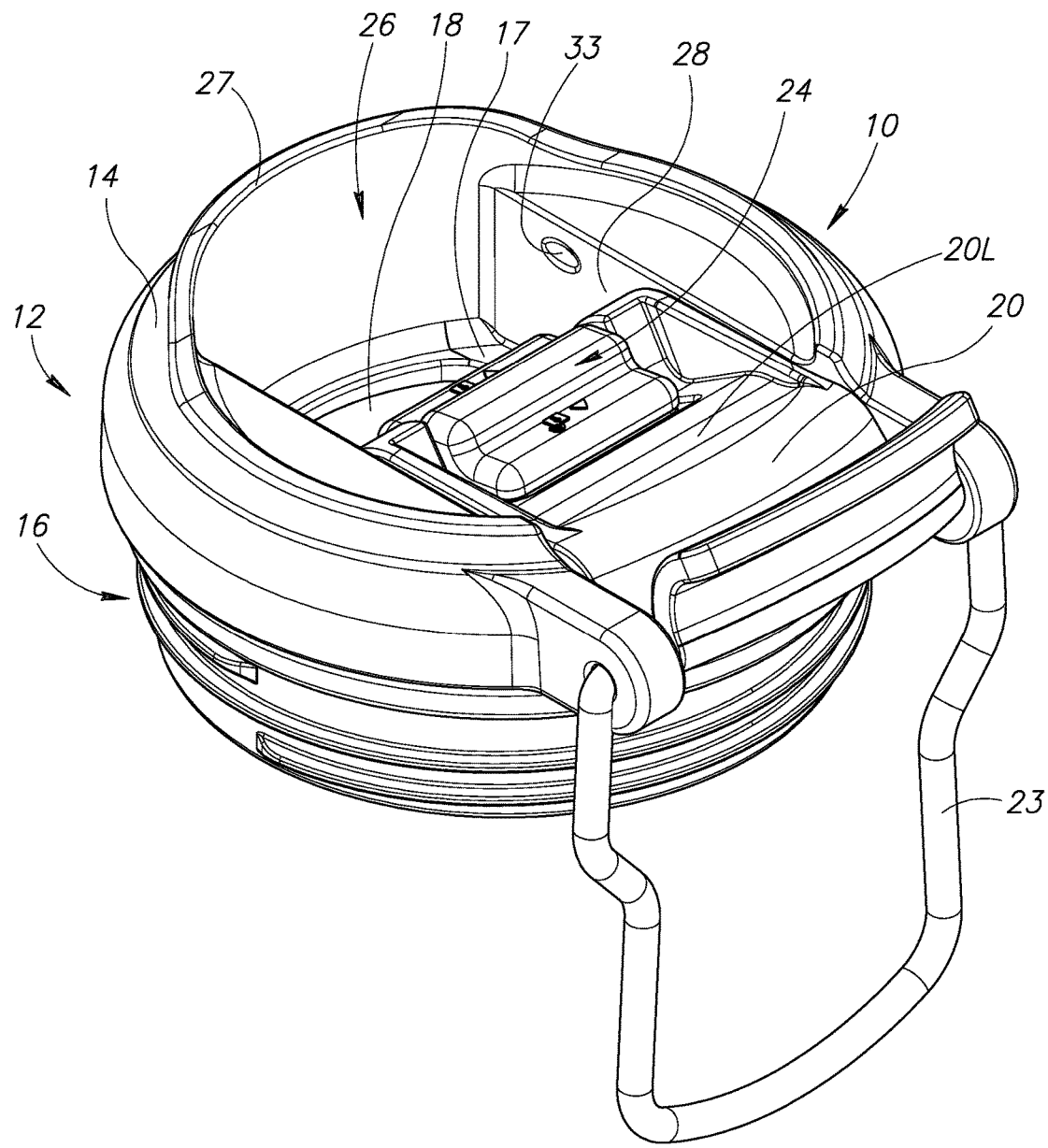
FIG. 1 illustrates a first top perspective view of a lid assembly according to a first embodiment.

A lid assembly 10 according to a first embodiment is shown in FIG. 1. The lid assembly 10 has a substantially cylindrical lid main body 12 having an upper portion 14 and a lower portion 16. The lid main body 12 includes a partition 17 having a drinking aperture 18 extending therethrough for consuming a beverage. A camming lever 20 is operable to selectively seal and unseal a sealing member 22 (see FIG. 5A) to close and open, respectively, the drinking aperture 18. A locking member 24 is operable to selectively secure and unsecure the position of the camming lever 20.

Figure 2:
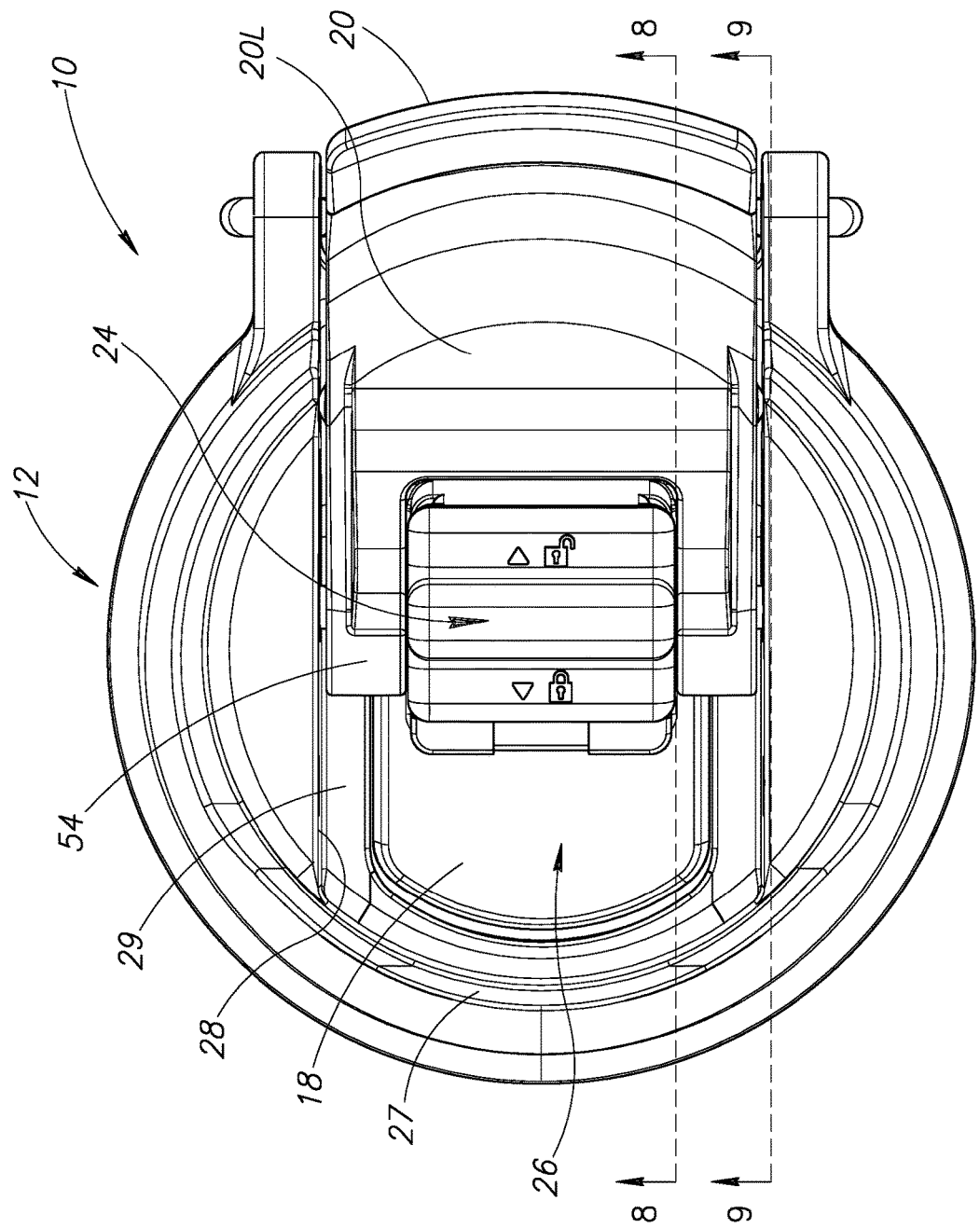
FIG. 2 illustrates a top plan view of the lid assembly of FIG. 1 with a camming lever in a rearward position.
Figure 3:
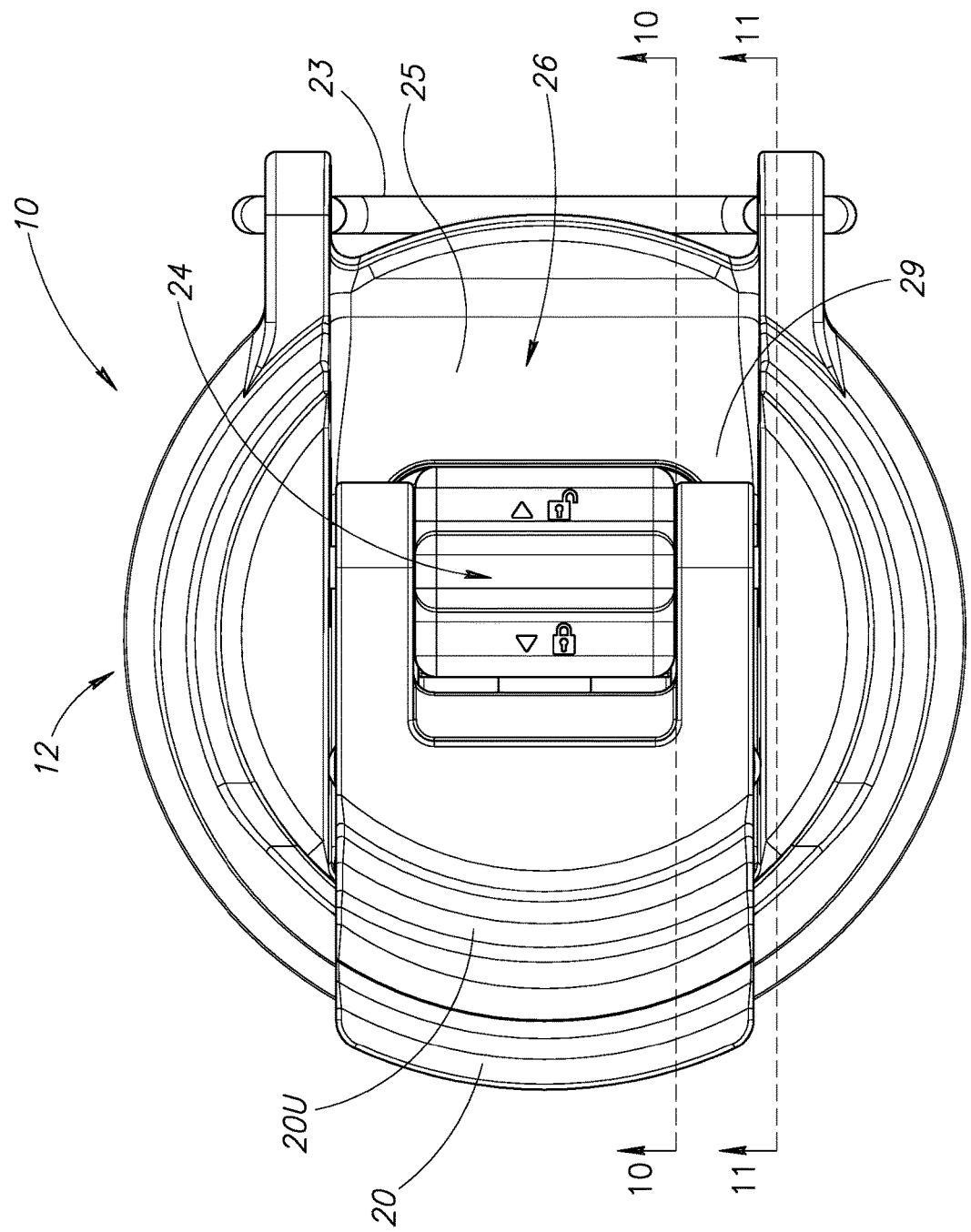
FIG. 3 illustrates a top plan view of the lid assembly of FIG. 1 with the camming lever in a forward position.
Figure 8:
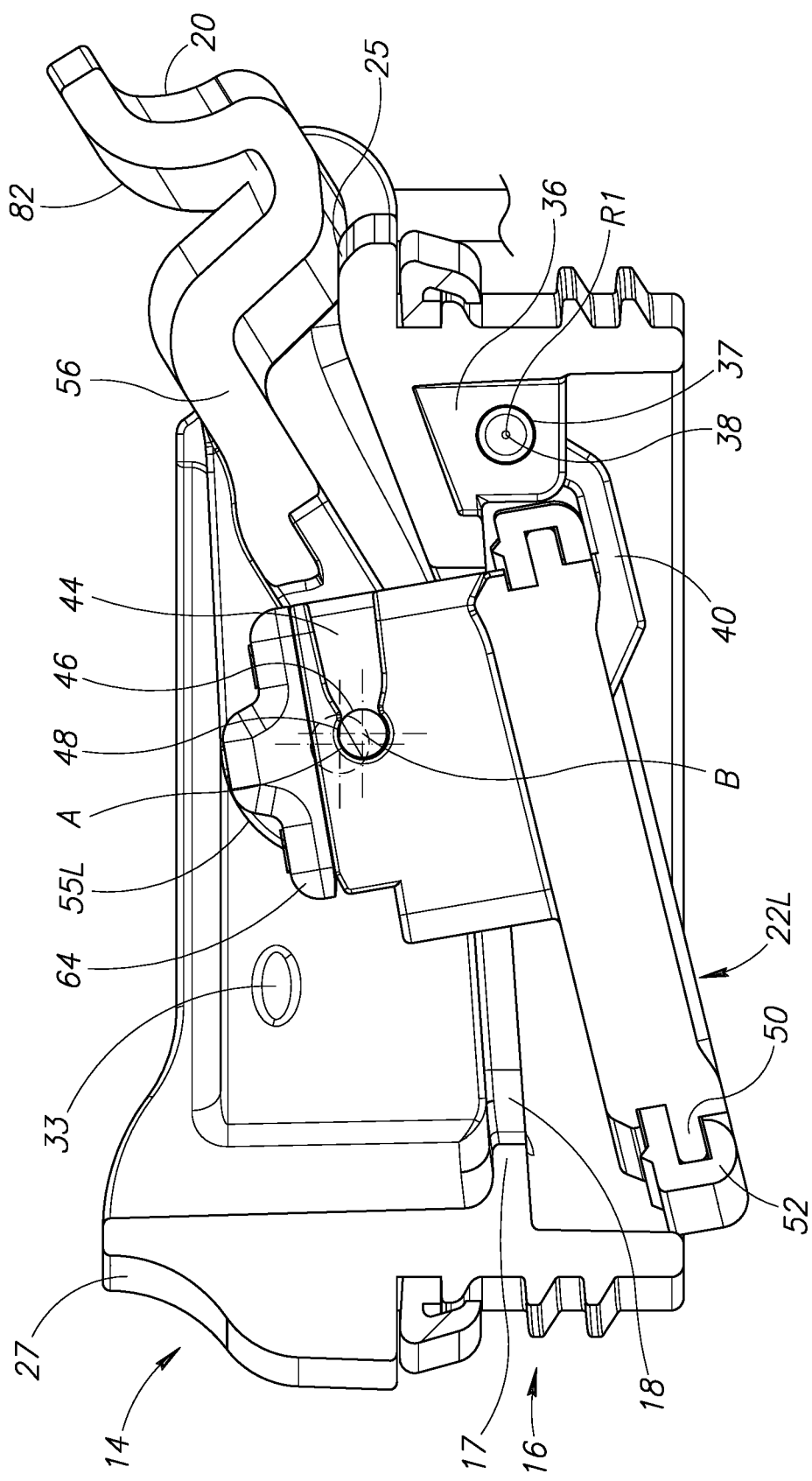
FIG. 8 illustrates a first cross-sectional side view of the lid assembly of FIG. 1 taken substantially along the line 8-8 of FIG. 2 with the camming lever in a rearward position and the sealing member in an unsealed position unsealing the drinking aperture of the lid assembly.
Figure 9:
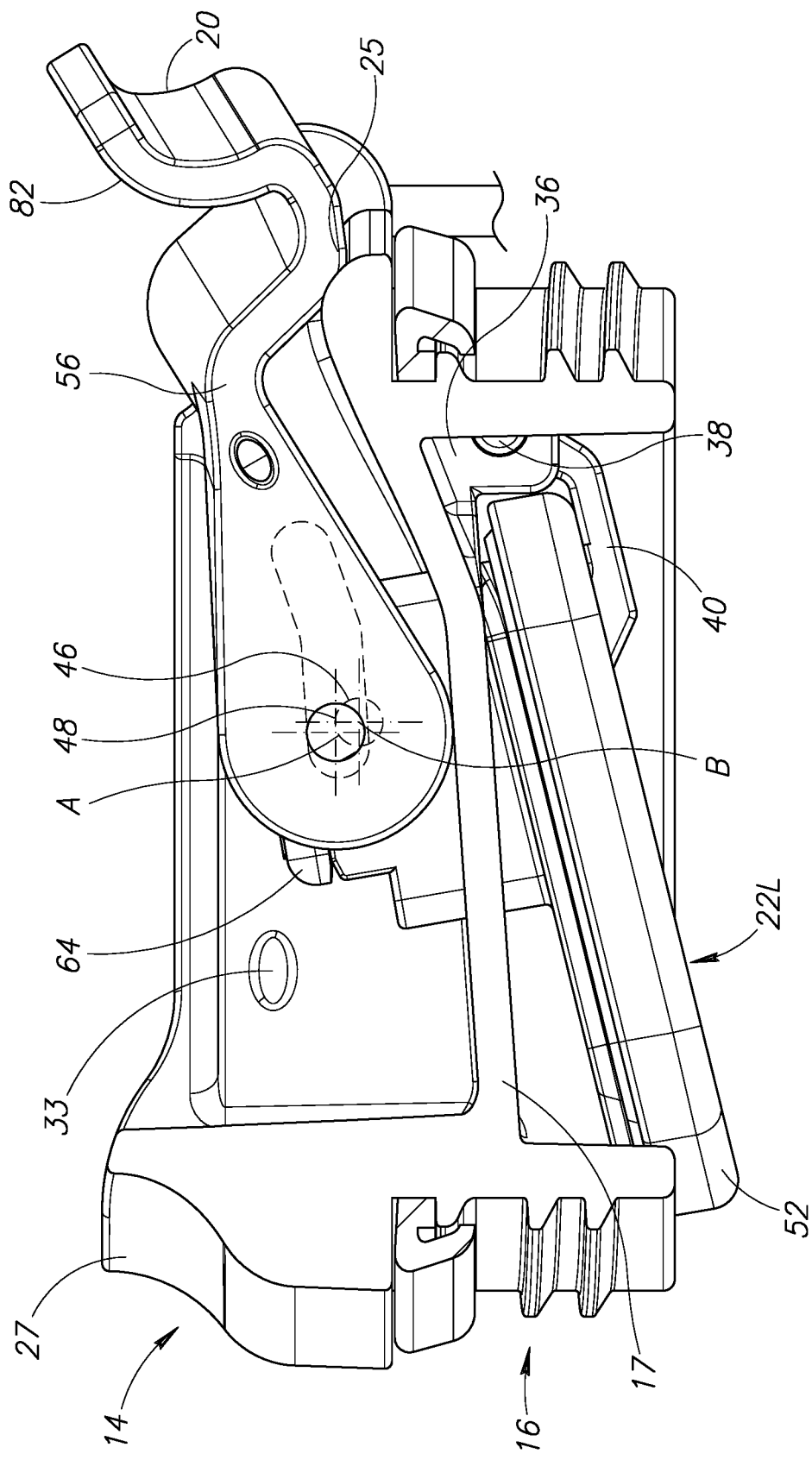
FIG. 9 illustrates a second cross-sectional side view of the lid assembly of FIG. 1 taken substantially along the line 9-9 of FIG. 2 with the camming lever in a rearward position and the sealing member in an unsealed position.
Figure 10:
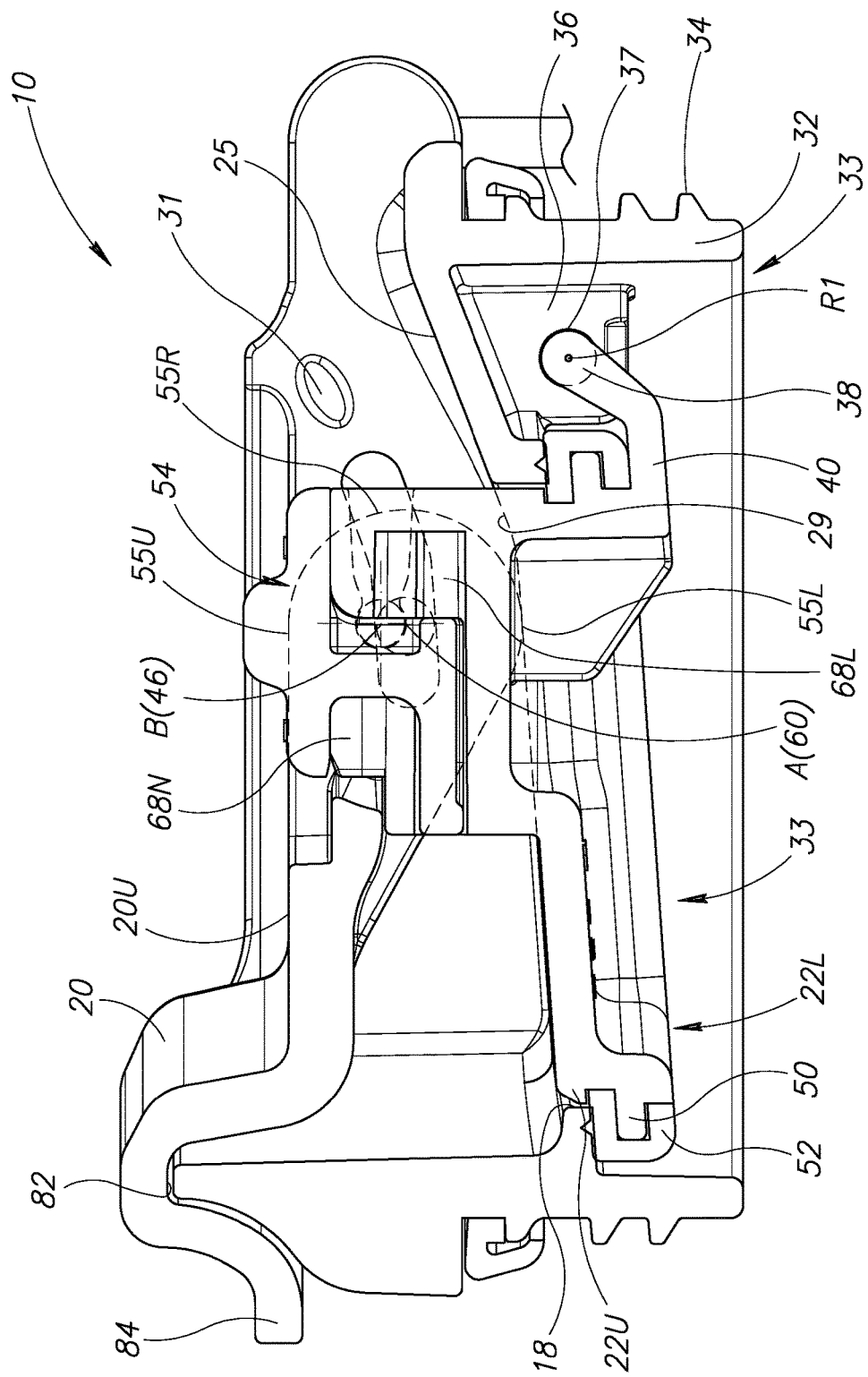
FIG. 10 illustrates a first cross-sectional side view of the lid assembly of FIG. 1 taken substantially along the line 10-10 of FIG. 3 with the camming lever in a forward position and the sealing member in a sealed position sealing the drinking aperture.
Figure 11:
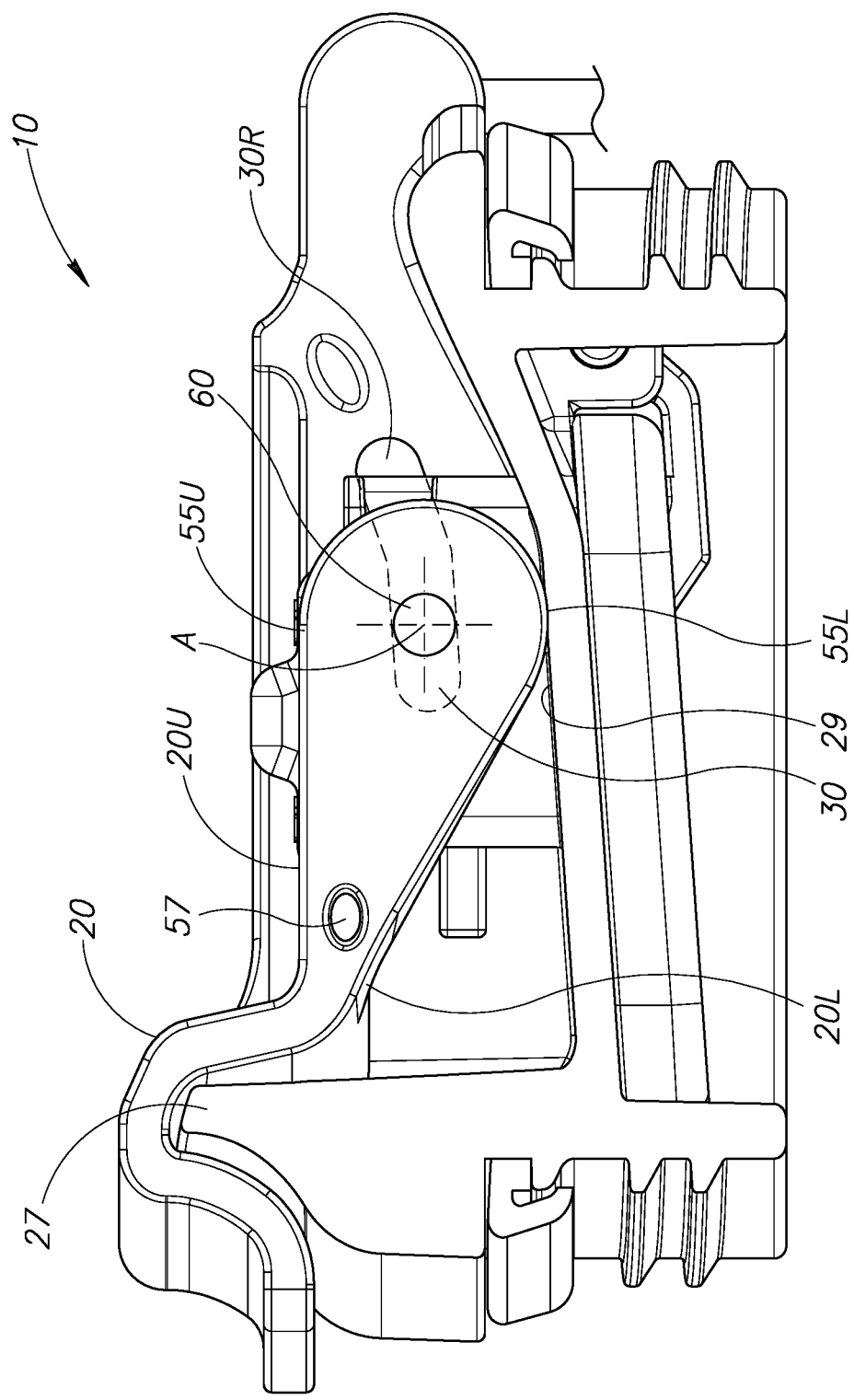
FIG. 11 illustrates a second cross-sectional side view of the lid assembly of FIG. 1 taken substantially along the line 11-11 of FIG. 3 with the camming lever in a forward position, the sealing member in the sealed position, and the locking member in an unlocked position.

When the camming lever 20 is moved to a first position where a lower surface 20L of the camming lever is proximate a forward upper surface portion of the upper portion 14, the sealing member 22 is in a sealed position pressed against the drinking aperture 18 from below, as shown in FIGS. 3, 10 and 11. When the camming lever 20 is moved to a second position where an upper surface 20U of the camming lever is proximate a rearward portion of the upper portion 14, as shown in FIGS. 2, 8 and 9, the sealing member 22 is in an unsealed position spaced apart from and below the drinking aperture 18.

Figure 4A:
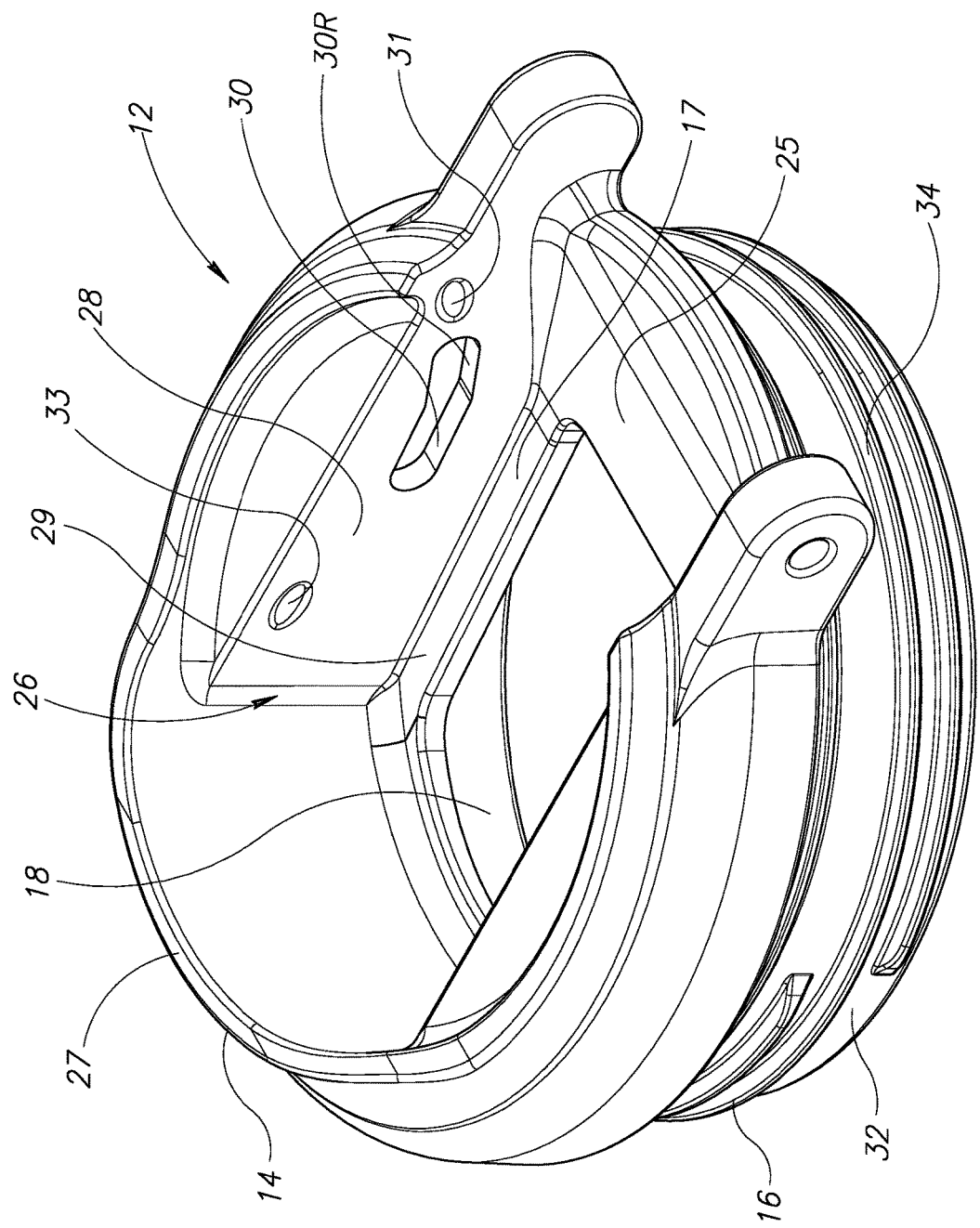
FIG. 4A illustrates a top perspective view of the lid main body of the lid assembly of FIG. 1.
Figure 4B:
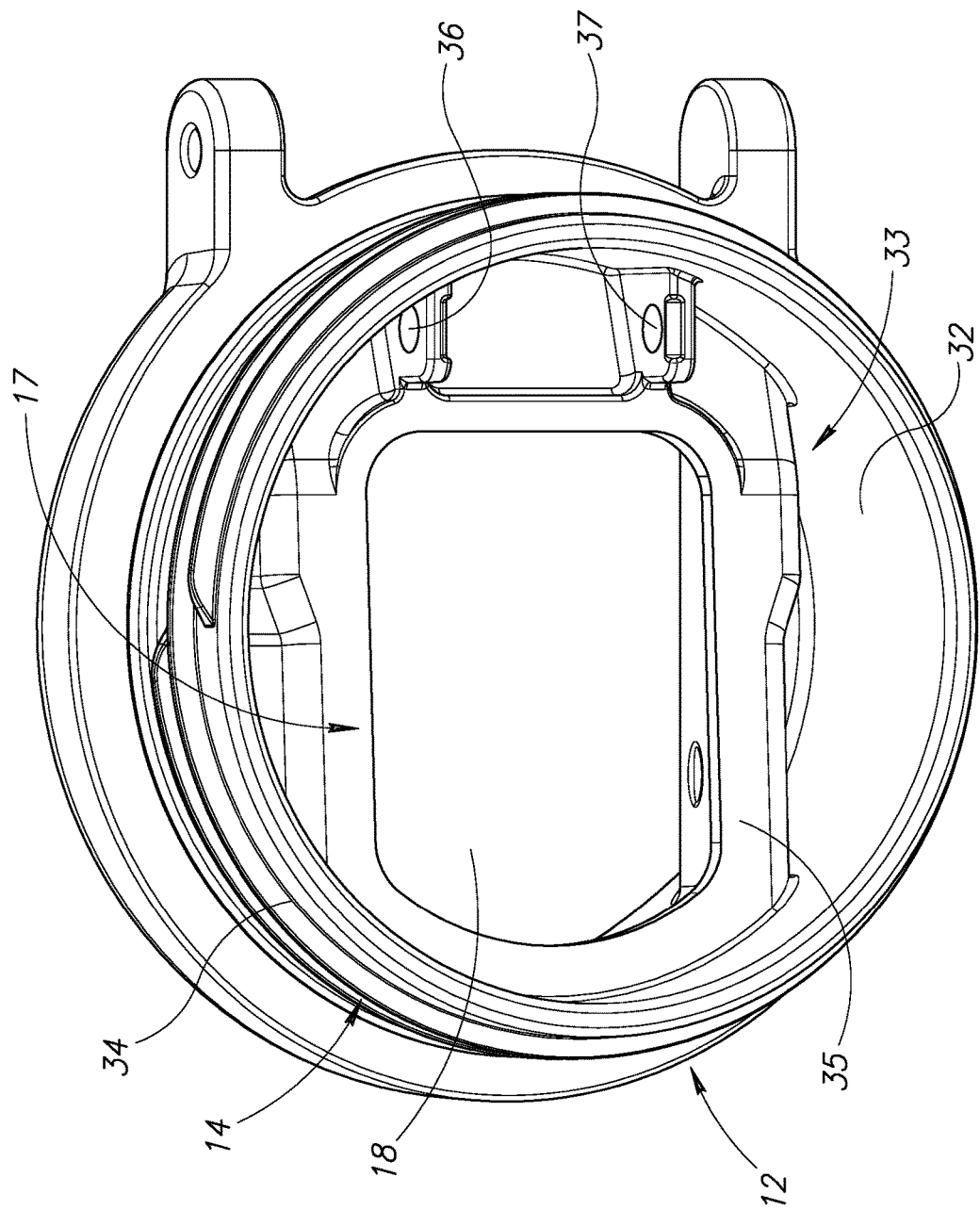
FIG. 4B illustrates a bottom perspective view of the lid main body of FIG. 4A.

The lid main body 12 may be provided with an elongated recess 26 that extends in a horizontal direction between a forward end and a rearward end along the upper portion 14, as shown in FIGS. 1, 2, 3 and 4A. The elongated recess 26 terminates at a drinking lip 27 at the forward end, which projects upwardly from a forward end of the drinking aperture 18 and which may have a curved shape following the shape of the lid main body 12. The elongated recess 26 includes left and right sidewalls 28 projecting upwardly above the drinking aperture 18 on opposite sides of the drinking aperture 18. An elongated groove or slot 30 is provided in each of the left and right opposing sidewalls 28 near a center portion of the elongated recess 26, and has a length extending along the sidewall. The lid main body 12 has a partition upper surface 29 around the left and right side of the drinking aperture 18 on an upper portion side of the lid main body 12. The partition upper surface 29 may incline upward to an elevated portion 25 at the rearward end of the elongated recess 26 opposite to the drinking lip 27, as shown in FIGS. 4A, 8 and 10. A handle 23 may be pivotally attached at the rearward end of the elongated recess for carrying or attaching the lid assembly 10 and the drinking vessel 90 attached thereto (see FIG. 12).

The lower portion 16 of the lid main body 12 may include a downwardly projecting circumferentially extending sidewall 32 to form a downwardly opening open-ended cavity 33, as shown in FIGS. 4B, 8, 9, 10, 11 and 12. The drinking aperture 18 extends through a partition lower surface 35 on a lower portion side of the lid main body 12. The sidewall 32 may be provided with a vessel attachment portion 34, such as a thread portion that may threadably attach to a corresponding threaded portion of a drinking vessel 90, shown in FIG. 12. The vessel attachment portion 34 may use other attachment features to removably join the lid assembly 10 to the drinking vessel 90 in a fluid-tight configuration, such as a bayonet mount or friction fit, and may include an O-ring or gasket sized to aid in sealing the lid assembly 10 to the drinking vessel 90.

Figure 5A:
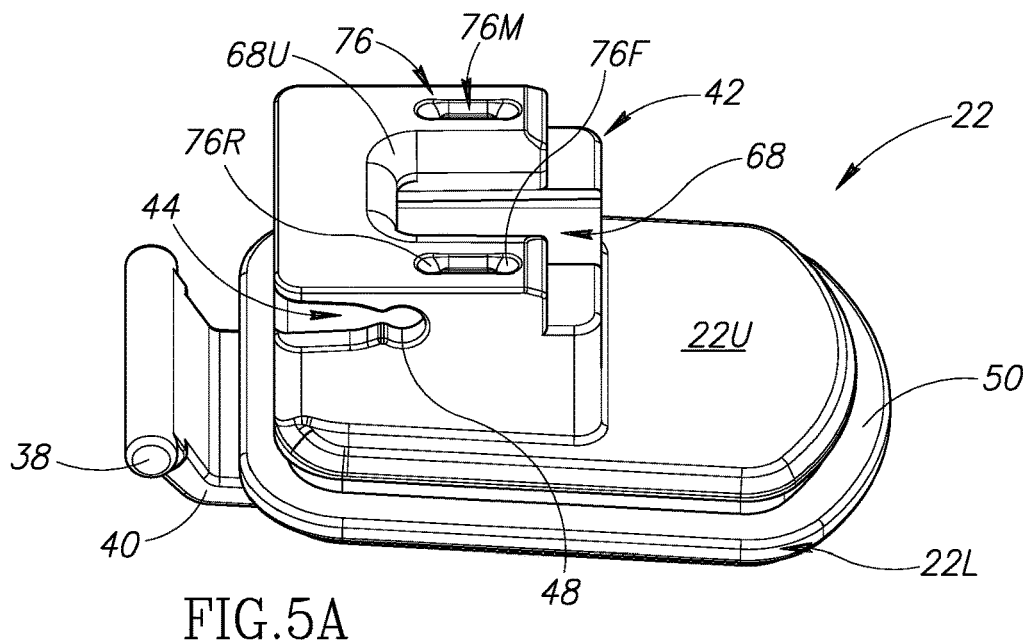
FIG. 5A illustrates a top perspective view of the sealing member of the lid assembly of FIG. 1.
Figure 5B:
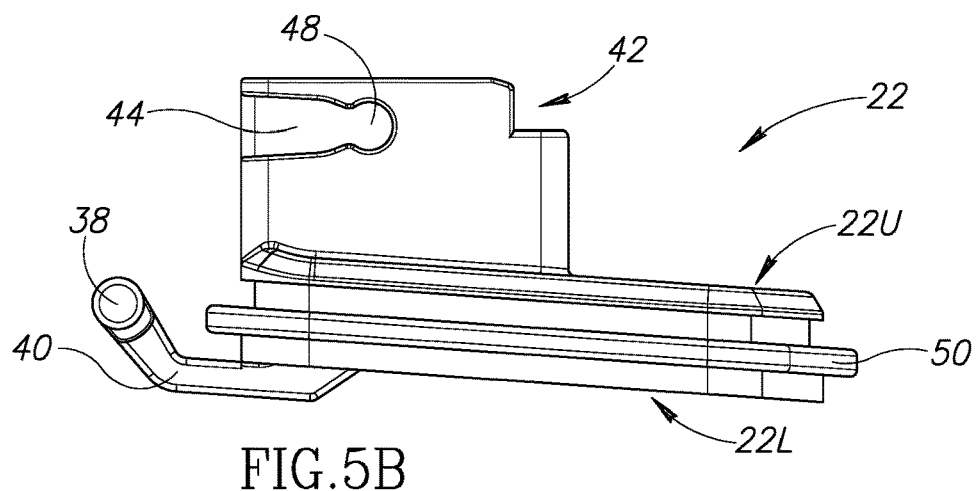
FIG. 5B illustrates a side view of the sealing member of FIG. 5A.
Figure 5C:
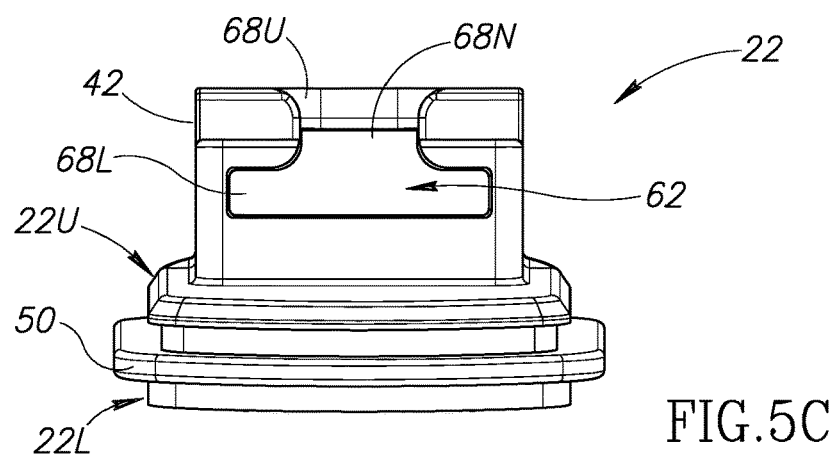
FIG. 5C illustrates a front view of the sealing member of FIG. 5A.
Figure 13:
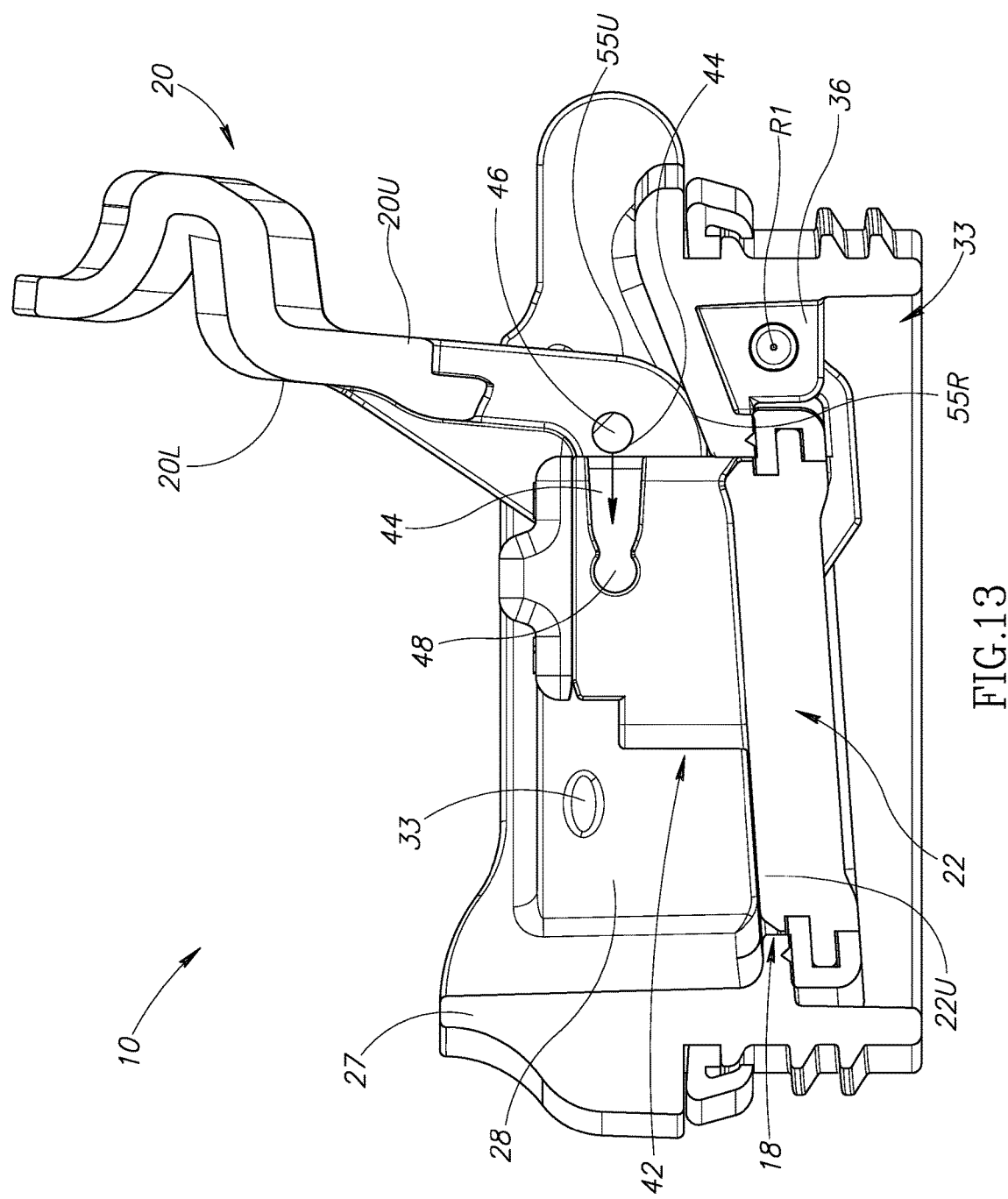
FIG. 13 illustrates a cross-sectional side view of the lid assembly of FIG. 1 with the camming lever disengaged from the sealing member and the sealing member in the sealed position.

The sealing member 22 shown in FIGS. 5A, 5B and 5C has a sealing member upper portion 22U that is sized and shaped to snuggly fit within the drinking aperture 18. A lower portion 22L of the sealing member 22 has a larger size than the upper portion 22U to cover and seal the drinking aperture 18 from below by sealing engagement with the partition lower surface 35 of the lower portion 16 which extends around the perimeter of the drinking aperture. The lower portion 16 is provided with spaced-apart, downwardly projecting, sealing member flanges or attachment portions 36 (see FIG. 4B) to which the sealing member 22 is pivotally attached for rotational movement of the sealing member between sealed and unsealed positions with respect to the drinking aperture 18. The sealing member attachment portions 36 each include an aperture 37 which rotatably receives therein a corresponding one of two laterally outward extending pivot pins 38 of the sealing member 22, as shown in FIGS. 8, 10 and 13. Each of the pivot pins 38 is attached to a rearward end of an arm 40 which projects rearwardly from the lower portion 22L of the sealing member 22. The sealing member attachment portions 36 and the sealing member 22 may instead be constructed in other manners to provide rotational attachment of the sealing member 22 to the lid main body 12 so as to selectively seal and unseal the drink aperture 18.

An attachment element 42 of the sealing member 22 projects upwardly from the sealing member upper portion 22U. Left and right axle insertion openings 44 are provided on opposite sides of the axle attachment element 42 for receiving, respectively, left and right coaxial first cam axles 46 of the camming lever 20 therethrough for assembly of the camming lever and the sealing member. The axle insertion openings 44 each have a tapered rearwardly facing mouth portion to facilitate easy insertion of the corresponding first cam axles 46 during assembly with the sealing member 22, as shown in FIGS. 5A, 5B, 8, 10 and 13. The left and right axle insertion openings 44 lead respectively to a left and a right coaxial and transversely oriented axle attachment chamber or receiver 48 that is sized and shaped to removably receive and securely rotatably retain a corresponding cam axle 46 of the camming lever 20 therein in a snap-fit relationship allowing the camming lever to rotate when a rotational force is applied to the camming lever by a user. The lower portion 22L of the sealing member 22 may have a peripherally extending flange portion 50 with a wider width than the drinking aperture 18. The flange portion 50 may support an elastically deformable gasket 52 (see FIGS. 8, 9 and 10) that forms a fluid-tight seal with the partition lower surface 35 of the lower portion 16 of the lid main body 12 which extends around the perimeter of the drinking aperture 18 when the sealing member 22 is in the sealed position. A channel guide portion 62 extends longitudinally through the attachment element 42.

Figure 6A:
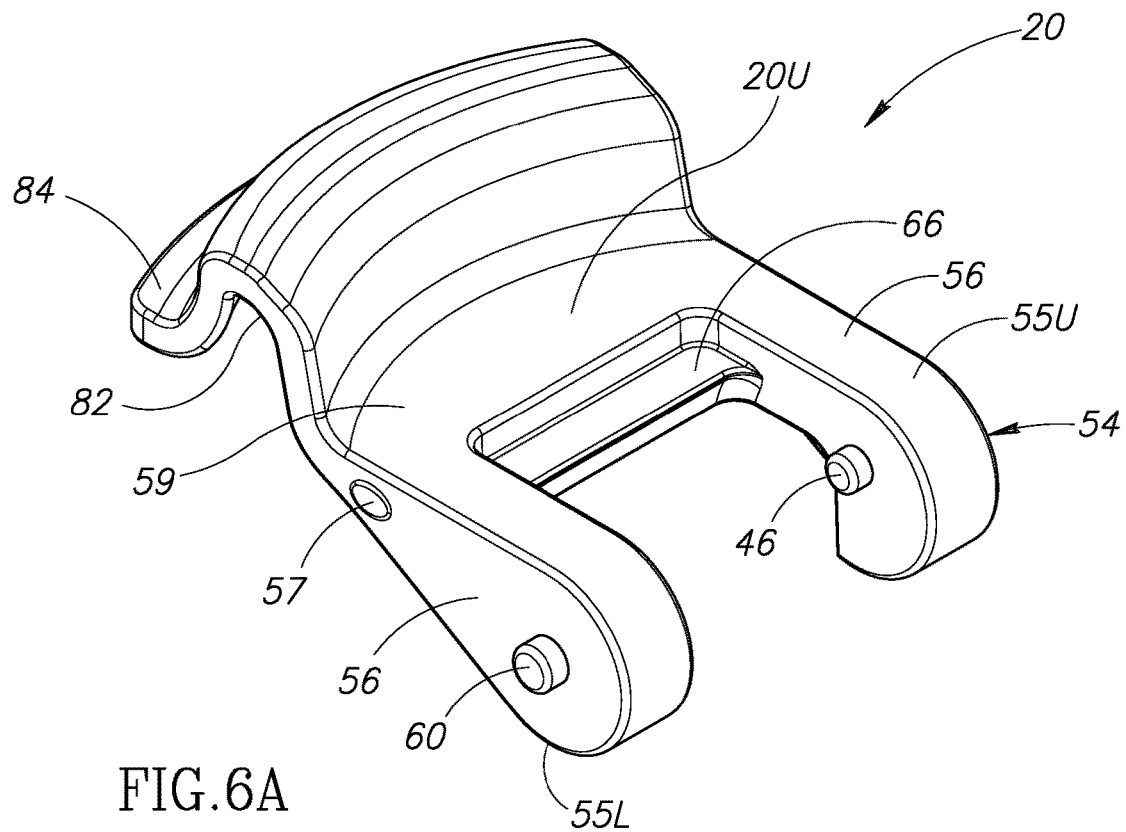
FIG. 6A illustrates a top perspective view of a camming lever of the lid assembly of FIG. 1.
Figure 6B:
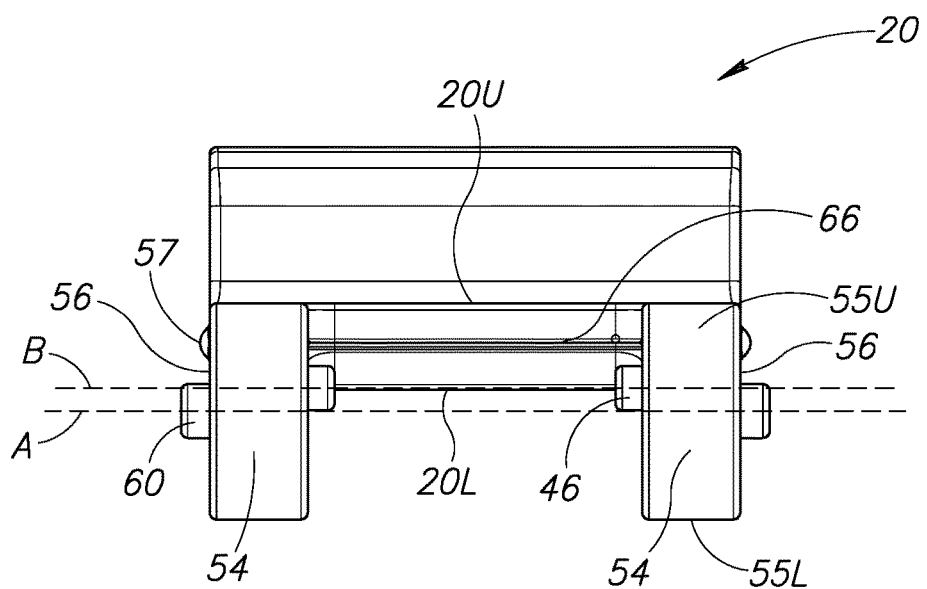
FIG. 6B illustrates a rear view of the camming lever of FIG. 6A.
Figure 6C:
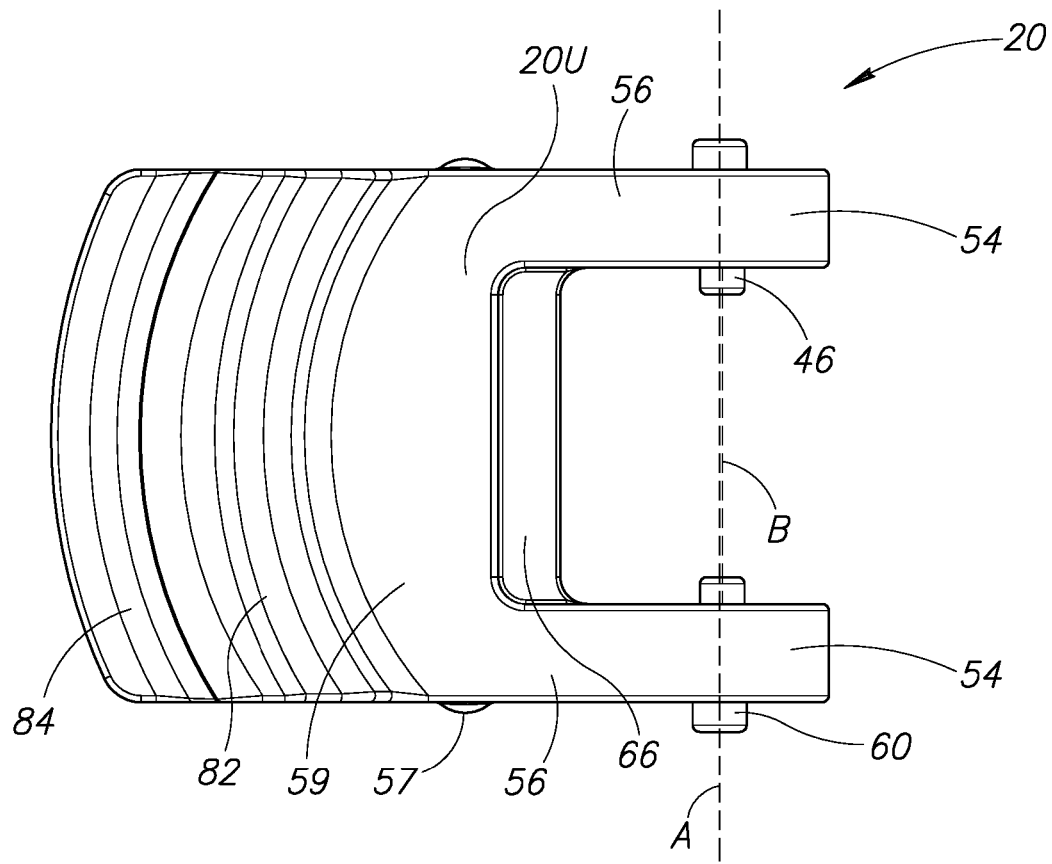
FIG. 6C illustrates a top plan view of the camming lever of FIG. 6A.
Figure 6D:
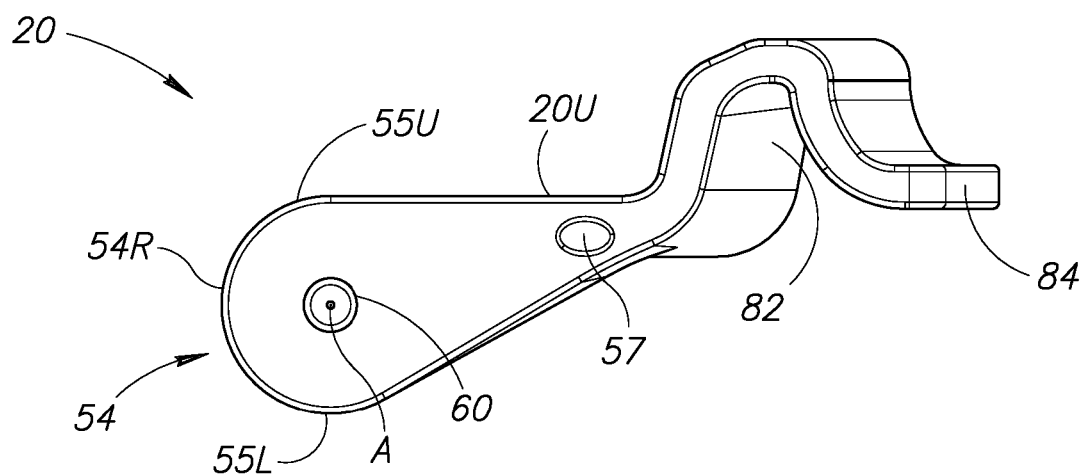
FIG. 6D illustrates a side view of the camming lever of FIG. 6A.

The camming lever 20 has left and right generally rounded or circular-portion cam lobes 54 each disposed on an end of a corresponding one of left and right laterally spaced apart lever arms 56 which extend from a camming lever main body portion 59, as shown in FIGS. 6A and 6D. In the present embodiment, the lever arms 56 have a curved shape along their length. In some embodiments, the lever arm 56 may instead have a straight shape. The cam lobes 54 each have a rounded cam engagement surface 55 on a cam lobe outer peripheral surface. Each cam engagement surface 55 has an interface upper portion 55U and an interface lower portion 55L, as shown in FIGS. 6A and 6D. In the present embodiment, the camming lever main body portion 59 extends over and shields the drinking aperture 18 when the sealing member 22 is in the sealed position with the drinking aperture closed, as shown in FIGS. 6B and 6C, serving as a cover for the drinking aperture. A protuberance 57 may be provided on one or both laterally outward sides of the camming lever main body portion 57 that engages with a corresponding first recess 31 on a corresponding one of the sidewalls 28 at or near the rearward end of the lid main body 12 opposite to the drinking lip 27 to help retain the camming lever 20 in the unsealed position with the drinking aperture 18 open, as shown in FIGS. 8 and 9. A second recess 33 may be provided on one or both of the sidewalls 28 at or near the forward end of the lid main body 12 with which a corresponding one of the protuberances 57 engages to help retain the camming lever 20 in the sealed position, shown in FIGS. 10 and 11. In some embodiments, the lever arms 56 may have a different shape, such as a narrow shaft or shafts projecting from the cam lobes 54. A soft over-mold may be provided around all or part of a peripheral surface of the lever arms 56 to help prevent abrasion between the lever arm and the lid main body 12.

The left and right first cam axles 46 each project laterally inward from an inward side of a corresponding one of the left and right cam lobes 54 and is cylindrical in cross-section. Left and right coaxial second cam axles 60 project laterally outward from an outward side of a corresponding one of the left and right cam lobes 54 and serve as retainer members or pins. The second cam axles 60 are both located on a center axis A, and the first cam axles 46 are both located on a center axis B about which the camming lever 20 rotates relative to the sealing member 22 with the cam lobes 54 in sliding engagement with the portion upper surface 29. Axis A of the second cam axles 60 is substantially parallel to but vertically offset below the axis B of the first cam axle 46 and the sealing member 22 when in the orientation shown in FIG. 6B. When the camming lever 20 is attached to the sealing member 22, the axis B of the first cam axles 46 is coaxial with the axis of the axle receiver 48 of the sealing member 22. When the camming lever 20 is rotated forward to the first position as shown in FIGS. 10 and 11 where the drink aperture 18 is closed, the axis B of the first cam axles 46 is above and slightly rearward of the axis A of the second cam axles 60 (shown schematically in FIG. 11). When the camming lever 20 is rotated rearward to the second position shown in FIGS. 8 and 9 where the drink aperture 18 is open, the axis B is more rearward of and below axis A. When the camming lever 20 is moved to the first position, the axis A of the second cam axles 60 is located at a first longitudinal position along the elongated slot 30. When the camming lever 20 is moved to the second position, the axis A is located at a second forward longitudinal position along the elongated slot 30 that is closer to the forward end of the upper portion 14 than when the camming lever is in the first position.

In some embodiments, the camming lever 20 may have a single first cam axle 46 transversely extending fully between and connecting the inwardly facing surfaces of the cam lobes 54 instead of the pair of first cam axles described above. The single first cam axle 46 may attach to the attachment element 42 by insertion into a single axle insertion opening 44 and snap-fitting into a single axle attachment receiver 48, each of the single axle insertion opening and the single axle attachment receiver extending fully between left and right sides of the attachment element 42 of the sealing member 22.

Throughout the movement of the camming lever 20 between the first and second positions of the cam lever, the second cam axles 60 of the camming lever are rotatably engaged within the slots 30 which restrict upward or downward movement of the second cam axles 60. The axis A of the second cam axles 60 therefore remains at substantially the same distance above the partition upper surface 29 while rotation of the camming lever 20 causes forward and rearward and upward and downward movement of the cam axis B of the second cam axle 60 which produces raising and lowering of the sealing member 22 to which the first cam axles 46 are rotatably attached. A locking shelf 66 of the camming lever 20 has an upwardly facing surface between the cam lobes 54 for receiving a lock element described below. The locking shelf 66 may extend away from the camming lever main body portion 59 and toward the cam lobes 54, as shown in FIGS. 6A and 6C.

Figure 7A:
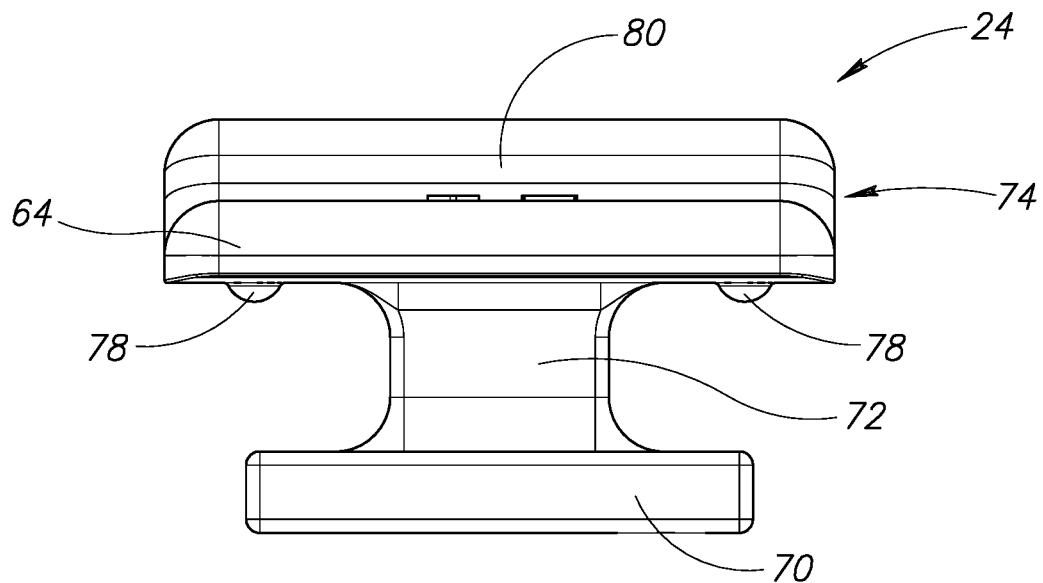
FIG. 7A illustrates a front view of a locking member of the lid assembly of FIG. 1.
Figure 7B:
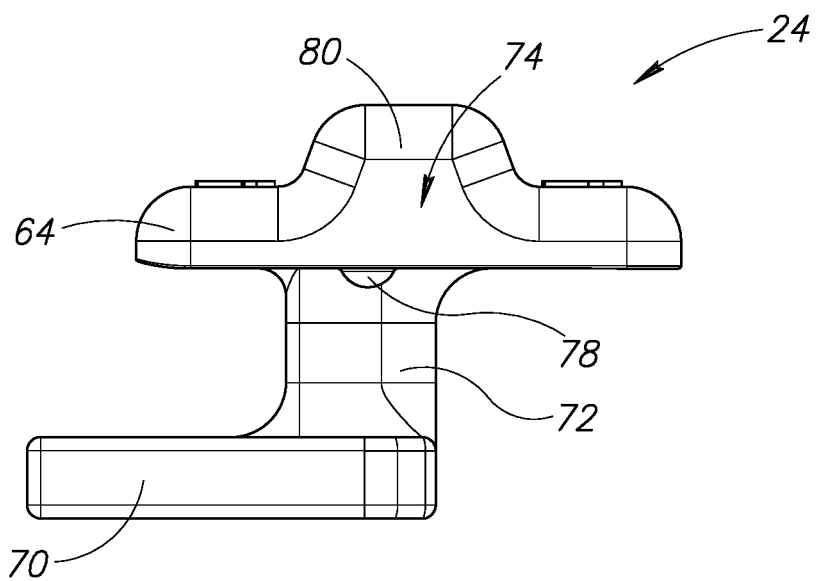
FIG. 7B illustrates a side view of the locking member of FIG. 7A.

The locking member 24 is slidably movable back and forth through the guide channel portion 62 of the attachment element 42 of the sealing member 22 to selectively secure and unsecure the sealing member 22 in the sealed position. The locking member 24 includes a locking member main body 74 at an upper portion thereof, a medial portion 72 extending downward from the locking member main body, and a guide plate 70 at a lower end of the medial portion 72, as shown in FIGS. 7A and 7B. A protuberance 78 may project or protrude downwardly from the locking member main body 74 on one or both lateral sides of the medial portion 72. An interface portion 80 is provided on an upper surface of the locking member main body 74 for engagement by a finger of the user to facilitate the user moving the locking member 24 back and forth relative to the attachment element 42. The interface portion 80 may include features for manual operation of the locking member 24, such as an upwardly projecting ridge or protrusion, and/or a textured surface, by way of non-limiting example.

When the camming lever 20 is in the first (forward) position (i.e., the lower surface 20L of the camming lever is proximate to the forward upper surface portion of the upper portion 14), the locking member 24 may be slidably moved along the guide channel portion 62 between a rearward unsecured position where the camming lever 20 is freely rotatable (see FIG. 10) and a forward secured position where the camming lever is secured in place (see FIG. 12), as described below. A locking element 64 may project outwardly from a forward side of a locking member main body 74 (see FIG. 7B) disposed on an upper portion of the attachment element 42.

Figure 12:
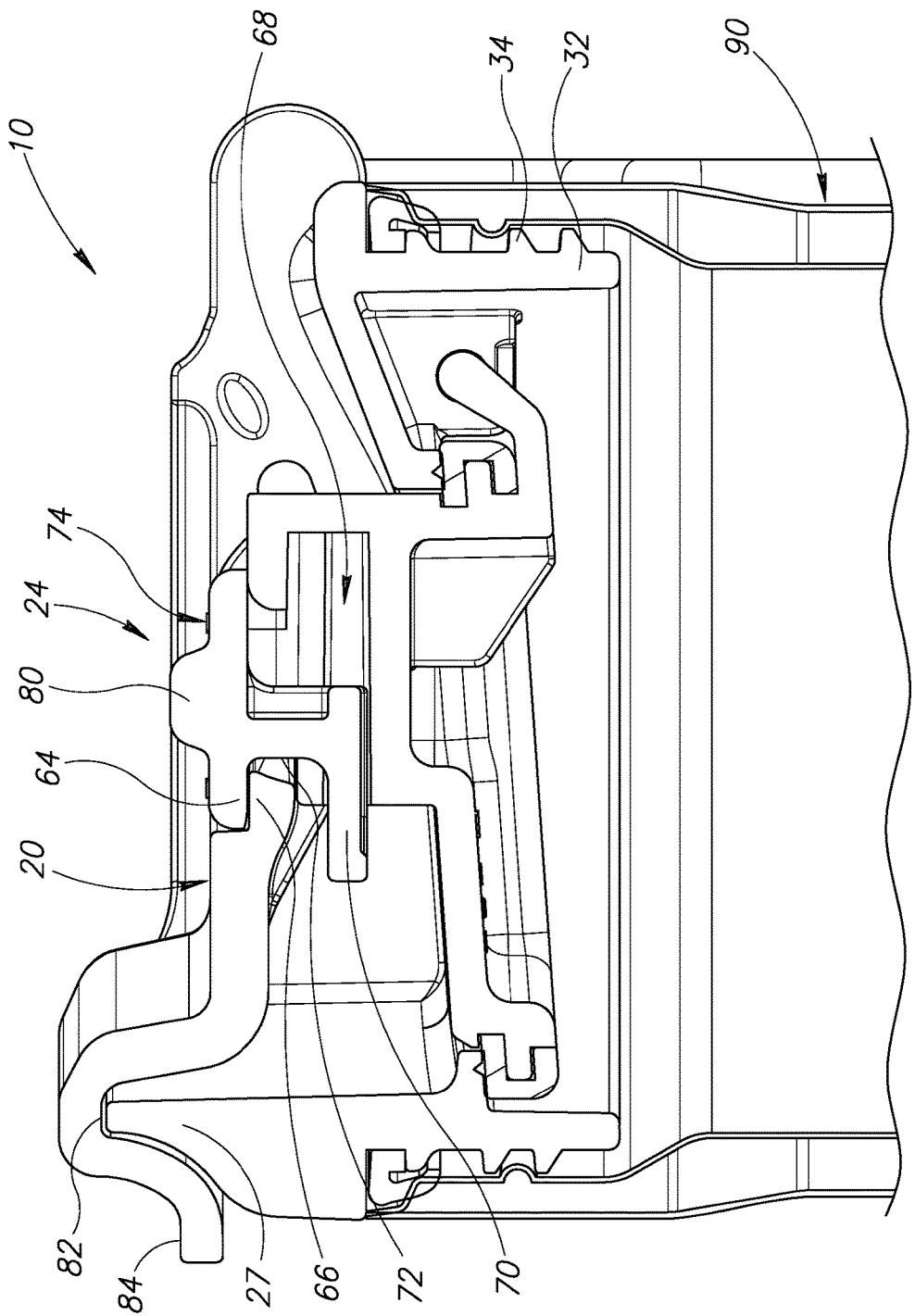
FIG. 12 illustrates the second cross-sectional side view of the lid assembly FIG. 11 attached to a drinking vessel and with the locking member in a locked position.

The guide channel portion 62 includes a forwardly opening guide track 68, shown in FIG. 12, through which the guide plate 70 and the medial portion 72 of the lock member 24 may slidably move. The guide track 68 has an upside-down T-shaped cross-section and extends in the horizontal direction between the forward and rearward end of the upper portion 14, as shown in FIG. 5C. The guide plate 70 may have a substantially flat shape sized and shaped to fit snuggly within a lower portion 68L of the guide track 68 (see FIGS. 5C and 10) thereby limiting lateral and or vertical movement of the locking member 24 relative to the sealing member 22. The medial portion 72 of the locking member 24 extends upwardly from an upper surface of the guide plate 70 and through a neck portion 68N of the guide track 68 and joins the guide plate 70 with the locking member main body 74. A portion of the attachment element 42 is positioned or sandwiched between a lower surface of the locking member main body 74 and an upper surface of the guide plate 70.

An upper surface of the attachment element 42 of the sealing member 22 may be provided with one or more recesses 76, shown in FIG. 5A, sized and shaped to engage with the downwardly protruding protuberance 78 on the lower surface of the locking member main body 74 to help secure the position of the locking member 24. The one or more recesses 76 may be a pair of recesses offset toward lateral sides of an upper guide track portion 68U (see FIGS. 5A and 5C) on the upper surface of the attachment element 42. Each of the recesses 76 may comprise an elongated channel or groove having a medial portion 76M connecting a forward end portion 76F and a rearward end portion 76R each having a relatively wider width than the narrow medial portion. The protuberances 78 slide back and forth along the medial portion 76M between the end portions 76R and 76F to position the locking member 24 in the unsecured and secured position, respectively. Each of the corresponding protuberances 78 may snuggly engage with the forward end portion 76F or the rearward end portion 76R of the recesses 76 to resist longitudinal movement of the lock member 24 when in the secured position or the unsecured position, respectively.

The camming lever 20 may include a lip cover portion 82 extending outward from the main body portion 59 for covering or protecting the drinking lip 27 of the lid main body 12. That is, when the camming lever 20 is in the first position, the lip cover portion 82 may be immediately above and adjacent to or abut the drinking lip 27 to prevent contamination thereof. The lip cover portion 82 may have a lower surface with a concave shape sized and shaped to conform to and/or surround at least a portion of the upwardly projecting profile of the drinking lip 27, as shown in FIG. 10. The concave shape of the lip cover portion 82 may curve to follow the curved cross-sectional shape of the drinking lip 27. The camming lever 20 may include an outwardly projecting brim 84 at its free end with a downwardly facing surface that is exposed when the camming lever 20 is in the first position to facilitate engagement by the user for easy upward or rearward rotational movement of the camming lever away from the first position.

Assembly of the lid assembly 10 will now be described. First, the locking member 24 may be engaged with the attachment element 42 of the sealing member 22. The guide plate 70 and the medial portion 72 of the locking member 24 (see FIGS. 7A and 7B) are inserted into the forwardly opening guide track 68 with the lock element 64 projecting outwardly and away from the attachment element 42. The locking member 24 is pushed inwardly into the guide track 68 until each protuberance 78 engages with a corresponding one of the recesses 76. The optionally provided gasket 52 may also be fit onto the flange 50 of the lower portion 22L of the sealing member 22.

Second, with the attachment element 42 oriented toward the drinking aperture 18, the pivot pins 38 of the sealing member 22 are positioned between the sealing member attachment portions 36 on the lower portion 16 of the lid main body 12 so as to position the free ends of each of the pivot pins 38 for entry into one of the corresponding apertures 37 of the sealing member attachment portions 36. The pivot pins 38 may be resilient move outward when released to insert the pivot pins within the apertures 37 for rotatable attachment of the sealing member 22 to the lid main body 12. When the pivot pins 38 are inserted into the apertures 37, the sealing member 22 may rotate relative to the lid main body 12 about an axis R1, shown in FIGS. 8, 10 and 13, centered on the apertures 37 of the sealing member attachment portions 36. In such manner, the sealing member 22 is movable relative to the lid main body 12 along a circular arcuate rotational path centered on the axis R1 as the sealing member is rotated between the sealed and unsealed positions by rotation of the camming lever 20 between its first and second positions, respectively.

Third, the sealing member 22 is rotated to position the upper portion 22U of the sealing member 22 within the drinking aperture 18 such that the axle attachment element 42 extends upward through the drinking aperture and into the elongated recess 26 of the lid main body 12.

Fourth, each of the lever arms 56 are squeezed inwardly toward each other and inserted into the elongated recess 26 with each of the left and right second cam axles 60 respectively aligned to engage with a corresponding slot 30 on the left and right sidewall 28. When the lever arms 56 are released, the left and right second cam axles 60 engage with left and right slots 30 to attach the camming lever 20 to the lid main body 12. The second cam axles 60 of the camming lever 20 may slidably move along within the elongated slots 30 between forward and rearward positions, and the lever arms 56 may rotate about the axis A between the first and second positions.

Fifth, with the camming lever 20 moved to the rearward position and the sealing member 22 moved to the sealing position, each of the first cam axles 46 of the camming lever 20 are inserted into a corresponding rearwardly opening mouth of the axle insertion opening 44 of the sealing member 22 and snap-fitted into the axle attachment receiver 48. The camming lever 20 is retained to the lid assembly 10 via its direct attachment to the lid main body 12, and the sealing member 22 is retained in the elongated recess 26 via its attachment to the camming lever 20. The second cam axles 60 may freely rotate within the slots 30 relative to the lid main body 12. The lid assembly 10 being fully assembled, the camming lever 20 may be rotated back and forth between its first and second positions (i.e., between the first recesses 31 and the second recesses 33 located toward the drinking lip 27) to selectively transition the lid assembly between a sealed configuration and an unsealed configuration, as described below.

When the lid assembly 10 is in the sealed configuration, the sealing member 22 is in the sealed position sealing the drinking aperture 18 of the lid main body 12, as shown in FIGS. 10 and 11 (cross-sectional views substantially along the lines 10-10 and 11-11 of FIG. 3, respectively). The lever arms 56 of the camming lever 20 are positioned toward the drinking lip 27 of the lid main body 12 and extend above and cover the drinking aperture 18 shielding the drink aperture and the portion of the sealing member 22 sealing the drink aperture. The lower surface 20L of the camming lever 20 faces downward toward the partition upper surface 29. The lip cover portion 82 of the camming lever 20 surrounds and/or covers the drinking lip 27. The interface lower portion 55L of the cam engagement surface 55 of each cam lobe 54 contacts the portion of the partition upper surface 29 therebelow, as shown in FIG. 11 (cross-sectional view substantially along the line 11-11 of FIG. 3). When in the sealing position, the cam lobes 54 are in sliding engagement with the partition upper surface 29 simultaneous with the second cam axles 60 of the cam lobes 54 each being positioned at a first longitudinal position along the corresponding one of the elongated slots 30, as shown in FIG. 11. When the camming lever 20 is in this position, the camming lever is in its first position and the first cam axles 46 are centered along axis B at a position sufficiently above the interface lower portion 55L and the partition upper surface 29 that the sealing member 22 through its rotatable attachment to the first cam axles is held with the lower portion 22L thereof sealing the drinking aperture 18. That is, the axis B along which the first cam axles 46 are centered is offset above the axis A of the second cam axles 60. The first cam axles 46 position the attachment element 42 in a raised position above the partition upper surface 29 holding the sealing member upper portion 22U in a close-fit within the drinking aperture 18. The sealing member lower portion 22L is snuggly pressed against the partition lower surface 35 to form a fluid-tight seal, helping to retain heat and liquid within the drinking vessel 90 when the lid assembly 10 is attached thereto. Equipping the sealing member 20 with the elastically deformable gasket 52 on the lower portion 22L of the sealing member further aids in creating the fluid-tight seal.

When the lid assembly 10 is in the sealed configuration, the locking member 24 may be moved back and forth between the forward position securing the camming lever 20 in the first position, and the rearward position at which the camming lever is freely rotatable between the first position and the second position. When the locking member 24 is in the forward position, a downwardly facing surface of the lock element 64 opposes an upwardly facing surface of the lock shelf 66 preventing upward or rearward rotation of the camming lever 20, as shown in FIG. 12. When the locking member 24 is in the rearward position, shown in FIG. 10, the lock element 64 is displaced from the lock shelf 66 and does not block the camming lever 20 from being rotated between the first position and the second position. Positioning the locking element 64 to engage the locking shelf 66 secures the sealing member 22 in the sealed position and helps to prevent unintended opening of the drinking aperture 18 or spilling of beverage from the attached drinking vessel 90.

When the lid assembly 10 is in the unsealed configuration, the sealing member 22 is in the unsealed position spaced apart from and below the partition lower surface 35 of the lower portion 16 of the lid main body 12, thus opening the drinking aperture 18, as shown in FIG. 8 (cross-sectional view substantially along the line 8-8 of FIG. 2) and FIG. 9 (cross-sectional view substantially along the line 9-9 of FIG. 2). The lever arms 56 of the camming lever 20 are positioned toward the elevated portion 25 at the rearward end of the elongated recess 26 of the lid main body 12 when the camming lever is in the second position. When the lever arms 56 are in this position, the protuberances 57 may engage with the second recesses 31 near the rearward end of the lid main body 12 to help retain the camming lever in its second position with the sealing member 22 in the unsealed position. The upper surface 20U of the camming lever 20 faces the elevated portion 25 of the lid main body 12 when the camming lever 22 is in its second position, and the interface upper portion 55U of each cam lobe 54 is in sliding engagement with or positioned slightly above the partition upper surface 29. During rotation of the camming lever 20 from the first position to the second position, the second cam axles 60 of the cam lobes 54 may move forward along the elongated slots 30 to a second longitudinal position forward of the first longitudinal position. The first cam axles 46 are centered along axis B at a position sufficiently close to the partition upper surface 29 that the sealing member 22 through its rotatable attachment to the cam axle is held at a position spaced sufficiently below that the upper portion 22U thereof is spaced away from and below the drinking aperture 18 thereby allowing liquid from the drinking vessel 90 to flow through the drinking aperture when the lid assembly 10 is attached thereto.

The movement of the camming lever 20 back and forth between the first and second positions, and respectively, the resulting movement of the sealing member 22 back and forth between the sealed and unsealed positions sealing and unsealing the drinking aperture 18, as described above, are shown schematically in FIGS. 8, 9, 10 and 11. In FIGS. 8 and 9, the lid assembly is shown schematically with the camming lever 20 in the second position with the sealing member 22 in the unsealed position and the drinking aperture 18 open allowing liquid from the drinking vessel 90 to flow through the drinking aperture when the lid assembly 10 is attached thereto. In the second position of the camming lever 20, the axis B of the first cam axles 46 is below and rearward of axis A of the second cam axles 60, as viewed from the side of the lid assembly 10.

Rotation of the camming lever 20 in the counterclockwise direction (when viewed from a left side of the lid assembly 10 as seen in FIG. 8) from the second position toward the first position (as seen in FIG. 10) causes the second cam axles 60 to rotate counterclockwise and move rearward within the elongated slots 30. At the same time, the counterclockwise movement of the camming lever 20 causes the axis B of the of the first cam axle 46 to move upward and lift the sealing member 22 upward by applying a lifting force thereon through the attachment element 42 of the sealing member to move the sealing member upper portion 22U upward toward engagement with the partition lower surface 35 surrounding the drinking aperture 18.

Further counterclockwise rotation of the camming lever 20 to the first position shown in FIGS. 10 and 11 causes the second cam axles 60 to continue rotating counterclockwise and move rearward in the elongated slots 30 toward the rearward end of the lid main body 12. At the same time, this movement causes further upward movement of the axis B of the first cam axles 46 to move upward and lift the sealing member 22 upward by applying a lifting force thereon through the attachment element 42 of the sealing member to move the sealing member upper portion 22U into sealing engagement with the partition lower surface 35 surrounding the drinking aperture 18. Simultaneously, this movement causes the axis B of the first cam axles 46 to move forward and pass over the axis A of the second cam axles 60 providing a cam over center movement which, when the camming lever 20 is in the first position of FIGS. 10 and 11, tends to resist unintentional clockwise rotation of the cam lever center and hold the sealing member upper portion 22U in fluid-tight sealing engagement with the partition lower surface 35.

The motions described are reversed when the camming lever 20 is moved from the first position to the second position.

When the camming lever 20 is attached to the sealing member 22 and the lid main body 12 and operable to move the sealing member between the sealed position and the unsealed position, the lid assembly 10 is in a use configuration in which the user may selectively seal and unseal the drinking aperture 18. In the use configuration, the lid assembly 10 is assembled with second cam axles 60 engaged within the elongated slots 30, the first cam axles 46 engaged within the axle attachment receiver 48, and the pivot pins 38 engaged within the sealing member attachment portions 36. The camming lever 20 may be disengaged from the sealing member 22 to transition the lid assembly 10 to a cleaning configuration in which the constituent parts of the lid assembly may be more thoroughly cleaned.

Figure 14:
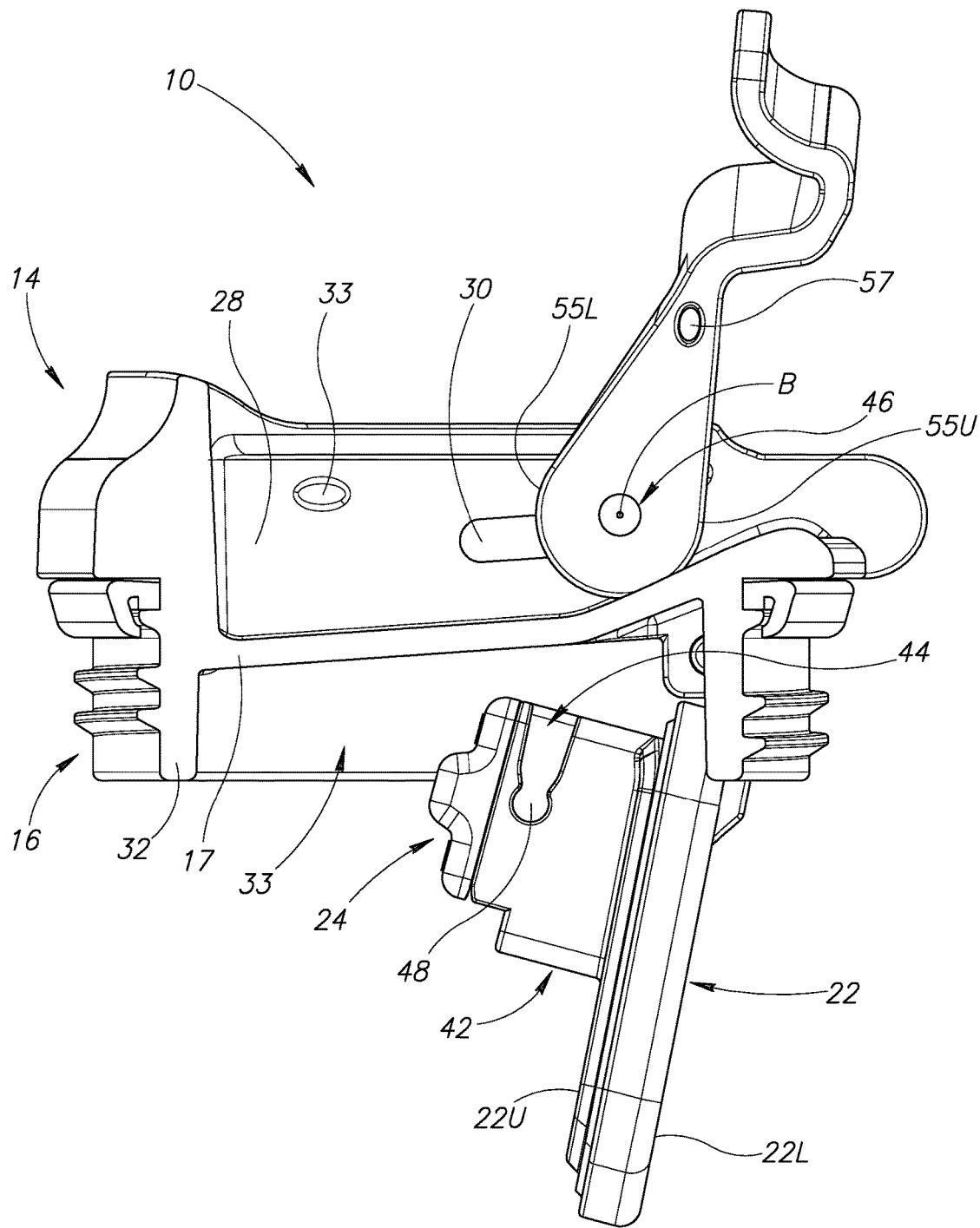
FIG. 14 illustrates a cross-sectional side view of the lid assembly of FIG. 1 with the camming lever disengaged from the sealing member and the sealing member removed from the drinking aperture of the lid assembly.

In the cleaning configuration, a sufficient force may be applied to the camming lever 20 in a rearward direction toward the rearward end of the lid main body 12 to disengage the first cam axles 46 from the axle attachment receiver 48. Thereafter, the first cam axles 46 may be removed from the axle insertion openings 44, thereby disengaging the camming lever 20 from the sealing member 22, as shown in FIG. 13. With the camming lever 20 disengaged from the sealing member 22, the sealing member is freely rotatable downward about a circular arcuate rotational path centered on the axis R1 and may be rotated counterclockwise (when viewed from the left side of the lid assembly 10 as seen in FIG. 13) to a downward position where the attachment element 42 is withdrawn from the drinking aperture 18, as shown in FIG. 14. Simultaneously, the second cam axles 60 are retained in the elongated slots 30 allowing the camming lever 20 to move back and forth in the forward-rearward direction of the slots 30. The second cam axles 60 may be moved to an elevated rearmost end 30R of the elongated slots 30 and the camming lever 20 may be rotated clockwise (when viewed from the left side) to expose the drinking aperture 18. In the cleaning configuration, beverage in the attached drinking vessel 90 may be quickly evacuated through the drinking aperture 18 and the constituent parts of the lid assembly 10 may be thoroughly cleaned without removing the lid assembly from the drinking vessel. Further, the constituent parts of the lid assembly 10 in the cleaning configuration may be thoroughly cleaned when removed from the drinking vessel 90. After cleaning, the camming lever 20 may be reengaged with the sealing member 22 to transition the lid assembly 10 back to the use configuration.

Figure 15:
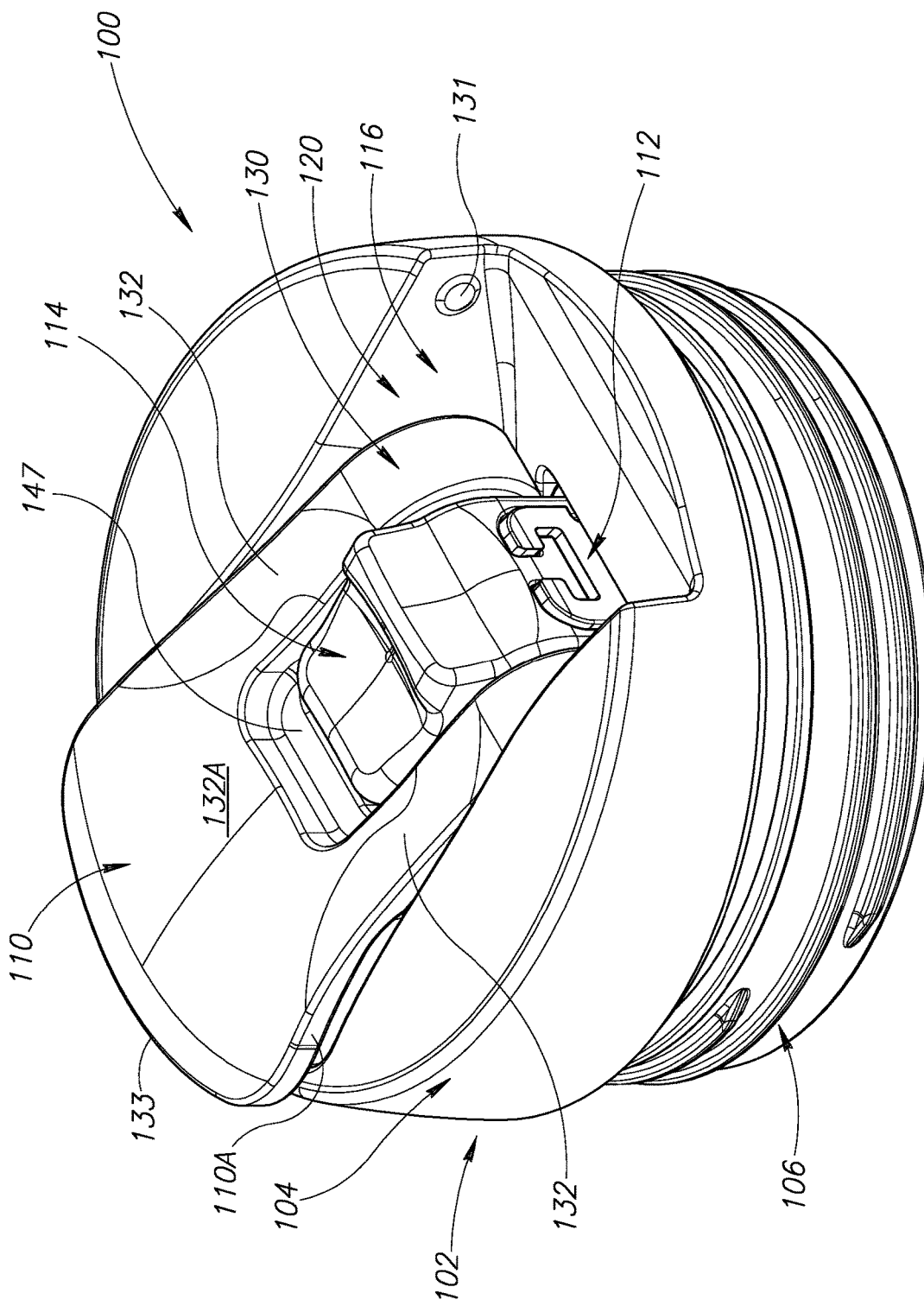
FIG. 15 illustrates a first top perspective view of a lid assembly according to a second embodiment with a camming lever in a forward position.
Figure 16:
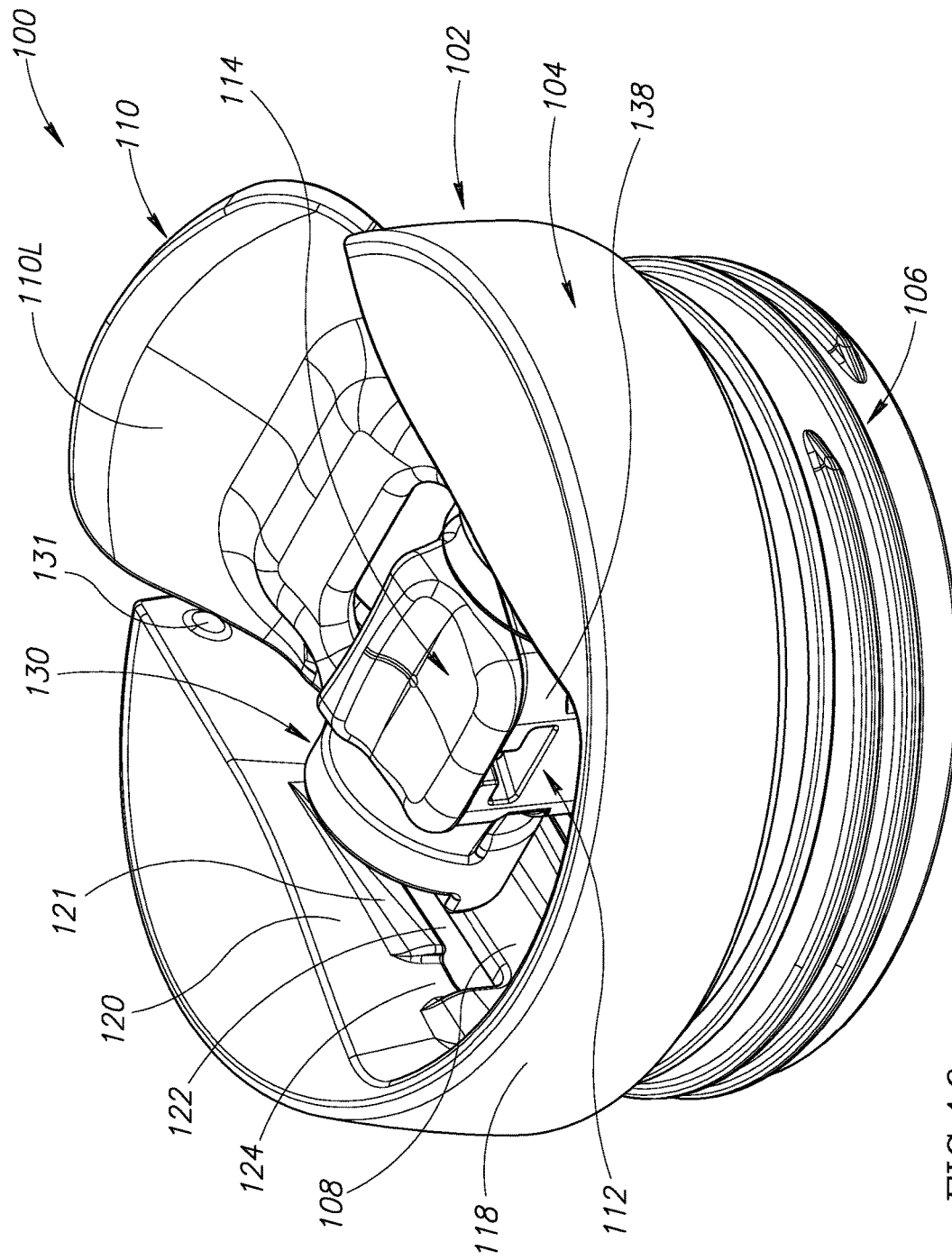
FIG. 16 illustrates a second top perspective view of the lid assembly of FIG. 15 with the camming lever in a rearward position.

A lid assembly 100 according to a second embodiment is shown in FIGS. 15 and 16. The lid assembly 100 has a substantially cylindrical lid main body 102 having an upper portion 104 and a lower portion 106. The lid main body 102 includes an elongated drinking aperture 108 through which liquid may flow. A camming lever 110 is operable to selectively seal and unseal a sealing member 112 to close and open, respectively, the drinking aperture 108. A locking member 114 is operable to selectively secure and unsecure the position of the camming lever 110. The lid assembly 100 has some operational and structural features that are substantially similar to the lid assembly 10, the description of which is omitted for brevity having already been included above.

Figure 17:
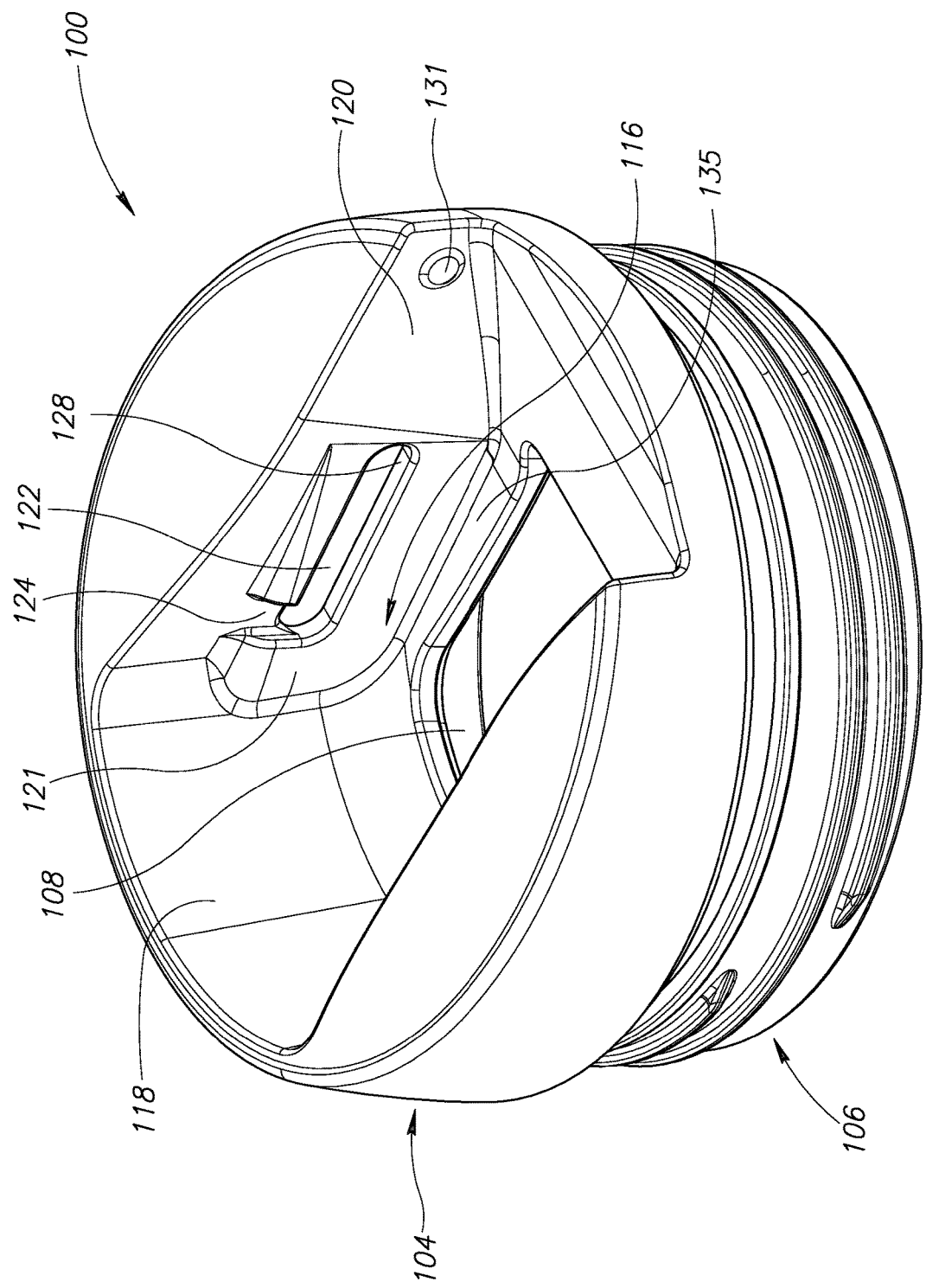
FIG. 17 illustrates a top perspective view of a lid main body of the lid assembly of FIG. 15.
Figure 18:
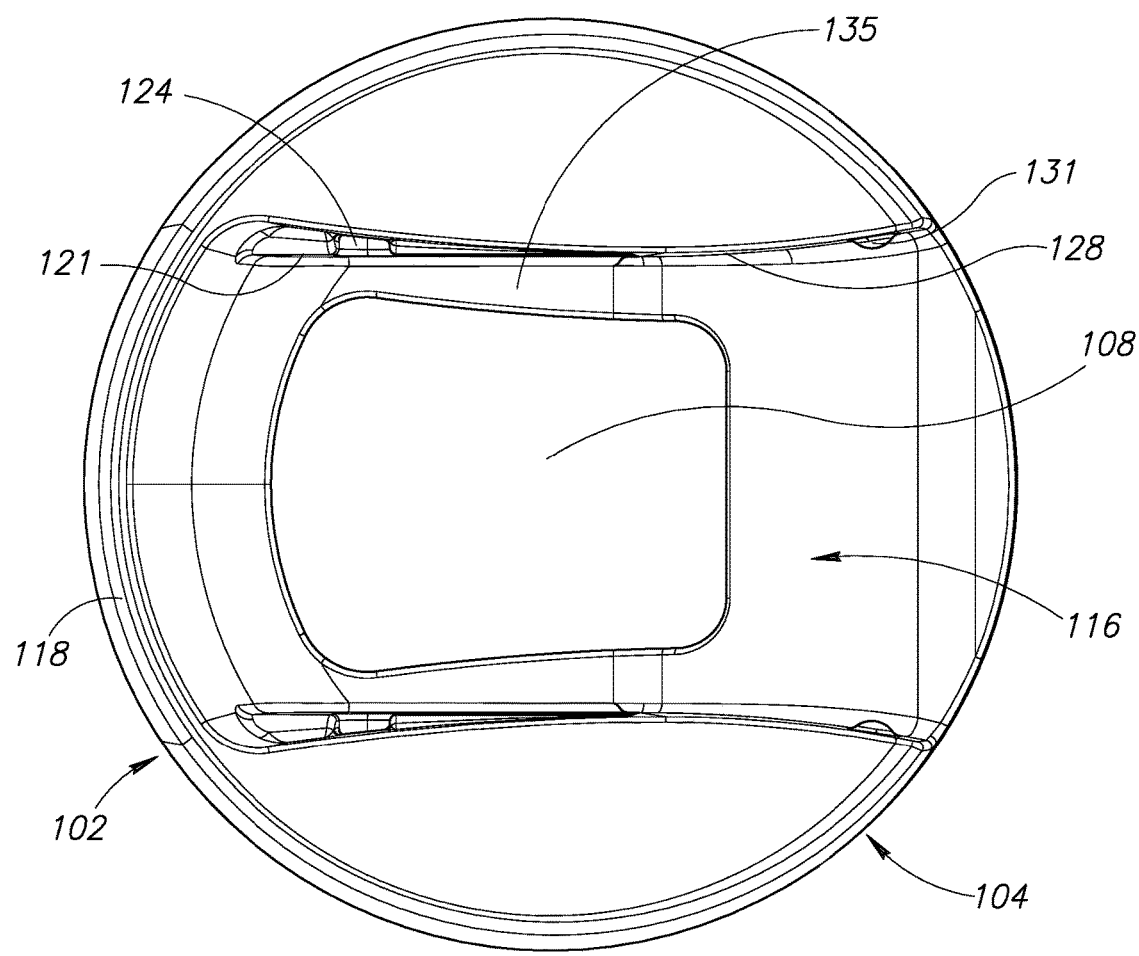
FIG. 18 illustrates a top plan view of the lid main body of FIG. 17.

The main body 102 may include a first elongated recess 116 extending in a horizontal direction between a forward end and a rearward end along the upper portion 104, as shown in FIGS. 17 and 18. The first elongated recess 116 terminates at a drinking lip 118 at the forward end, which projects upwardly from a forward end of the drinking aperture 108 and which may have a curved shape following the peripheral shape of the lid main body 102. The first elongated recess 116 includes left and right sidewalls 120 projecting upwardly above the drinking aperture 108 on opposite sides of the drinking aperture. Referring to FIG. 17, each of the left and right sidewalls 120 may include a laterally extending panel portion 121 having a greater thickness than other portions of the sidewalls. A second elongated groove or recess 122 recesses inwardly into each of the panel portions 121 of the left and right opposing sidewalls 120, each second recess 122 having a length extending in the longitudinal direction along the opposing left and right sidewalls. Each elongated second recess 122 may have an L-shape including an upwardly opening second axle insertion opening 124 for receiving a second cam axle 126 of the camming lever 110 into the elongated recess for assembly and disassembly of the camming lever and the lid main body 102. The second axle insertion openings 124 may be located toward the forward end of the each second recess 122; however, other locations are contemplated. Each elongated second recess 122 may terminate at a closed end portion 128 located toward a rearward end thereof preventing further rearward longitudinal movement of the second cam axles 126 within the second recess. The lower portion 106 and downwardly extending cavity therein have a structure substantially similar to the lid main body 12 described above, so illustration and description thereof is omitted.

Figure 20A:
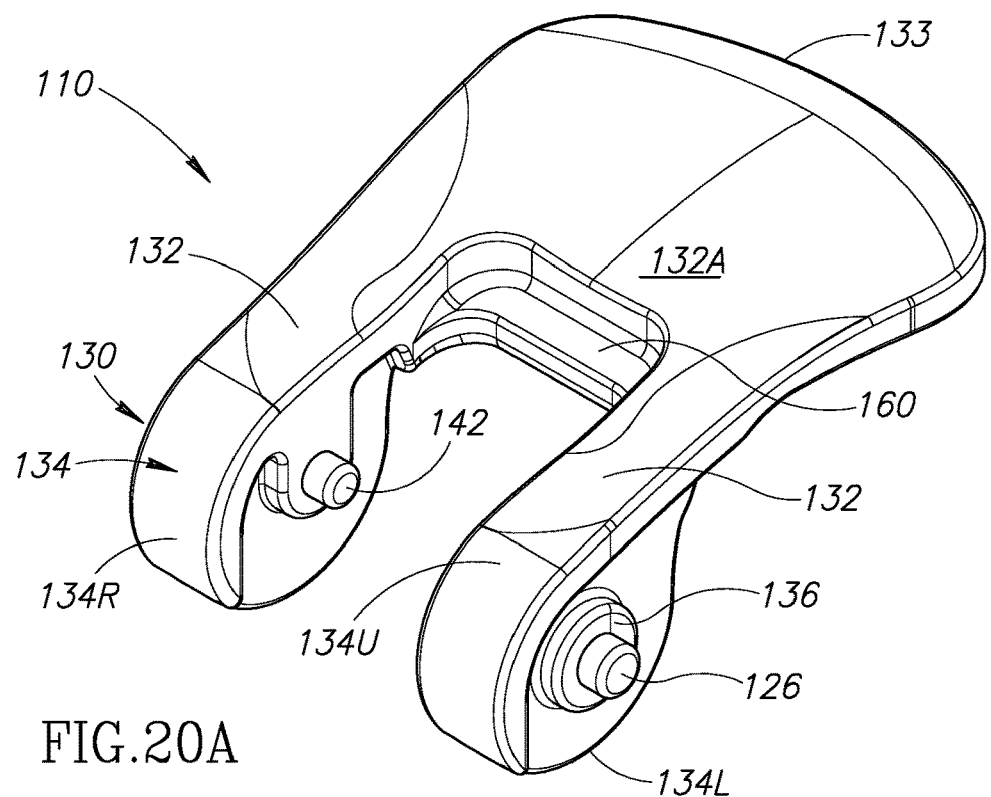
FIG. 20A illustrates a top perspective view of a camming lever of the lid assembly of FIG. 15.
Figure 20B:
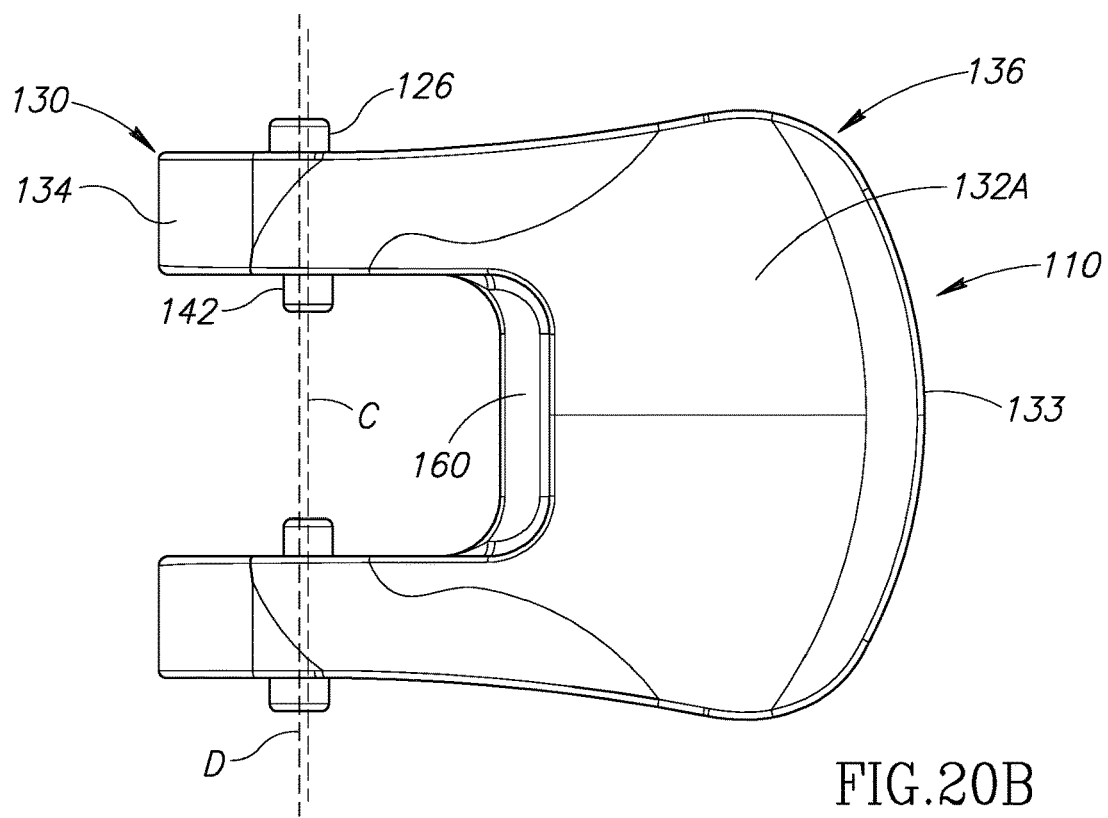
FIG. 20B illustrates a top plan view of the camming lever of FIG. 20A.
Figure 20C:
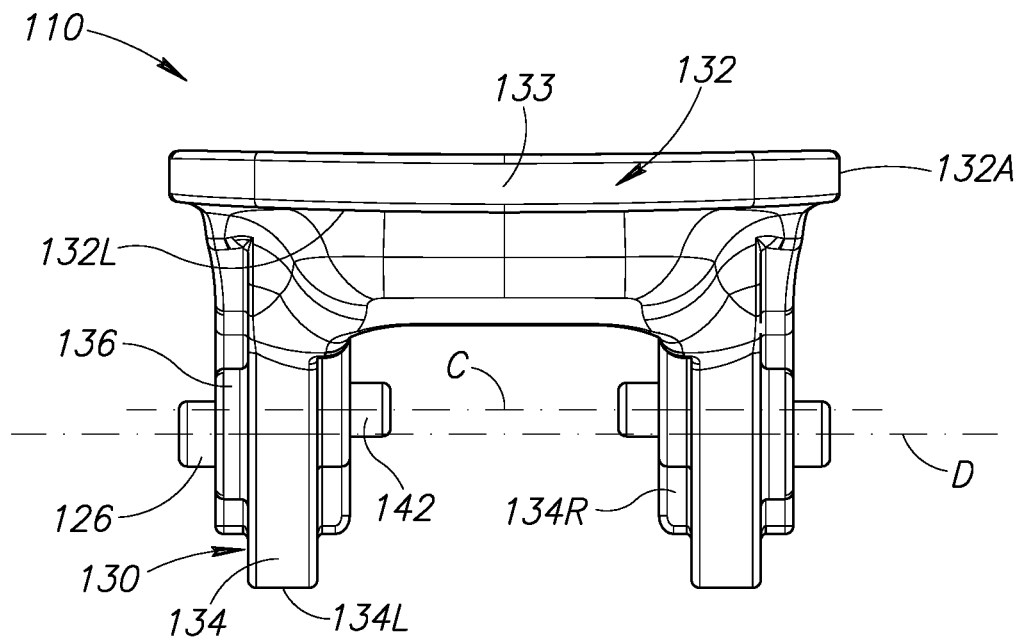
FIG. 20C illustrates a front view of the camming lever of FIG. 20A.
Figure 23A:
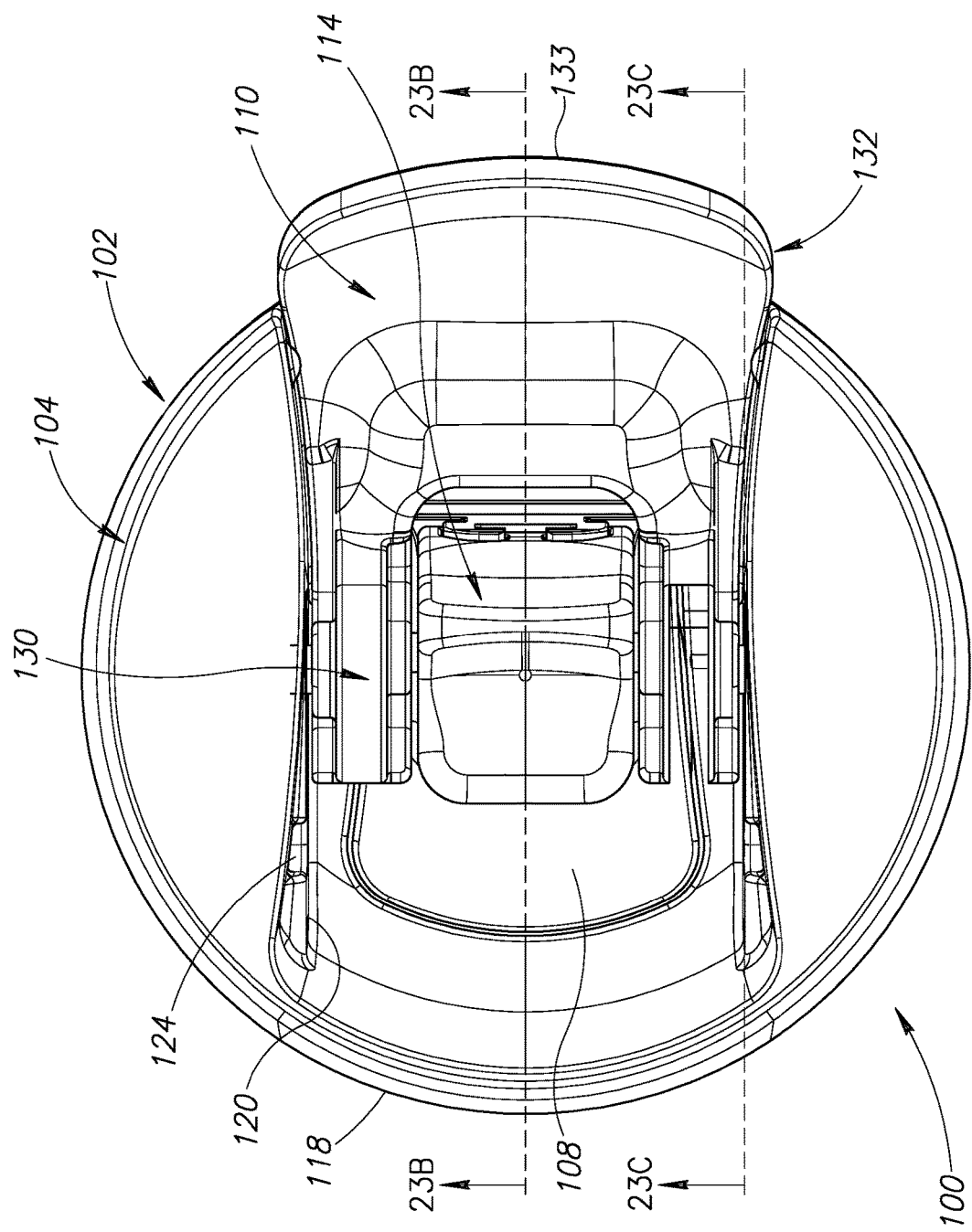
FIG. 23A illustrates a top plan view of the lid assembly of FIG. 15 with the camming lever and a rearward position.
Figure 24A:
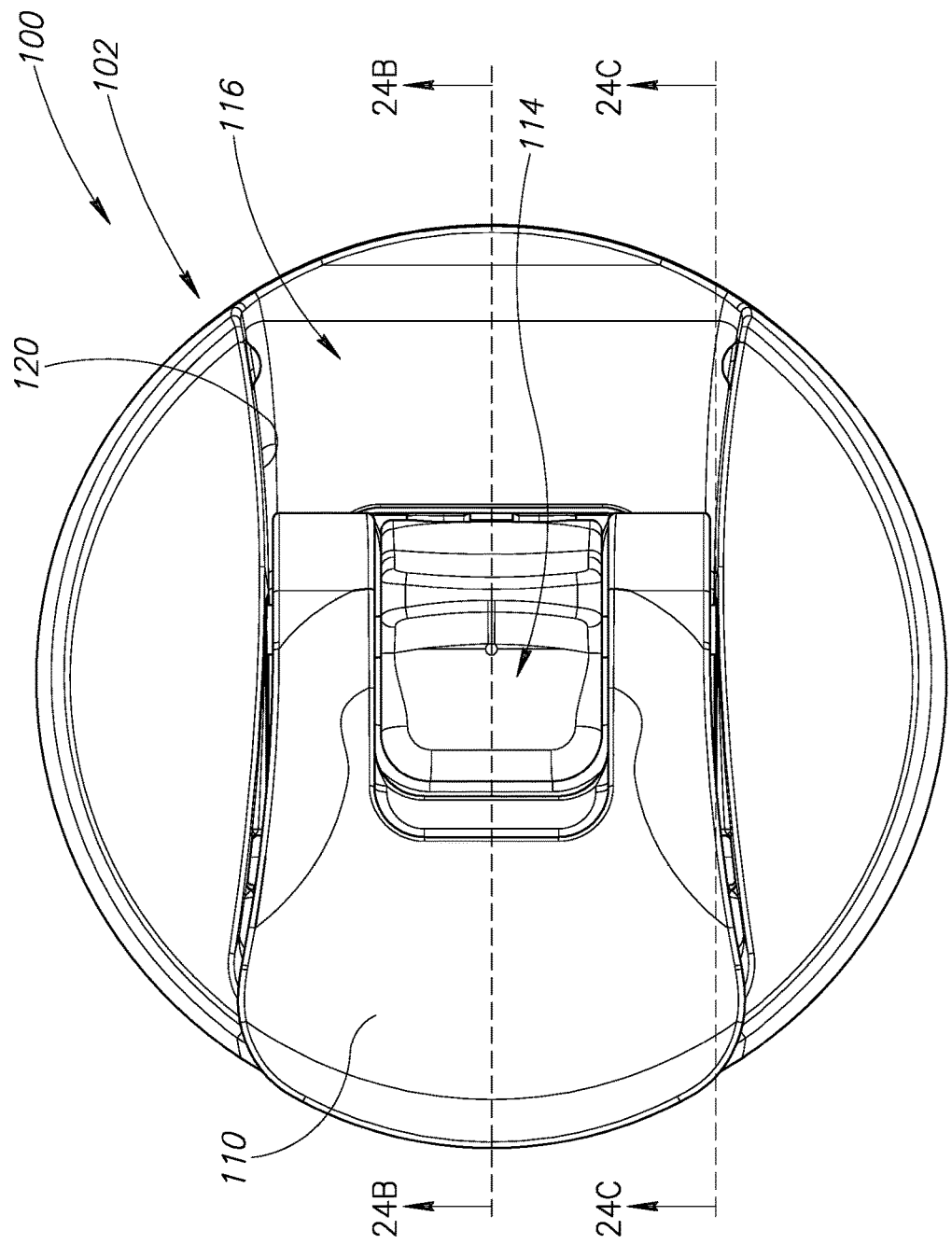
FIG. 24A illustrates a top plan view of the lid assembly of FIG. 15 with the camming lever rotated to a forward position.
Figure 24B:
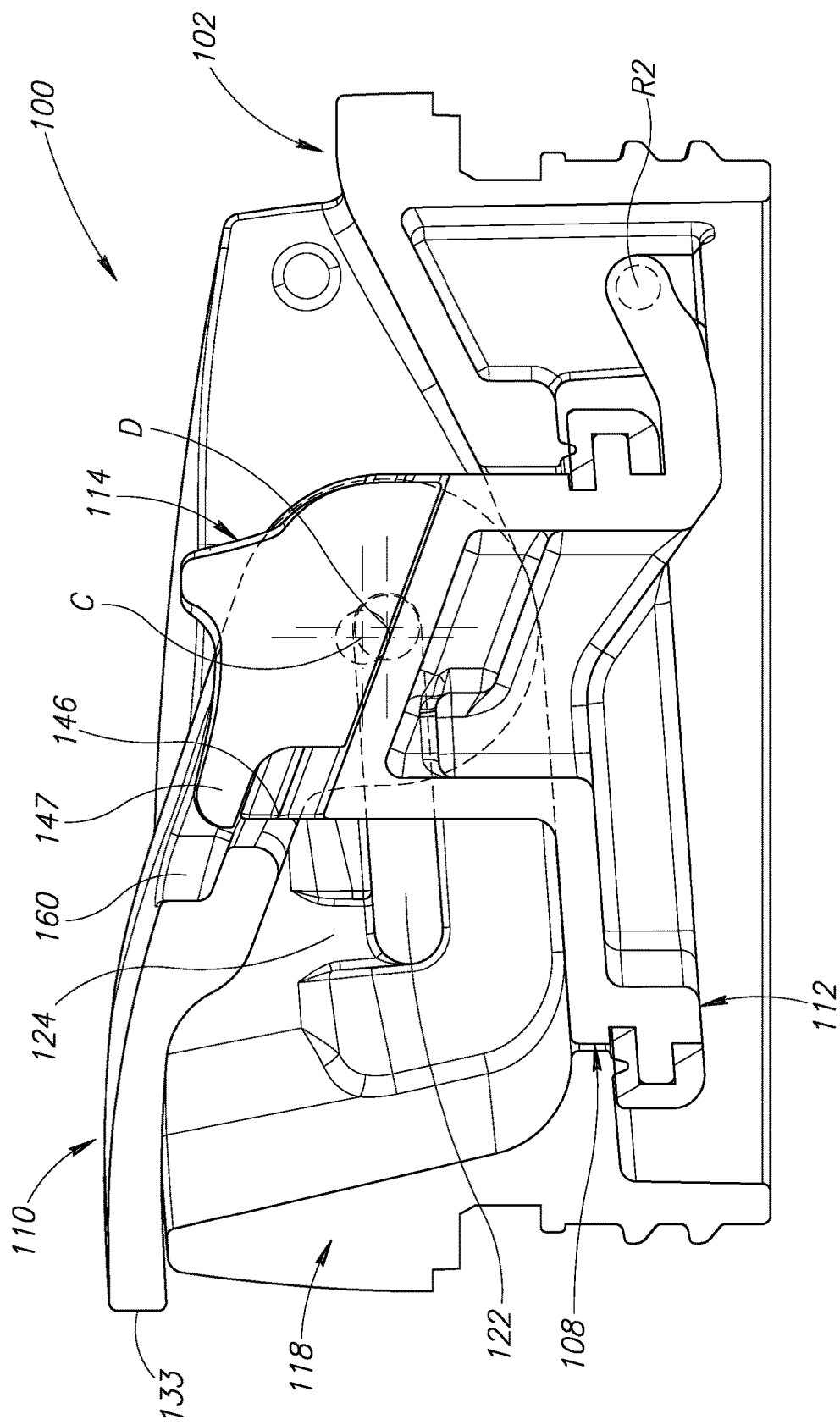
FIG. 24B illustrates a first cross-sectional side view of the lid assembly of FIG. 24A taken substantially along line 24B-24B of FIG. 24A with the locking member in an unlocked position.

The camming lever 110 is similar in structure to the camming lever 20, having two generally round or circular cam lobes 130, each disposed on an end of a lever arm 132, as shown in FIG. 20A. The cam lobes 130 each have a rounded cam engagement surface 134 on a cam lobe outer peripheral surface that contact a lid upper surface 135 adjacent to the drinking aperture 108. Each cam engagement surface 134 may include an interface upper portion 134U and/or an interface rear portion 134R thicker in a lateral direction than an interface lower portion 134L, as shown in FIGS. 20A and 20C. The lever arms 132 extend from a main body portion 132A (see FIG. 20B) that extends over and shields the drinking aperture 108 when the sealing member 112 is in the sealed position with the drinking aperture closed, as shown in FIG. 15, serving as a cover for the drinking aperture. When attached to the main body 102, the camming lever 110 is operable to rotate between a forward first position and a rearward second position, as described above and respectively shown in FIGS. 15 and 16. A distal end 133 of the camming lever 110 may extend peripherally beyond the drinking lip 118 when the camming lever 110 is in the first position, as shown in FIGS. 23A and 24B, helping to prevent contamination of the drinking lip and providing a lower edge on which the user may push upwardly against to rotate the camming lever rearwardly and away from the first position.

Left and right coaxial first cam axles 142 project laterally inward from the laterally inward facing side of each of the cam lobes 130 and the second cam axles 126 project from the laterally outward facing side of each of the cam lobes 130. The left and right second cam axles 126 are coaxial and centered along an axis D and the first cam axles 142 are centered along an axis C offset from the axis D. Specifically, the axis C of the first cam axles 142 is positioned forward and above the axis D of the second cam axles 126, as shown in FIGS. 20B and 20C. A cylindrical spacer portion 136 having a larger radius than the second cam axles may radially surround the base of each second cam axle 126 on each outwardly facing side of the cam lobes 130, as shown in FIG. 20A. When the cam axles 126 are engaged with the elongated second recesses 122, the spacer portions 136 may abut the sidewalls 120 or the panel portions 121 thereof to space the cam lobes 130 apart from the sidewalls and prevent lateral movement of the camming lever 110 within the first elongated recess 116.

The sealing member 112 shown in FIGS. 19A, 19B, 19C and 19D, is operable to seal the drinking aperture 108 in a manner similar to the sealing member 22, but may have a different structure. The sealing member 112 has a sealing member upper portion 112U that is sized and shaped to snugly fit within the drinking aperture 108. A sealing member lower portion 112L has a larger size than the upper portion 112U to cover and seal the drinking aperture 108 from below by sealing engagement with the lid lower surface 113 of the lower portion 106, which extends around the perimeter of the drinking aperture. The sealing member 112 is rotationally attached to the lid main body 102 in a manner similar to the rotational attachment of the sealing member 22 to the lid main body 12 described above.

An upwardly extending attachment element 138 projecting upward from a sealing member upper portion 112U of the sealing member 112 includes left and right axle insertion openings 140 for receiving, respectively, the left and right first cam axles 142 of the camming lever 110. The axle insertion openings 140 each have a tapered forwardly facing mouth portion to facilitate easy insertion of the respective first cam axles 142 during assembly with the sealing member 112. The axle insertion openings 140 receive the respective first cam axles 142 from a forward end facing side (i.e., closer to a forward end of the lid main body 102 near or at the drinking lip 118) of the sealing member 112 rather than a rearward end facing side, as described above with respect to the sealing member 22. The left and right axle insertion openings 140 lead respectively to a left and a right axle attachment receiver 144 each sized and shaped to removably receive and securely rotatably retain therein a corresponding one of the first cam axles 142 of the camming lever 110 in a snap-fit relationship allowing the camming lever to rotate when a rotational force is applied to the camming lever by a user.

A longitudinally extending guide channel portion 146 has a guide track with a hollow upside-down T-shaped cross-section on an upper side of the attachment element 138. The locking member 114 is slidably movable back and forth along the guide channel portion 146 to selectively secure and unsecure the sealing member 112 in the sealed position. The guide track of the guide channel portion 146 may linearly extend at an acute angle with respect to an upper surface of the upper portion 112U of the sealing member 112 and may have an open front end 146F opposite to an open rear end 146R.

The locking member 114 may be attached to the attachment element 138 and slidably move between a forward position and a rearward position. A lock element 147 of the locking member 114 projects outwardly from a front side of the locking member main body 150. A guide member 148 on a lower side of a locking member main body 150 of the locking member 114 may engage with the guide track of the guide channel portion 146 for assembly of the sealing member 112 and the locking member. Specifically, a front end portion 148F of the guide member 148 may be inserted and pushed into a rear end portion 146R of the guide track 146 to assemble the sealing member 112 and the locking member 114.

Figure 19A:
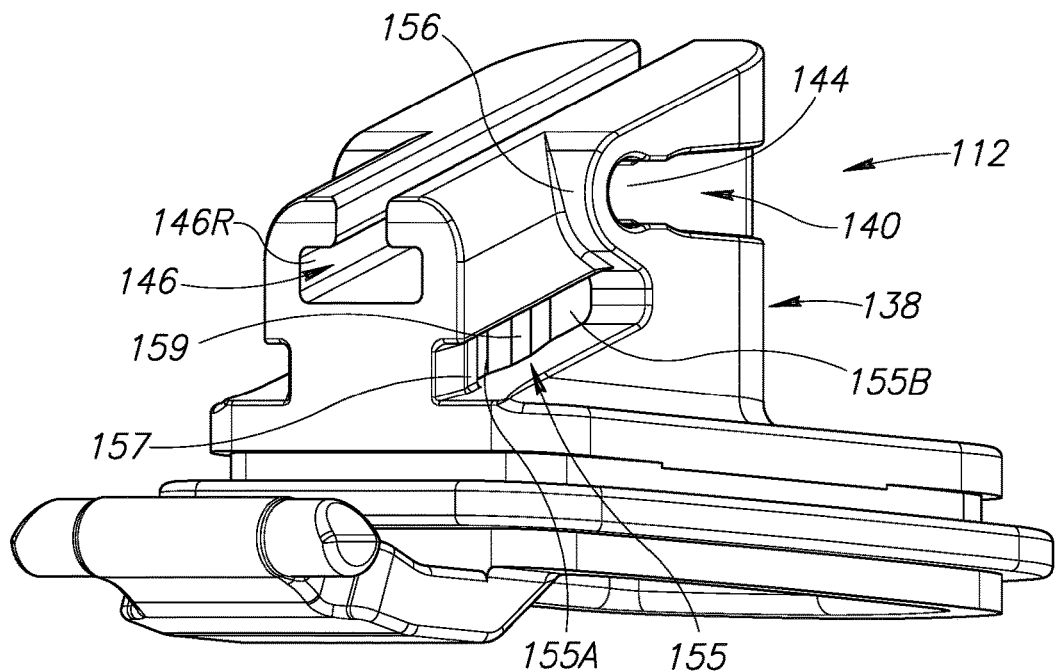
FIG. 19A illustrates a side perspective view of the sealing member of the lid assembly of FIG. 15.
Figure 19B:
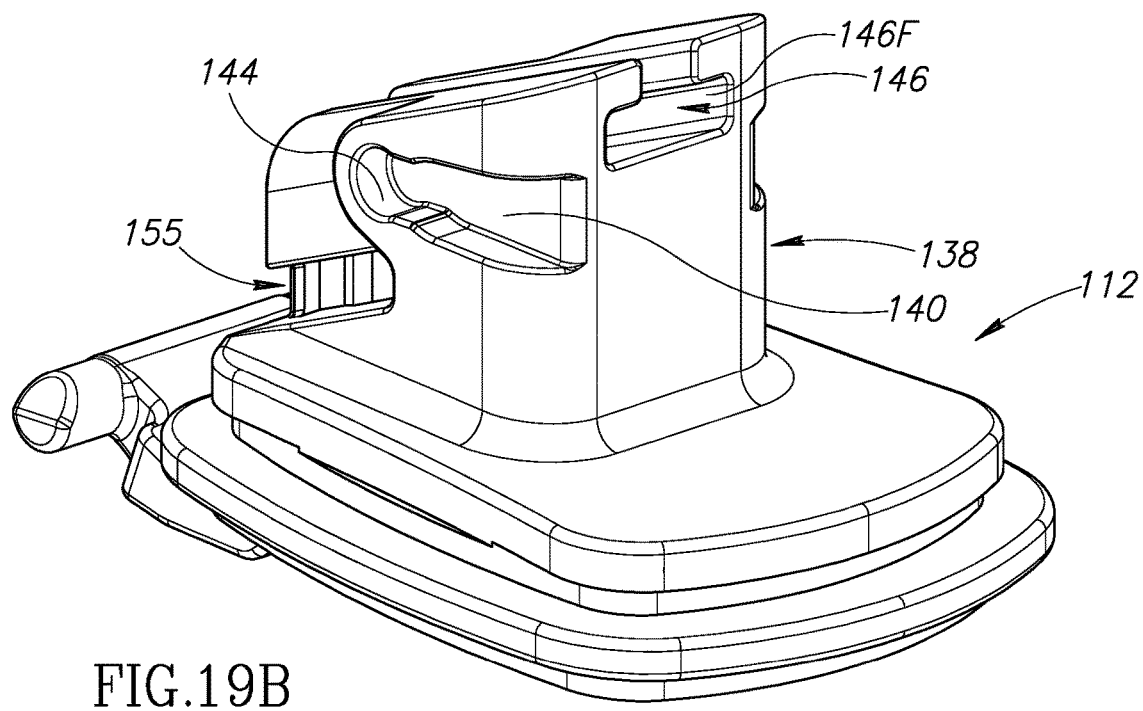
FIG. 19B illustrates a top perspective view of the sealing member of FIG. 19A.
Figure 19C:
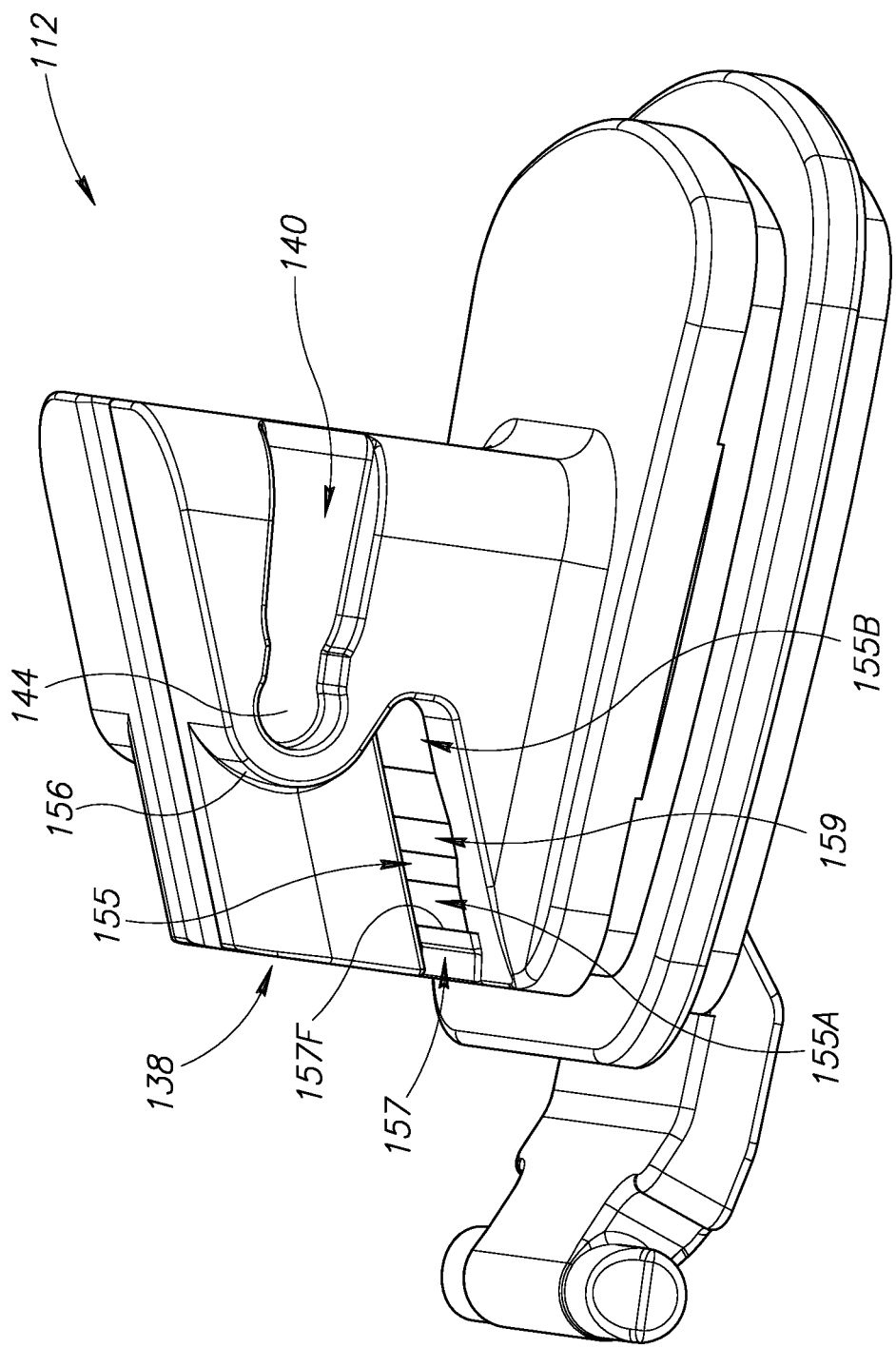
FIG. 19C illustrates an enlarged view of an attachment element of the sealing member of FIG. 19A.
Figure 21A:
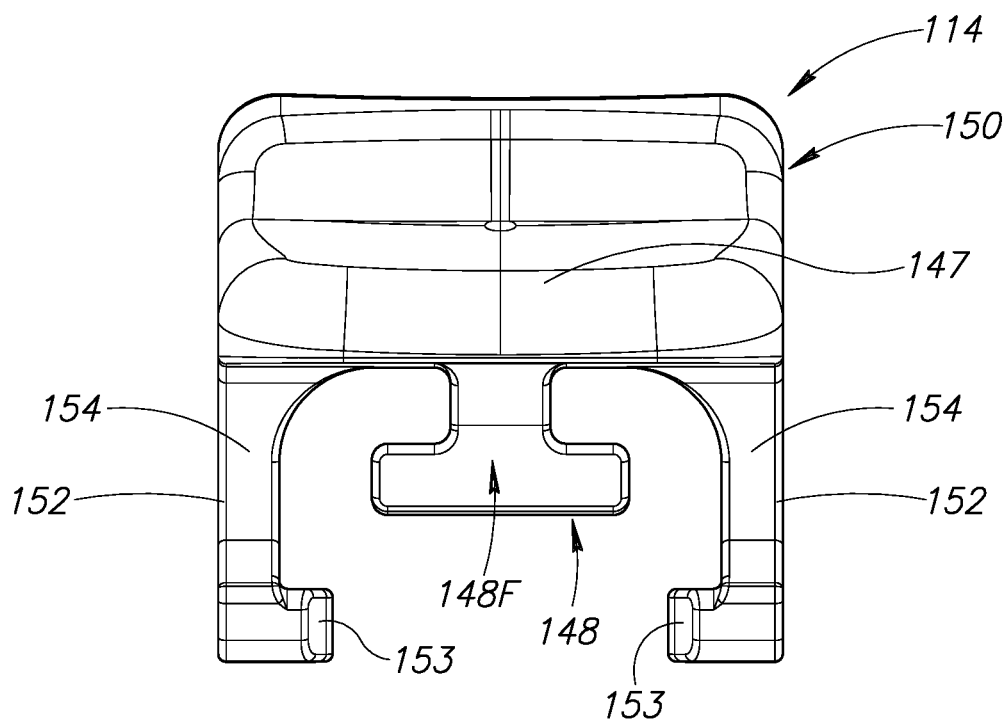
FIG. 21A illustrates a front view of a locking member of the lid assembly of FIG. 15.
Figure 21B:
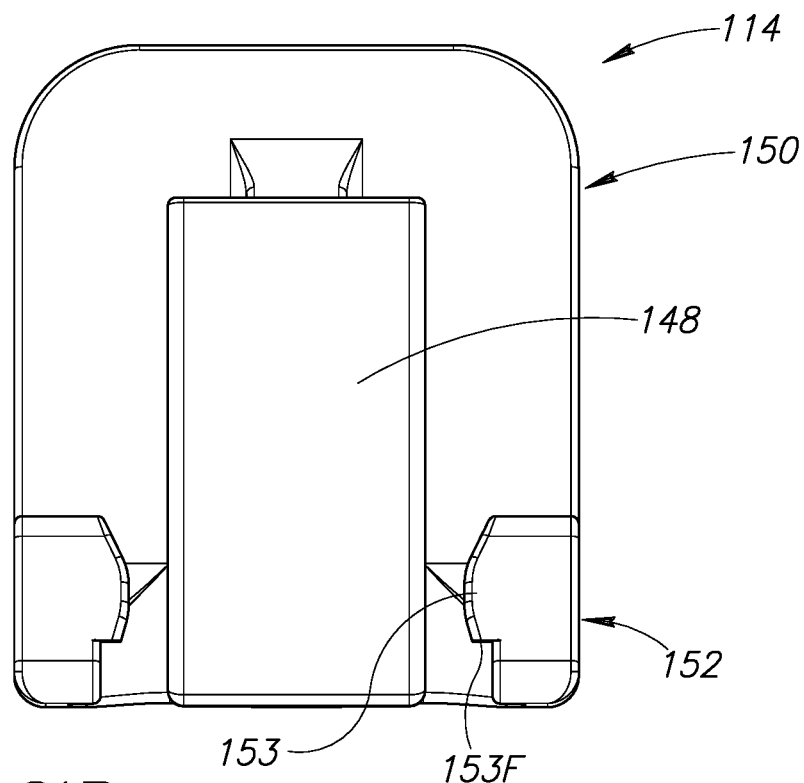
FIG. 21B illustrates a bottom plan view of the locking member of FIG. 21A.
Figure 21C:
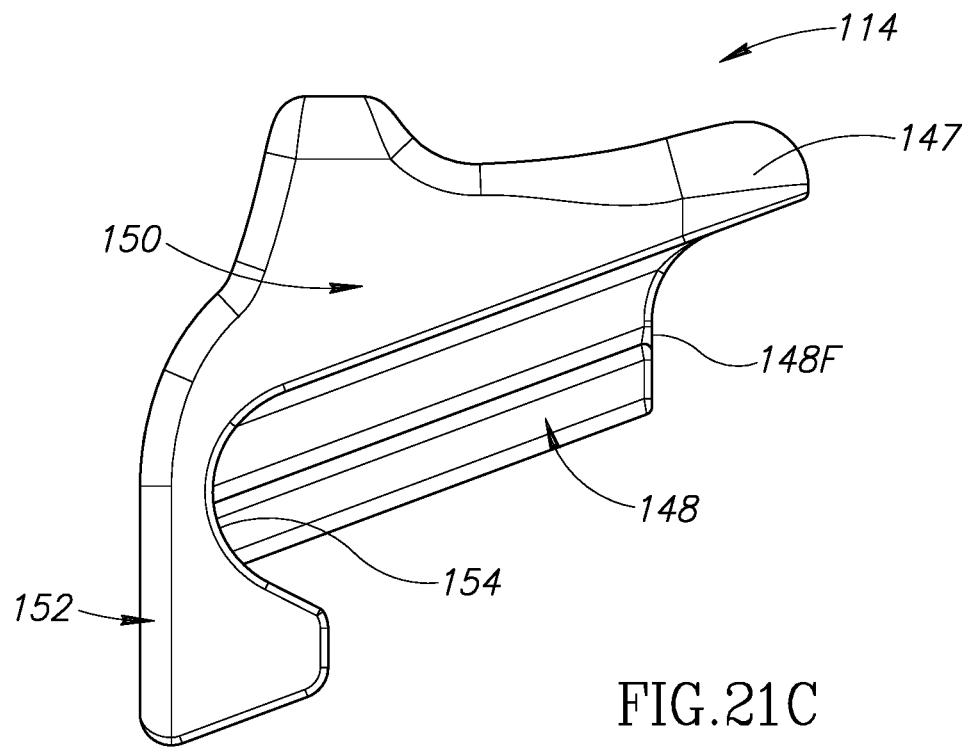
FIG. 21C illustrates a side view of the locking member of FIG. 21A.
Figure 22A:
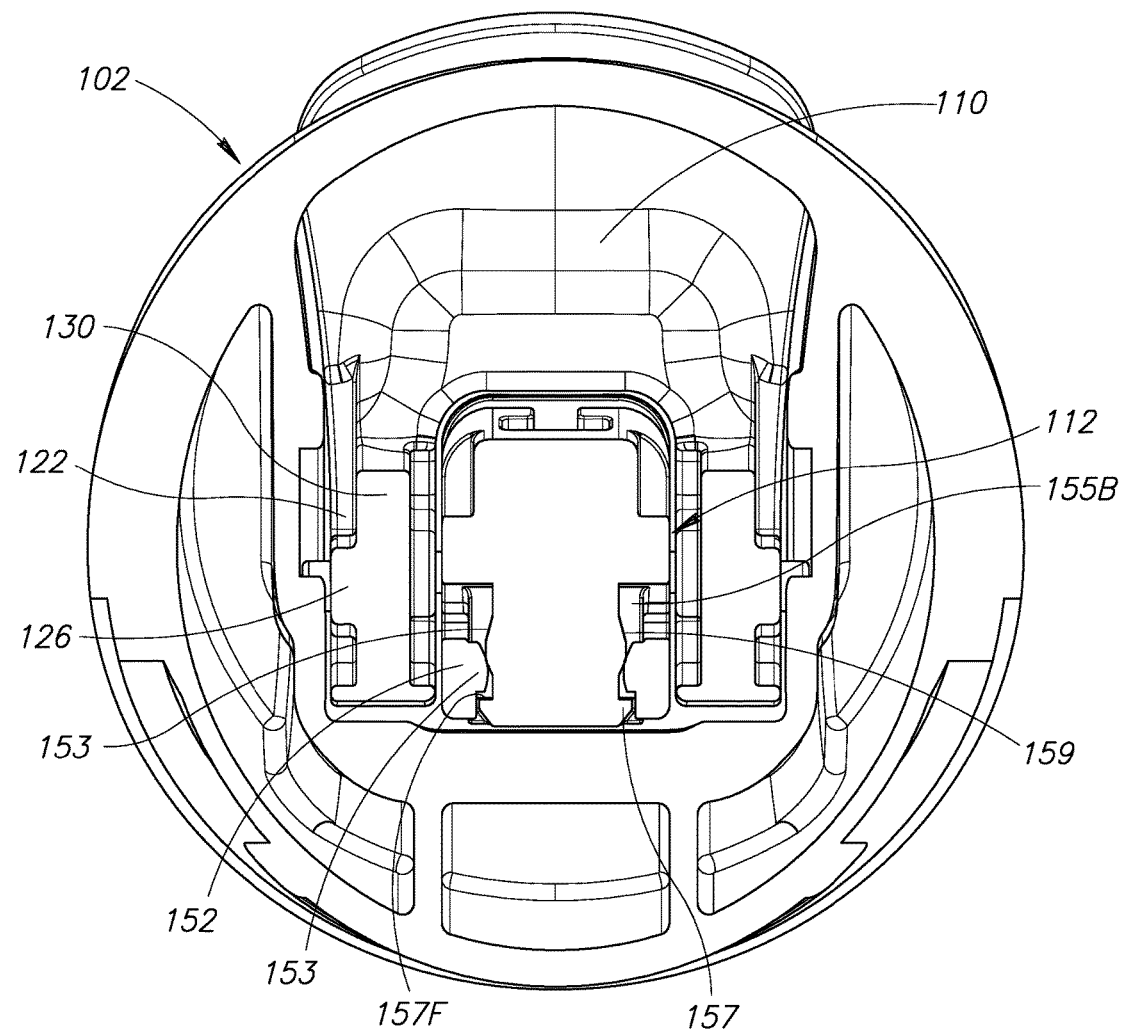
FIG. 22A illustrates a cross-sectional top view of the lid assembly of FIG. 15 with the locking member in an unlocked position.
Figure 22B:
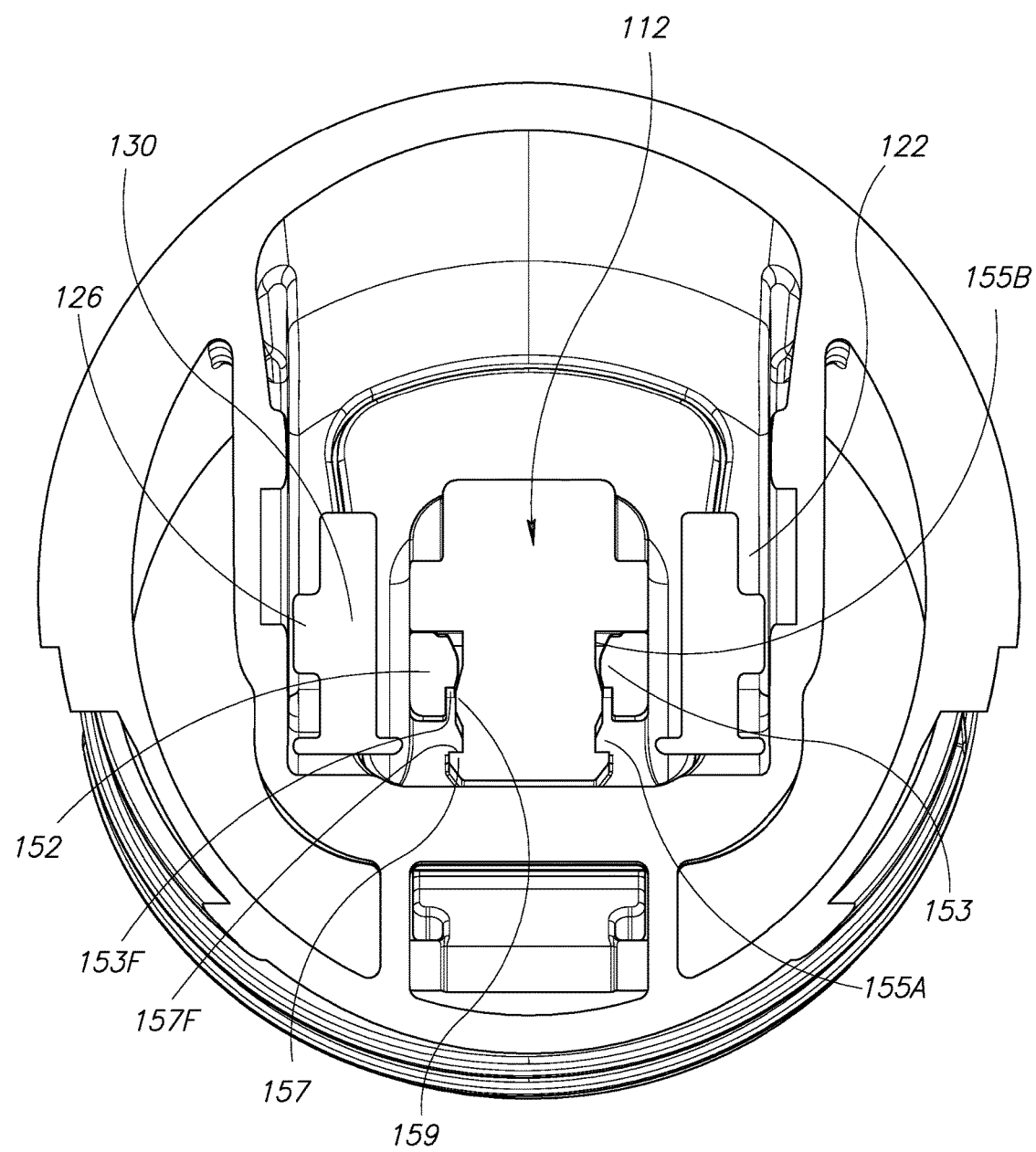
FIG. 22B illustrates a cross-sectional top view of the lid assembly of FIG. 15 with the locking member in a locked position.

Left and a right arm 152 respectively extend downwardly from left and right rear side portions of the locking member main body 150, as illustrated in FIG. 21A. A left and a right protuberance 153 project or protrude laterally inward from a distal end of each of the left and the right arm 152. The attachment element 138 of the sealing member 112 may include left and right rearwardly opening detent insertion openings 155 for respectively receiving the left and right locking member detents 153 of the locking member 114. The sealing member 112 has a latch portion 157 provided near a mouth of the detent insertion openings 155, as best shown in FIGS. 19C, 22A and 22B, for engaging with and helping to retain the locking member detents 153 within the respective detent insertion openings once inserted therein. The latch portion 157 may include a substantially flat portion 157F facing inwardly away from the mouth of each detent insertion opening 155. The locking member detents 153 may each include rearwardly facing substantially flat portions 153F which, after the detents 153 are inserted beyond the latch portions 157 within the detent insertion openings 155, may abut with the latch flat portions 157F to limit rearward movement of the locking member 114 relative to the attachment element 138 and help to prevent unintended separation of the locking member from the sealing member 112. A protuberance 159 may protrude or bulge inwardly from a side, top or bottom of the detent insertion opening 155. The protuberance 159 is positioned between a first segment 155A of the detent insertion opening proximate to the mouth of the detent insertion opening 155 and a second segment 155B proximate to a terminus of the detent insertion opening.

A surface 154 on each of the left and right arms 152 of the locking member 114 faces in the forward direction. The surface 154 of each of the left and right arms may abut, respectively, a left and a right rearwardly facing stop surface 156 of the attachment element 138 when the locking member 114 is attached thereto to limit forward movement of the guide member 148 in the guide track of the guide channel portion 146 beyond a predetermined forward locking member position. The surface 154 and the stop surface 156 may be complementary concave and convex surfaces shaped to engage with each other at the predetermined locking member position.

Assembly of the sealing member 112, the locking member 114 and the lid main body 102 is substantially similar to the assembly of the sealing member 22, the locking member 24 and the lid main body 12 described with respect to the lid assembly 10. In this second embodiment, however, the locking member 114 is assembled with the sealing member 112 by inserting the locking member 114 into the rear end portion of the assembly element 138 rather than the front end portion. The detents 153 of the locking member 114 engage with the detent insertion openings 155 of the sealing member 112, as described above, for secure assembly therebetween.

Assembly of the sealing member 112, the camming lever 110 and the lid main body 102 is similar to the assembly of the sealing member 22, the camming lever 20 and the lid main body 12 described with respect to the lid assembly 10. However, in this second embodiment, the camming lever 110 is assembled with the lid main body 102 by inserting the second cam axles 126 through the second axle insertion openings 124 and into the elongated second recesses 122, as shown in FIGS. 24B and 25B. Additionally, the camming lever 110 is attached via the first cam axles 142 engaged via a forwardly facing mouth portion of the axle insertion openings 140, rather than a rearwardly facing mouth portion.

Figure 24C:
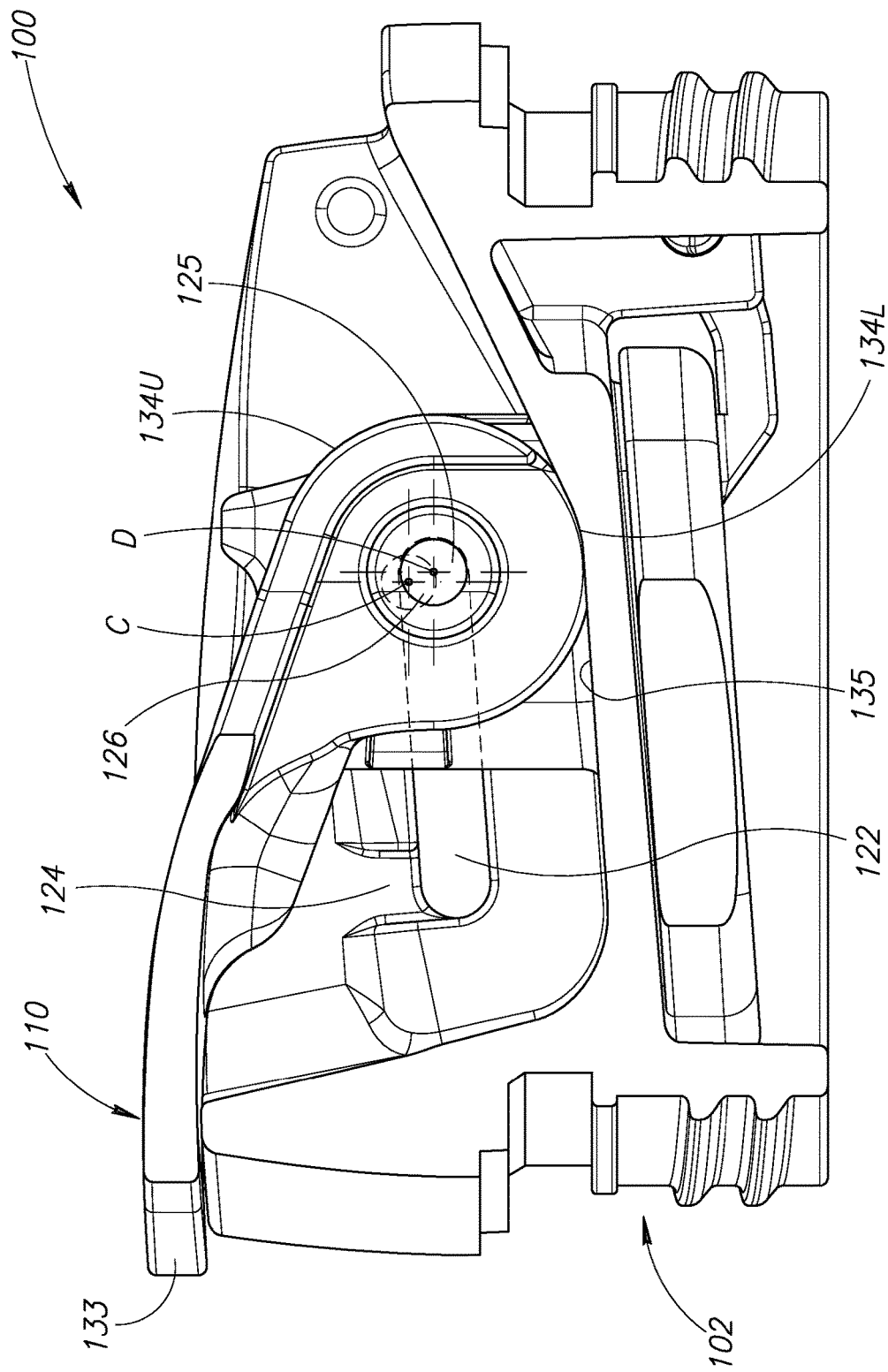
FIG. 24C illustrates a second cross-sectional side view of the lid assembly of FIG. 24A taken substantially along line 24C-24C of FIG. 24A.
Figure 24D:
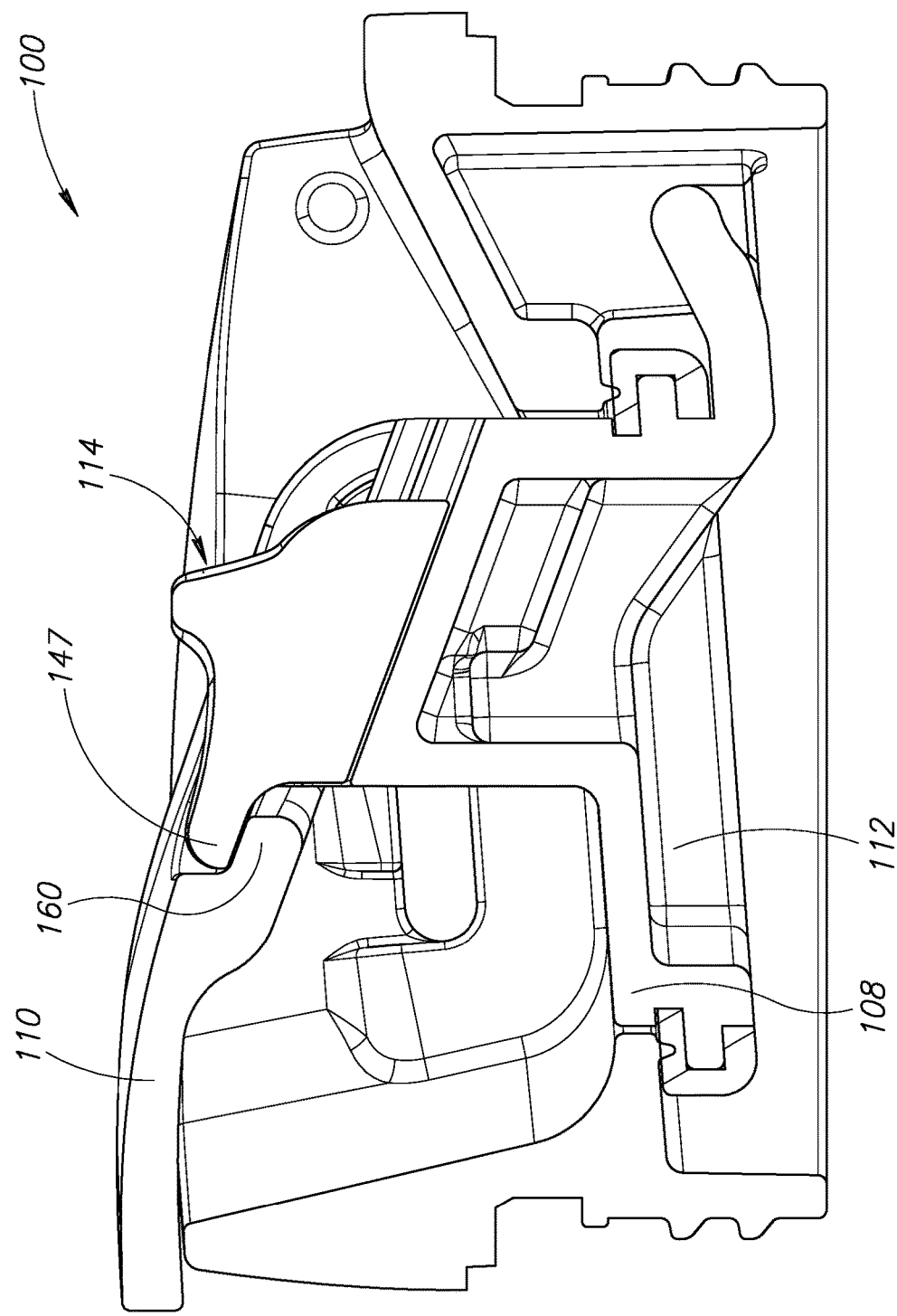
FIG. 24D illustrates a third cross-sectional side view of the lid assembly of FIG. 24A with the locking member in a locked position.

Once the lid assembly 100 is assembled, operation of the camming lever 110 is similar to the camming lever 20, as described above, to move the sealing member 112 back and forth between sealed and unsealed positions respectively sealing and unsealing the drinking aperture 108. When the camming lever 110 is in the first position where a lower surface 132L of the lever arm 132 is proximate to a forward upper surface portion of the upper portion 104 and the sealing member 112 is sealing the drinking aperture 108, the locking member 114 may be moved between a forward position securing the camming lever in the first position and a rearward position at which the camming lever may be freely rotated. When the locking member 114 is in the forward position, as shown in FIG. 24D, a downwardly facing surface of the lock element 147 opposes an upwardly facing surface of a lock receptacle 158 to prevent upward or rearward rotation of the camming lever 110. Additionally, a front side of the protuberance 159 of the detent insertion openings 155 may contact or abut with a rear portion of the protuberance 153, as shown in FIG. 22B, to help retain the detent in the detent insertion opening second segment 155B and thereby help to prevent the locking member 114 from being moved away from the first position without application of sufficient force by the user. When the locking member 114 is in the rearward position, the downwardly facing surface of the lock element 147 is rearward of the lock receptacle 158, as shown in FIG. 24B, and does not interfere with rotation of the camming lever 110. A rear side of the protuberance 159 may contact or abut with a front portion of the protuberance 153, as shown in FIG. 22A, to help retain the detent in the detent insertion opening first segment 155A and thereby help to prevent the locking member 114 from being moved away from the second position without application of sufficient force by the user.

Figure 23B:
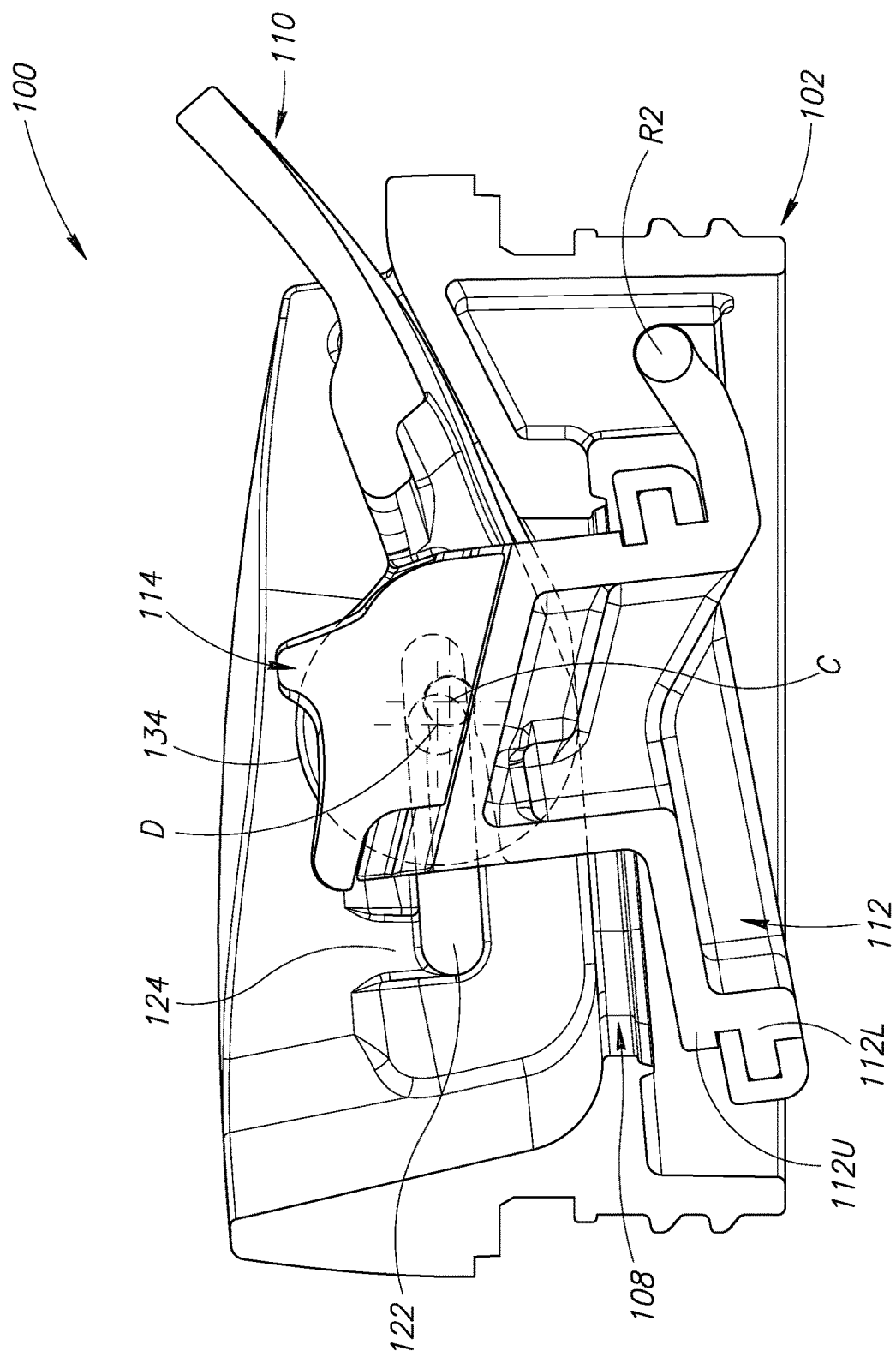
FIG. 23B illustrates a first cross-sectional side view of the lid assembly of FIG. 23A taken substantially along line 23B-23B of FIG. 23A.
Figure 23C:
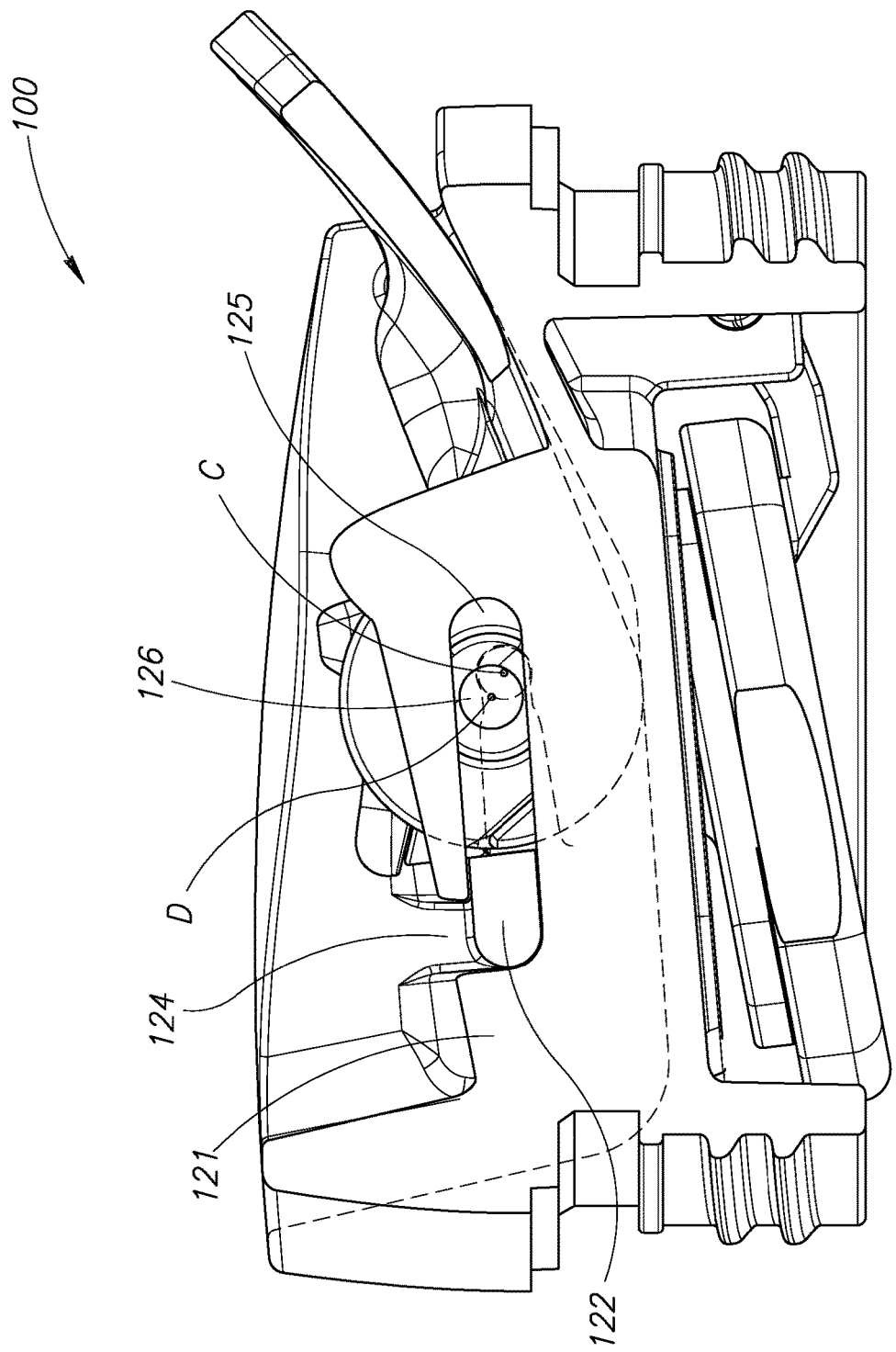
FIG. 23C illustrates a second cross-sectional side view of the lid assembly of FIG. 23A taken substantially along line 23C-23C of FIG. 23A.

Operation of the lid assembly 100 to transition the sealing member 112 between the sealing position sealing the drinking aperture 108 and the unsealing position unsealing the drinking aperture is similar to operation of the lid assembly 10. When the lid assembly 100 is in the unsealed configuration, the sealing member 112 is in the unsealed position unsealing the drinking aperture 108 of the lid main body 102, as shown in FIG. 23B (cross-sectional view substantially along the line 23B-23B of FIG. 23A) and FIG. 23C (cross-sectional view substantially along the line 23C-23C of FIG. 23A). A protuberance 131 protruding inwardly from one or both of the sidewalls 128 may abut a widebody portion 110A of the camming lever 110 when the camming lever is rotated rearwardly to retain the camming lever in the unsealed position.

The axis D of the second cam axles 126 is located at a first position within the elongated second recesses 122. When the camming lever 110 is in the second position with the sealing member 112 in the unsealed position (see FIGS. 23B and 23C) and is located forward (i.e., closer to the forward end of the lid main body 112) and above axis C of the first cam axles 142. When the cam lever 110 is rotated counterclockwise (when viewed from the left side of the lid assembly 100 as seen in FIG. 23B) toward the forward end of the lid main body 112 to transition the cam lever to the first position and the sealing member 112 from the unsealed position to the sealed position, axis D of the second cam axles 126 moves rearward (i.e., toward the rearward end of the lid main body 102) within the elongated second recesses 122. Simultaneously, the axis D moves counterclockwise about the axis C to a position below and rearward of axis C (see FIGS. 24B and 24C). When the lid assembly 100 is in the sealed configuration, the sealing member 112 is in the sealed position sealing the drinking aperture 108 of the lid main body 102, as shown in FIG. 24B (cross-sectional view substantially along the line 24B-24B of FIG. 24A), 24C (cross-sectional view substantially along the line 24C-24C of FIG. 24A) and 24D. Axis D of the second cam axles 126 is located at a second position within the elongated second recesses 122 that is rearward of the first longitudinal position when the camming lever 110 is in the first position with the sealing member 112 is the sealed position and is located rearward of and below the axis C of the first cam axles 142. Attachment of the camming lever 110 to the attachment element 138 enables the sealing member lower portion 112L and/or sealing member upper portion 112U to move between positions sealing and unsealing the drinking aperture 108 by rotating the camming lever, as described above with respect to the lid assembly 100.

When the camming lever 110 is operable to move the sealing member 112 between the sealed position in the unsealed position, the lid assembly 100 is in a configuration in which the user may selectively seal and unseal the drinking aperture 108. In the use configuration, the lid assembly 100 is assembled with the second cam axles 126 engaged with the elongated second recesses 122, the first cam axles 142 engaged with the axle attachment receivers 144, and the sealing member 112 rotationally attached to the lid main body 102. The camming lever 110 may be disengaged from the sealing member 112 to transition the lid assembly 100 to a cleaning configuration in which the constituent parts of the lid assembly may be more thoroughly cleaned.

Figure 25A:
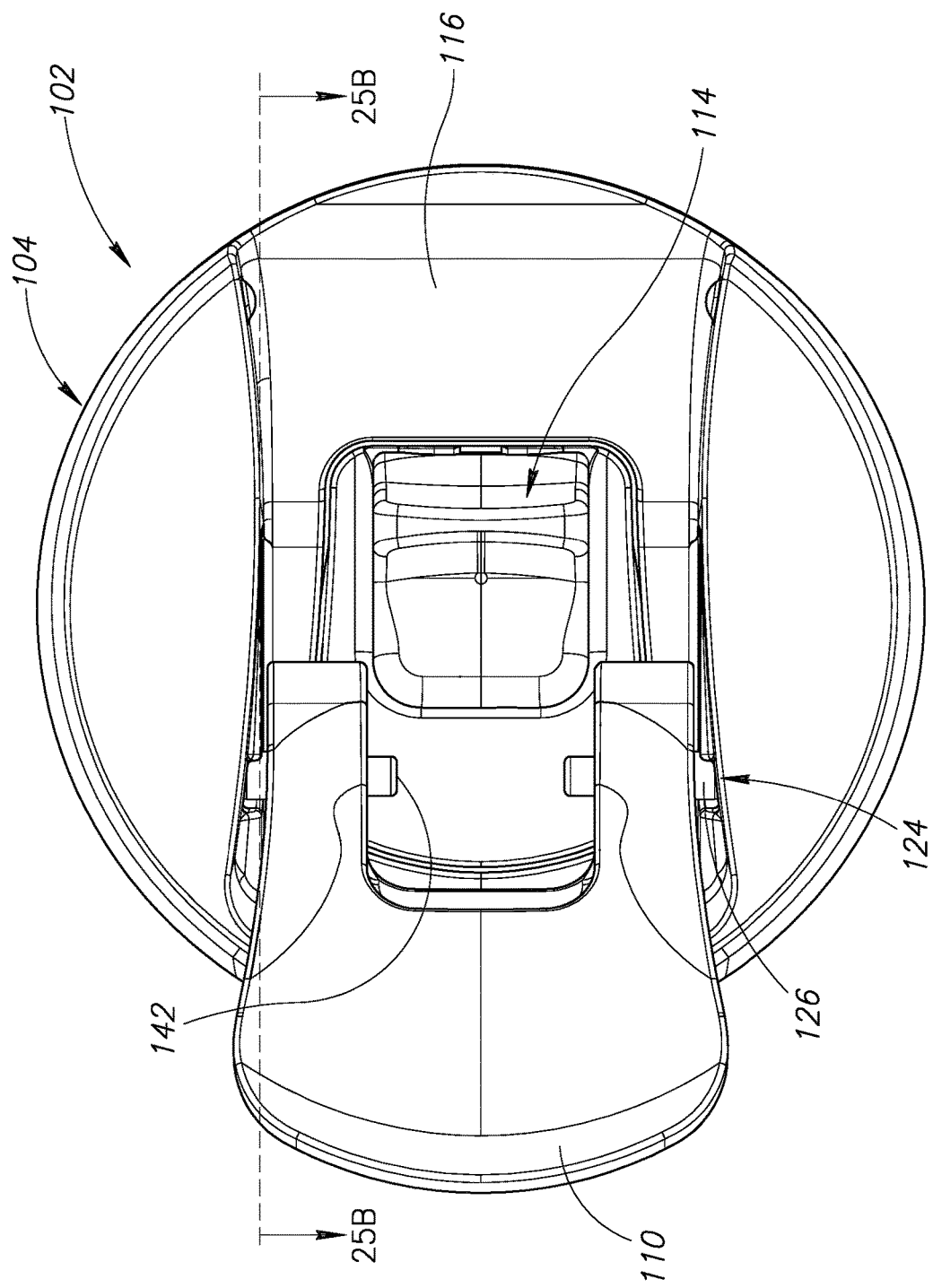
FIG. 25A illustrates a top plan view of the lid assembly of FIG. 15 with the camming lever disengaged from the sealing member.
Figure 25B:
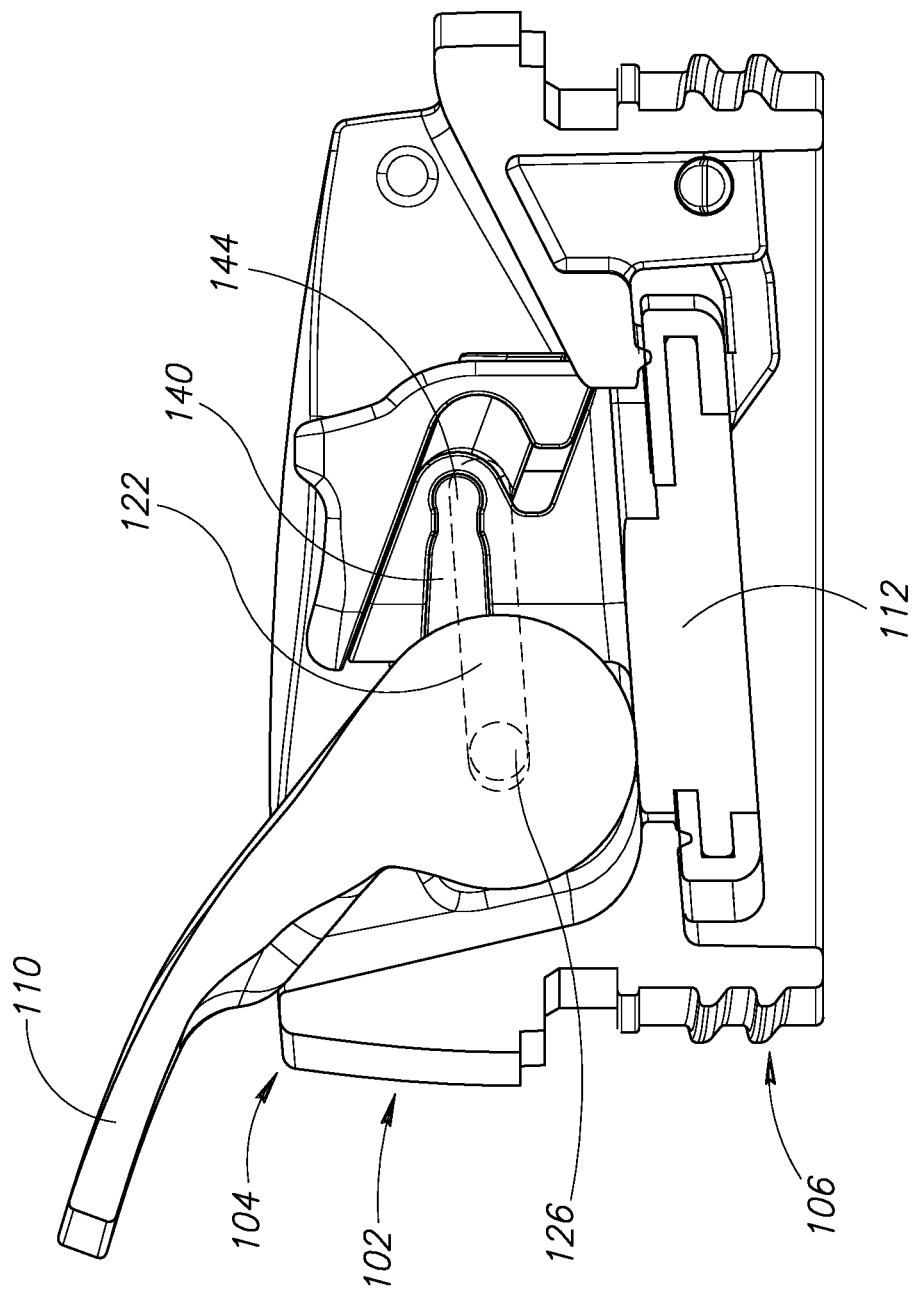
FIG. 25B illustrates a cross-sectional side view of the lid assembly of FIG. 15 taken substantially along line 25B-25B of FIG. 25A with the camming lever disengages from the sealing member.
Figure 25C:
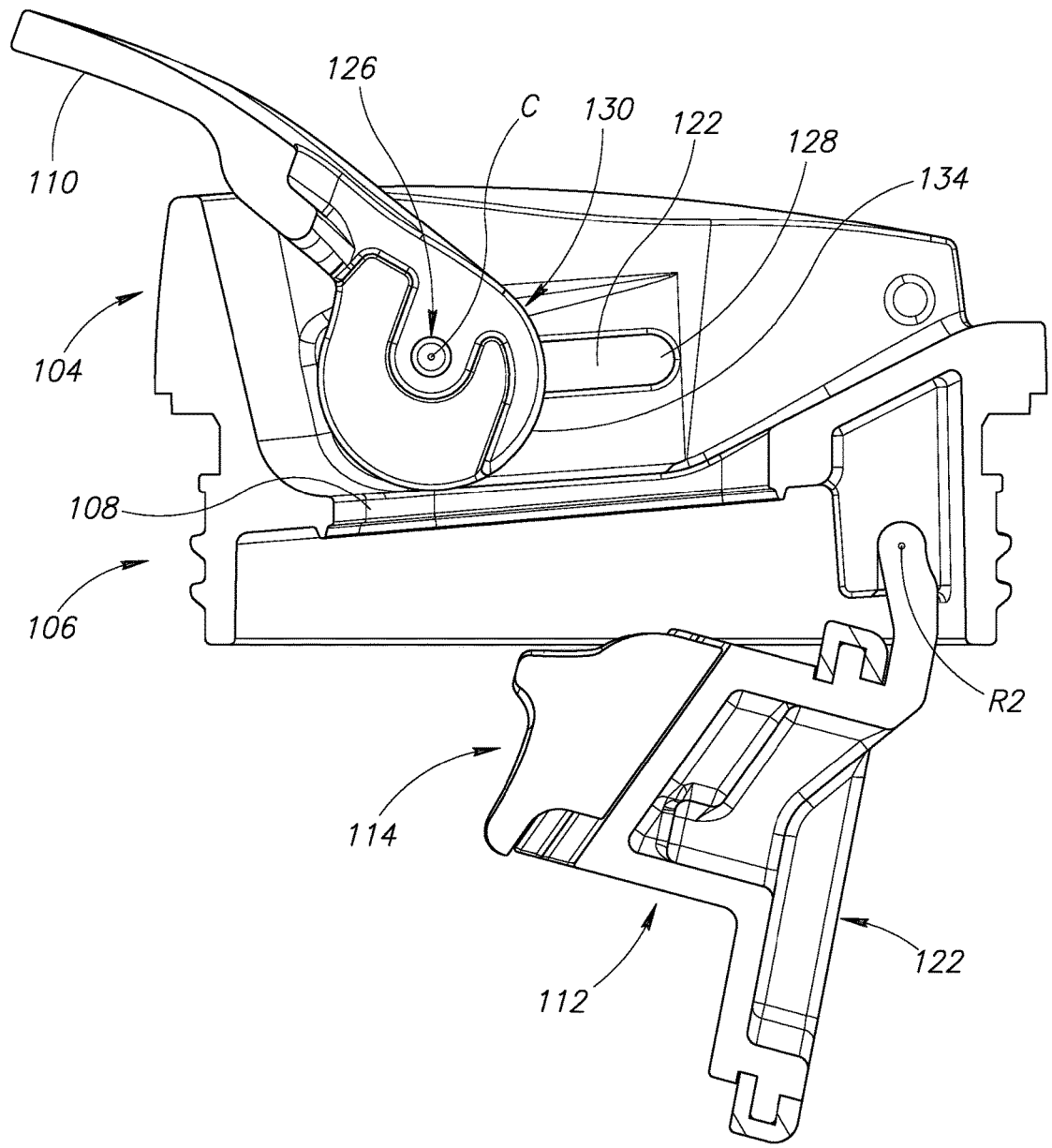
FIG. 25C illustrates a cross-sectional side view of the lid assembly of FIG. 15 with the camming lever disengaged from the sealing member and the sealing member removed from the drinking aperture.

In the cleaning configuration, the first cam axles 142 are disengaged from the axle attachment receivers 144 and removed from the axle insertion openings 140, thereby disengaging the cam lever 110 and the sealing member 112, as shown in FIG. 25B (cross-sectional view substantially along the line 25B-25B of FIG. 25A). With the camming lever 110 disengaged from the sealing member 112 as shown in FIG. 25C, the sealing member is rotatable counterclockwise about the circular rotational path centered on the axis R2 and may be rotated to a downward position where the attachment element 138 is withdrawn from the drinking aperture 108. Simultaneously, the second cam axles 126 are retained in the elongated second recesses 122 allowing the camming lever 110 to move back and forth in the forward-rearward direction of the second recesses. The second cam axles 126 may slidably move from a rearward position proximate to the end portion 128 of the elongated second recesses 122 to a forward position proximate to the second axle insertion openings 124 and the first cam axles 142 may be moved out of the axle insertion openings 140, thereby allowing the sealing member 112 to freely rotate about the axis R2. When freely rotatable, the sealing member 112 may be rotated downward thereby withdrawing the attachment element 138 from the drinking aperture 108 to facilitate convenient and thorough cleaning of the lid assembly 100. The second cam axles 126 may be slid upward and through the second axle insertion openings 124 to remove the camming lever 110 from the lid main body 102 for cleaning.

The motions described may be reversed to transition the lid assembly 100 from the cleaning configuration back to the use configuration.

Various features of embodiments described above may be combined with the features of other embodiments without departing from the scope of the lid assemblies described herein. While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

What is claimed is:

1. A lid assembly for a beverage container, the lid assembly comprising:
    a lid main body having a drinking aperture, the lid main body including a stationary first cam contact surface;
    a sealing member pivotally attached to the lid main body and rotatably movable between a sealed position sealing the drinking aperture and an unsealed position unsealing the drinking aperture, the sealing member having a first axle receiver;
    a camming lever rotatably coupled to the lid main body, the camming lever having a main body portion and a first lever arm extending from the main body portion, a distal end portion of the first lever arm being shaped to form a first cam, the first cam being in sliding engagement with the first cam contact surface of the lid main body, the first lever arm being operably rotatable by rotation of the camming lever to rotate the first cam while in sliding engagement with the first cam contact surface; and
    a first cam axle laterally extending from the first cam and removably coupled to the sealing member, the sealing member rotatably retaining the first cam axle in the first axle receiver for rotation of the first cam axle and the first lever arm about a stationary axis of rotation relative to the sealing member as the first lever arm is rotate to move the sealing member between the sealed position and the unsealed position, rotation of the first cam while in sliding engagement with the first cam contact surface of the lid main body causing the first cam axle to move the sealing member between the sealed position and the unsealed position.

2. The lid assembly of claim 1, wherein the lid main body includes a stationary second cam contact surface, and the camming lever includes a second lever arm extending from the main body portion, a distal end portion of the second lever arm being shaped to form a second cam, the second cam being in sliding engagement with the second cam contact surface of the lid main body, the second lever arm being operably rotatable by rotation of the camming lever to rotate the second cam while in sliding engagement with the second cam contact surface to simultaneously rotate the first and second cams to move the sealing member between the sealed position and the unsealed position.

3. The lid assembly of claim 2, wherein the sealing member includes a second axle receiver and the lid assembly further includes a second cam axle laterally extending from the second cam and removably coupled to the sealing member, the sealing member rotatably retaining the second cam axle in the second axle receiver for rotation of the second cam axle and the second lever arm about a stationary axis of rotation relative to the sealing member as the second lever arm is rotate to move the sealing member between the sealed position and the unsealed position, rotation of the second cam while in sliding engagement with the second cam contact surface of the lid main body causing the second cam axle to move the sealing member between the sealed position and the unsealed position.

4. The lid assembly of claim 3, wherein the first cam and the second cam are laterally spaced apart on opposite lateral sides of the camming lever.

5. The lid assembly of claim 1, wherein the lid main body further includes an upwardly projecting lip, and the camming lever further includes a cover portion extending outward from the main body portion of the camming lever in a direction away from the first cam, the cover portion being sized and shaped to extend over and cover the lip from above when the camming lever has moved the sealing member to the sealed position.

6. The lid assembly of claim 1, wherein the lid main body further includes an upwardly projecting lip, and the camming lever further includes a lip cover portion extending outward from the main body portion of the camming lever in a direction away from the first cam, the camming lever being rotatable between a first position at which the sealing member is in the sealed position and a second position at which the sealing member is in the unsealed position, and the lip cover portion being in position above the lip and covering the lip from above when the camming lever is in the first position.

7. The lid assembly of claim 6, wherein the lip is a drinking lip adjacent to the drinking aperture and extending along a peripheral edge of the lid main body, the lip extending upwardly and terminating in an upwardly facing lip wall, and the lip cover portion extending over and covering at least a portion of the upwardly facing lip wall from above along the peripheral edge when the camming lever is in the first position.

8. The lid assembly of claim 6, wherein the lid main body has a cylindrical shape and the lip is a drinking lip adjacent to the drinking aperture and extending along a circumferential edge of the lid main body, the lip extending upwardly and terminating at an upper end in an upwardly facing lip edge wall, the lip cover portion having a concavity in which at least a portion of the upwardly facing lip edge wall is positioned with the lip cover portion extending over and covering from above the at least a portion of the upwardly facing lip edge wall when the camming lever is in the first position.

9. The lid assembly of claim 1, wherein when the first cam axle is coupled to the sealing member, the lid assembly is in a use configuration in which the camming lever is operable to move the sealing member between the sealed position and the unsealed position, and when the first cam axle is uncoupled from the sealing member, the sealing member is rotatable to a cleaning position spaced apart from and below the unsealed position.

10. The lid assembly of claim 9, wherein the sealing member remains pivotally attached to the lid main body when in the cleaning position.

11. The lid assembly of claim 1, wherein the lid main body further includes an upwardly projecting sidewall laterally outward of and adjacent to the first cam and having a slot, and the camming lever further includes a retaining member laterally extending from the first cam and received in the slot to rotatably couple the camming lever to the lid main body and restrain upward movement of the first cam while allowing forward-rearward movement of the first cam as the first cam is rotated to move the sealing member between the sealed position and the unsealed position.

12. The lid assembly of claim 11, wherein the slot includes an opening permitting the retaining member of the camming lever to be inserted into and removed from the slot, when the first cam axle is uncoupled from the sealing member and the retaining member is removed from the slot, the camming member is separable from the sealing member and the lid main body.

13. A lid assembly for a beverage container, the lid assembly comprising:
   a lid main body having a drinking aperture, the lid main body including a stationary first cam contact surface;
   a sealing member pivotally attached to the lid main body and rotatably movable between a sealed position sealing the drinking aperture and an unsealed position unsealing the drinking aperture, the sealing member having an axle receiver;
   a camming lever rotatably coupled to the lid main body, the camming lever having a main body portion and a first lever arm extending from the main body portion, a distal end portion of the first lever arm being shaped to form a first cam, the first cam being in sliding engagement with the first cam contact surface of the lid main body, the first lever arm being operably rotatable by rotation of the camming lever to rotate the first cam while in sliding engagement with the first cam contact surface;
   a first cam axle laterally extending from the first cam and removably coupled to the sealing member, the sealing member retaining the first cam axle in the axle receiver for rotation of the first cam axle and the first lever arm about a stationary axis of rotation relative to the sealing member as the first lever arm is rotate to move the sealing member between the sealed position and the unsealed position, rotation of the first cam while in sliding engagement with the first cam contact surface of the lid main body causing the first cam axle to move the sealing member between the sealed position and the unsealed position; and
   a locking member movable between a locked position preventing rotation of the camming lever when the sealing member is in the sealed position and an unlocked position permitting rotation of the camming lever to move the sealing member between the sealed position and the unsealed position.

14. The lid assembly of claim 13, wherein the locking member is movable between the locked position and the unlocked position only when the sealing member is in the sealed position.

15. The lid assembly of claim 13, wherein the locking member is in contact with the camming lever in the locked position and spaced apart from the camming lever in the unlocked position.

16. The lid assembly of claim 13, wherein the locking member is in contact with an upwardly facing surface of the camming lever when in the locked position preventing rotation of the camming lever.

17. The lid assembly of claim 13, wherein the locking member is attached to the sealing member and slidably movable relative to the sealing member.

18. A lid assembly for a beverage container, the lid assembly comprising:
   a lid main body having a drinking aperture;
   a sealing member pivotally attached to the lid main body and rotatably movable between a sealed position sealing the drinking aperture and an unsealed position unsealing the drinking aperture, the sealing member including a guide channel;
   a camming lever rotatably coupled to the lid main body, the camming lever having a first cam and being operable to rotate the first cam;
   a first cam axle laterally extending from the first cam and removably coupled to the sealing member, rotation of the first cam causing the first cam axle to move the sealing member between the sealed position and the unsealed position; and
   a locking member movable between a locked position preventing rotation of the camming lever when the sealing member is in the sealed position and an unlocked position permitting rotation of the camming lever to move the sealing member between the sealed position and the unsealed position, the locking member being attached to the sealing member and slidably movable relative to the sealing member, the locking member being slidably movable back and forth in the guide channel between the unlocked position and the locked position.

19. The lid assembly of claim 13, wherein the lid main body includes a stationary second cam contact surface, and the camming lever includes a second lever arm extending from the main body portion, a distal end portion of the second lever arm being shaped to form a second cam, the second cam being in sliding engagement with the second cam contact surface of the lid main body, the second lever arm being operable operably rotatable by rotation of the camming lever to rotate the second cam while in sliding engagement with the second cam contact surface to simultaneously rotate the first and second cams to move the sealing member between the sealed position and the unsealed position.

20. The lid assembly of claim 19, wherein the sealing member includes a second axle receiver and the lid assembly further includes a second cam axle laterally extending from the second cam and removably coupled to the sealing member, the sealing member rotatably retaining the second cam axle in the second axle receiver for rotation of the second cam axle and the second lever arm about a stationary axis of rotation relative to the sealing member as the second lever arm is rotate to move the sealing member between the sealed position and the unsealed position, rotation of the second cam while in sliding engagement with the second cam contact surface of the lid main body causing the second cam axle to move the sealing member between the sealed position and the unsealed position.

21. The lid assembly of claim 19, wherein the first cam and the second cam are laterally spaced apart on opposite lateral sides of the camming lever, and the locking member is at least partially disposed between the first cam and the second cam.

22. The lid assembly of claim 13, wherein a downwardly facing surface of the locking member opposes an upwardly facing surface of the camming lever when in the locked position to limit rotation of the camming lever and retain the sealing member in the sealed position.

23. The lid assembly of claim 13, wherein the lid main body further includes an upwardly projecting lip, and the camming lever further includes a cover portion sized and shaped to extend over and cover the lip from above when the camming lever has moved the sealing member to the sealed position.

24. The lid assembly of claim 13, wherein the lid main body further includes an upwardly projecting lip, and the camming lever further includes a lip cover portion, the camming lever being rotatable between a first position at which the sealing member is in the sealed position and a second position at which the sealing member is in the unsealed position, and the lip cover portion being in position above the lip and covering the lip from above when the camming lever is in the first position.

25. The lid assembly of claim 24, wherein the lip is a drinking lip adjacent to the drinking aperture and extending along a peripheral edge of the lid main body, the lip extending upwardly and terminating in an upwardly facing lip wall, and the lip cover portion extending over and covering at least a portion of the upwardly facing lip wall from above along the peripheral edge when the camming lever is in the first position.

26. The lid assembly of claim 24, wherein the lid main body has a cylindrical shape and the lip is a drinking lip adjacent to the drinking aperture and extending along a circumferential edge of the lid main body, the lip extending upwardly and terminating at an upper end in an upwardly facing lip edge wall, the lip cover portion having a concavity in which at least a portion of the upwardly facing lip edge wall is positioned with the lip cover portion extending over and covering from above the at least a portion of the upwardly facing lip edge wall when the camming lever is in the first position.

27. The lid assembly of claim 13, wherein when the first cam axle is coupled to the sealing member, the lid assembly is in a use configuration in which the camming lever is operable to move the sealing member between the sealed position and the unsealed position, and when the first cam axle is uncoupled from the sealing member, the sealing member is rotatable to a cleaning position spaced apart from and below the unsealed position.

28. The lid assembly of claim 27, wherein the sealing member remains pivotally attached to the lid main body when in the cleaning position.

29. The lid assembly of claim 13, wherein the lid main body further includes an upwardly projecting sidewall laterally outward of and adjacent to the first cam, and having a slot, and the camming lever further includes a retaining member laterally extending from the first cam and received in the slot to rotatably couple the camming lever to the lid main body and restrain upward movement of the first cam while allowing forward-rearward movement of the first cam as the first cam is rotated to move the sealing member between the sealed position and the unsealed position.

30. The lid assembly of claim 29, wherein the slot includes an opening permitting the retaining member of the camming lever to be inserted into and removed from the slot, when the first cam axle is uncoupled from the sealing member and the retaining member is removed from the slot, the camming lever is separable from the sealing member and the lid main body.

31. A lid assembly for a beverage container, comprising:
a lid main body having a partition and a drinking aperture extending through the partition, the lid main body including a stationary first cam contact surface;
a sealing member pivotally attached to the lid main body and rotatably movable between a sealed position sealing the drinking aperture and an unsealed position unsealing the drinking aperture, the sealing member having an axle receiver;
a camming lever rotatably coupled to the lid main body, the camming lever including a cam arm with a distal end portion shaped to form a first cam, the first cam being in sliding engagement with the first cam contact surface of the lid main body, the cam arm being operably rotatable by rotation of the camming lever to rotate the first cam while in sliding engagement with the first cam contact surface;
a first cam axle laterally extending from a first side of the first cam and removably coupled to the sealing member, the sealing member retaining the first cam axle in the axle receiver for rotation of the first cam axle and the cam arm about a stationary axis of rotation relative to the sealing member as the cam arm is rotate to move the sealing member between the sealed position and the unsealed position, a second cam axle laterally extending from an opposite second side of the first cam and being coupled to the lid main body, rotation of the first cam while in sliding engagement with the first cam contact surface of the lid main body moving the sealing member between the sealed position and the unsealed position; and
a locking member slidably movable between a locked position preventing rotation of the first cam and an unlocked position permitting rotation of the first cam.

32. The lid assembly of claim 31, wherein the locking member includes a main body portion and a locking element projecting outwardly from the main body portion, the locking element having a downwardly facing surface adapted to engage with an upper surface of the camming lever when the locking member is in the locked position to prevent rotation of the first cam.

33. The lid assembly of claim 32, wherein the locking element extends from a forward side of the locking member.

34. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member;
a second cam axle laterally extending from an opposite second side of the first cam and being coupled to the lid main body, rotation of the first cam moving the sealing member between the sealed position and the unsealed position; and
a locking member slidably movable between a locked position preventing rotation of the first cam and an unlocked position permitting rotation of the first cam, wherein the locking member further includes a locking member body portion and a guide member extending downwardly from the locking member body portion, the sealing member includes a guide channel slidably receiving the guide member, the guide member being adapted to move between a first position within the guide channel at which the locking member is in the locked position and a second position within the guide channel at which the locking member is in the unlocked position.

35. The lid assembly of claim 34, wherein the locking member further includes a medial portion extending downwardly from the locking member body portion, and wherein the guide member extends outwardly from the medial portion.

36. The lid assembly of claim 35, wherein the guide member is disposed at an end of the medial portion opposite to the locking member body portion.

37. The lid assembly of claim 35, wherein the guide member and the medial portion together have a cross-sectional T-shape.

38. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member;
a second cam axle laterally extending from an opposite second side of the first cam and being coupled to the lid main body, rotation of the first cam moving the sealing member between the sealed position and the unsealed position; and
a locking member slidably movable between a locked position preventing rotation of the first cam and an unlocked position permitting rotation of the first cam, wherein one of the sealing member and the locking member has a detent portion, and the other of the sealing member and the locking member has a first receiving portion sized and shaped to snuggly receive the detent portion.

39. The lid assembly of claim 38, wherein the first receiving portion receives the detent portion when the locking member is in one of the locked position and the unlocked position.

40. The lid assembly of claim 38, wherein the other one of the sealing member and the locking member has a second receiving portion sized and shaped to snuggly receive the detent portion, the second receiving portion being spaced apart from the first receiving portion.

41. The lid assembly of claim 40, wherein the other one of the sealing member and the locking member has a channel connecting the first receiving portion and the second receiving portion, the first receiving portion receives the detent portion when the locking member is in the locked position, and the second receiving portion receives the detent portion when the locking member is in the unlocked position.

42. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member;
a second cam axle laterally extending from an opposite second side of the first cam and being coupled to the lid main body, rotation of the first cam moving the sealing member between the sealed position and the unsealed position; and
a locking member slidably movable between a locked position preventing rotation of the first cam and an unlocked position permitting rotation of the first cam, wherein the locking member includes a main body portion and a locking element projecting outwardly from the main body portion, the locking element having a downwardly facing surface adapted to engage with an upper surface of the camming lever when the locking member is in the locked position to prevent rotation of the first cam, wherein the locking member includes a locking member body portion and an arm portion extending from the locking member main body, the sealing member includes a guide channel extending in a forward-rearward direction along the sealing member, and the guide channel is adapted to retain the locking member for movement between the locked position and the unlocked position.

43. The lid assembly of claim 42, wherein the arm portion further includes a protuberance, and the guide channel includes a first receiving portion adapted to snuggly engage with the protuberance to retain the locking member in one of the locked position and the unlocked position.

44. The lid assembly of claim 43, wherein the guide channel further includes a second receiving portion spaced apart from the first receiving portion, the second receiving portion adapted to snuggly engage with the protuberance to retain the locking member in the other of the locked position and the unlocked position.

45. The lid assembly of claim 44, wherein the guide channel further includes a protruding portion positioned between the first receiving portion and the second receiving portion, the protruding portion adapted to abut the protuberance to retain the locking member in the locked position or the unlocked position.

46. The lid assembly of claim 42, wherein the arm portion of the locking member main body includes a first flat portion, the guide channel of the sealing member includes a second flat portion, and the first flat portion opposes the second flat portion when the arm portion is engaged with the guide channel to prevent removal therefrom.

47. The lid assembly of claim 5, wherein the cover portion is further sized and shaped to extend outward beyond the lip and downward along an outward side of the lip and cover at least a portion of the outward side of the lip when the camming lever has moved the sealing member to the sealed position.

48. The lid assembly of claim 6, wherein the lid cover portion is further positioned outward beyond the lip and covers a forward side of the lip from in front when the camming lever is in the first position.

49. The lid assembly of claim 23, wherein the cover portion is further sized and shaped to extend outward beyond the lip and downward along an outward side of the lip and cover at least a portion of the outward side of the lip when the camming lever has moved the sealing member to the sealed position.

50. The lid assembly of claim 24, wherein the lid cover portion is further positioned outward beyond the lip and covers a forward side of the lip from in front when the camming lever is in the first position.

51. The lid assembly of claim 31, wherein the lid main body further includes an upwardly projecting sidewall laterally outward of and adjacent to the first cam and having a slot, and the second cam axle being received in the slot to rotatably couple the camming lever to the lid main body and restrain upward movement of the first cam while allowing forward-rearward movement of the first cam as the first cam is rotated to move the sealing member between the sealed position and the unsealed position.

52. The lid assembly of claim 51, wherein the slot includes an opening permitting the second cam axle to be inserted into and removed from the slot, when the first cam axle is uncoupled from the sealing member and the second cam axle is removed from the slot, the camming member is separable from the sealing member and the lid main body.

53. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member, rotation of the first cam moving the sealing member between the sealed position and the unsealed position; and
a locking member slidably movable between a locked position preventing rotation of the first cam and an unlocked position permitting rotation of the first cam, wherein the locking member further includes a locking member body portion and a guide member extending downwardly from the locking member body portion, the sealing member includes a guide channel slidably receiving the guide member, the guide member being adapted to move between a first position within the guide channel at which the locking member is in the locked position and a second position within the guide channel at which the locking member is in the unlocked position.

54. The lid assembly of claim 53, wherein the lid main body includes a stationary first cam contact surface, and the sealing member includes an axle receiver, the first cam being in sliding engagement with the first cam contact surface of the lid main body, the cam arm being operably rotatable by rotation of the camming lever to rotate the first cam while in sliding engagement with the first cam contact surface, the sealing member retaining the first cam axle in the axle receiver for rotation of the first cam axle and the cam arm about a stationary axis of rotation relative to the sealing member as the cam arm is rotate to move the sealing member between the sealed position and the unsealed position, rotation of the first cam while in sliding engagement with the first cam contact surface of the lid main body moving the sealing member between the sealed position and the unsealed position.

55. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member, rotation of the first cam moving the sealing member between the sealed position and the unsealed position; and
a locking member slidably movable between a locked position preventing rotation of the first cam and an unlocked position permitting rotation of the first cam, wherein one of the sealing member and the locking member has a detent portion, and the other of the sealing member and the locking member has a first receiving portion sized and shaped to snuggly receive the detent portion.

56. The lid assembly of claim 55, wherein the lid main body includes a stationary first cam contact surface, and the sealing member includes an axle receiver, the first cam being in sliding engagement with the first cam contact surface of the lid main body, the cam arm being operably rotatable by rotation of the camming lever to rotate the first cam while in sliding engagement with the first cam contact surface, the sealing member retaining the first cam axle in the axle receiver for rotation of the first cam axle and the cam arm about a stationary axis of rotation relative to the sealing member as the cam arm is rotate to move the sealing member between the sealed position and the unsealed position, rotation of the first cam while in sliding engagement with the first cam contact surface of the lid main body moving the sealing member between the sealed position and the unsealed position.

57. A lid assembly for a beverage container, comprising:
a lid main body having a partition and a drinking aperture extending through the partition;
a sealing member pivotally attached to the lid main body and rotatably movable between a sealed position sealing the drinking aperture and an unsealed position unsealing the drinking aperture;
a camming lever rotatably coupled to the lid main body, the camming lever including a cam arm with a first cam, the camming lever being operable to rotate the first cam;
a first cam axle laterally extending from a first side of the first cam and removably coupled to the sealing member, rotation of the first cam moving the sealing member between the sealed position and the unsealed position; and
a locking member slidably movable between a locked position preventing rotation of the first cam and an unlocked position permitting rotation of the first cam, wherein the locking member includes a main body portion and a locking element projecting outwardly from the main body portion, the locking element having a downwardly facing surface adapted to engage with an upper surface of the camming lever when the locking member is in the locked position to prevent rotation of the first cam, wherein the locking member includes a locking member body portion and an arm portion extending from the locking member main body, the sealing member includes a guide channel extending in a forward-rearward direction along the sealing member, and the guide channel is adapted to retain the locking member for movement between the locked position and the unlocked position.

58. The lid assembly of claim 57, wherein the lid main body includes a stationary first cam contact surface, and the sealing member includes an axle receiver, the first cam being in sliding engagement with the first cam contact surface of the lid main body, the cam arm being operably rotatable by rotation of the camming lever to rotate the first cam while in sliding engagement with the first cam contact surface, the sealing member retaining the first cam axle in the axle receiver for rotation of the first cam axle and the cam arm about a stationary axis of rotation relative to the sealing member as the cam arm is rotate to move the sealing member between the sealed position and the unsealed position, rotation of the first cam while in sliding engagement with the first cam contact surface of the lid main body moving the sealing member between the sealed position and the unsealed position.

\* \* \* \* \*

UNITED STATES PATENT AND TRADEMARK OFFICE
CERTIFICATE OF CORRECTION

| | | |
|---|---|---|
| PATENT NO. | : 10,315,811 B2 | Page 1 of 1 |
| APPLICATION NO. | : 15/240697 | |
| DATED | : June 11, 2019 | |
| INVENTOR(S) | : Evan Michael Choltco-Devlin et al. | |

It is certified that error appears in the above-identified patent and that said Letters Patent is hereby corrected as shown below:

In the Claims

Claim 48, Column 24, Line 61:
The lid assembly of claim 6, wherein the lid cover
Should read as:
The lid assembly of claim 6, wherein the lip cover

AND

Claim 50, Column 25, Line 4:
The lid assembly of claim 24, wherein the lid cover
Should read as:
The lid assembly of claim 24, wherein the lip cover Signed and Sealed this
Twelfth Day of November, 2019

Andrei Iancu
*Director of the United States Patent and Trademark Office*